US012647729B2

(12) United States Patent
Zhou et al.

(10) Patent No.: US 12,647,729 B2
(45) Date of Patent: Jun. 2, 2026

(54) VIBRATION COMPONENTS WITH MASS ELEMENT AND ELASTIC ELEMENT

(71) Applicant: SHENZHEN SHOKZ CO., LTD., Shenzhen (CN)

(72) Inventors: Wenbing Zhou, Shenzhen (CN); Yongshuai Yuan, Shenzhen (CN); Wenjun Deng, Shenzhen (CN); Yujia Huang, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 188 days.

(21) Appl. No.: 18/449,859

(22) Filed: Aug. 15, 2023

(65) Prior Publication Data

US 2023/0388712 A1 Nov. 30, 2023

Related U.S. Application Data

(63) Continuation of application No. PCT/CN2021/133664, filed on Nov. 26, 2021.

(51) Int. Cl.

*H04R 7/18* (2006.01)
*H04R 7/06* (2006.01)
*H04R 1/08* (2006.01)

(52) U.S. Cl.

CPC ................ *H04R 7/06* (2013.01); *H04R 7/18* (2013.01); *H04R 1/083* (2013.01)

(58) Field of Classification Search

CPC ............... H04R 7/16; H04R 7/18; H04R 7/20
USPC .......................................................... 381/162
See application file for complete search history.

(56) References Cited

U.S. PATENT DOCUMENTS

| | | | | |
|---|---|---|---|---|
| 5,719,324 | A | 2/1998 | Thundat et al. | |
| 7,840,020 | B1 * | 11/2010 | Miller, III | H04R 25/604 381/357 |
| 2020/0267475 | A1 | 8/2020 | Kosuda et al. | |
| 2021/0044903 | A1 | 2/2021 | Abe et al. | |
| 2021/0204056 | A1 | 7/2021 | Bradt et al. | |
| 2023/0358600 | A1 | 11/2023 | Deng et al. | |

(Continued)

FOREIGN PATENT DOCUMENTS

| | | | |
|---|---|---|---|
| CN | 106954148 | A | 7/2017 |
| CN | 208434106 | U | 1/2019 |
| CN | 210513399 | U | 5/2020 |

(Continued)

OTHER PUBLICATIONS

Translation of Li et al. Chinese Publication No. CN208434106, Jan. 25, 2019 (Year: 2019).*

(Continued)

*Primary Examiner* — Katherine A Faley
(74) *Attorney, Agent, or Firm* — METIS IP LLC

(57) ABSTRACT

The present disclosure provides a vibration component. The vibration component may include: a mass element; and an elastic element, the elastic element including a connection region and a first preprocessing region, wherein the connection region is configured to support the mass element; and a deformation quantity of the first preprocessing region is greater than a deformation quantity of a region of the elastic element other than the first preprocessing region when the mass element vibrates.

20 Claims, 36 Drawing Sheets

(56) References Cited

U.S. PATENT DOCUMENTS

| | | | |
|---|---|---|---|
| 2023/0388712 | A1 | 11/2023 | Zhou et al. |

FOREIGN PATENT DOCUMENTS

| | | | |
|---|---|---|---|
| CN | 210513400 | U | 5/2020 |
| CN | 111935609 | A | 11/2020 |
| CN | 111988711 | A | 11/2020 |
| CN | 212544040 | U | 2/2021 |
| CN | 212785824 | U | 3/2021 |
| CN | 213403499 | U | 6/2021 |
| GB | 221283 | A | 9/1924 |
| GB | 327689 | A | 4/1930 |
| JP | H07274287 | A | 10/1995 |
| JP | 2018137297 | A | 8/2018 |
| TW | 201640911 | A | 11/2016 |
| TW | M586502 | U | 11/2019 |
| WO | 2021134170 | A1 | 7/2021 |

OTHER PUBLICATIONS

International Search Report in PCT/CN2021/133664 mailed on Jul. 1, 2022, 6 pages.

First Office Action in Chinese Application No. 202111427923.1 mailed on May 7, 2025, 30 pages.

First Office Action in Chinese Application No. 202180091902.9 mailed on May 16, 2025, 35 pages.

Zhao, Zilong, Loudspeaker Spider Shape Design, China Excellent Master's Thesis Full-text Database, 2013, 71 pages.

* cited by examiner

VIBRATION COMPONENTS WITH MASS ELEMENT AND ELASTIC ELEMENT

CROSS-REFERENCE TO RELATED APPLICATION

This application is a continuation of International Application No. PCT/CN2021/133664, filed on Nov. 26, 2021, the entire contents of which are hereby incorporated herein by reference.

TECHNICAL FIELD

The present disclosure relates to the field of acoustic technology, and in particular, to vibration components and sound transmission devices.

BACKGROUND

In a sound transmission device, a mass block of a vibration component is fixed on a vibrating diaphragm of the vibration component through designing the mass block and the vibrating diaphragm, so that the mass block moves in response to the vibration of the vibrating diaphragm, which realizes the sound transmission function of the sound transmission device. When the sound transmission device is working or subjected to external impact, a fixed end of the vibrating diaphragm (especially a part of the vibrating diaphragm close to a connection between the vibrating diaphragm and a housing) is prone to material fatigue due to stress concentration during the movement of the mass block, thereby damaging the vibrating diaphragm and affecting the reliability of the sound transmission device.

Therefore, it is desirable to propose a vibration component to improve the reliability of the sound transmission device.

SUMMARY

An aspect of the present disclosure provides a vibration component. The vibration component may include a mass element and an elastic element. The elastic element may include a connection region and a first preprocessing region, wherein the connection region is configured to support the mass element; and a deformation quantity of the first preprocessing region is greater than a deformation quantity of a region of the elastic element other than the first preprocessing region when the mass element vibrates.

In some embodiments, the connection region may be disposed in a middle of the elastic element, and the first preprocessing region may be disposed around a periphery of the connection region.

In some embodiments, the first preprocessing region may include a first bending ring with a first bending direction.

In some embodiments, a shape of a cross-section of the first bending ring parallel to a vibration direction of the mass element may include one or more of an arc shape, an elliptical arc shape, a polyline shape, a pointed tooth shape, or a square tooth shape.

In some embodiments, the connection region may encircle a sidewall of the mass element and may be mechanically connected to the sidewall of the mass element.

In some embodiments, the mass element may include a first mass element and a second mass element, the first mass element and the second mass element being connected to two side surfaces of the connection region perpendicular to a vibration direction of the mass element, respectively.

In some embodiments, the elastic element may further include a second preprocessing region, the second preprocessing region being disposed around a periphery of the first preprocessing region; and a deformation quantity of the second preprocessing region may be greater than a deformation quantity of a region of the elastic element other than the first preprocessing region and the second preprocessing region when the mass element vibrates.

In some embodiments, the second preprocessing region may be directly connected to or spaced apart from the first preprocessing region.

In some embodiments, the second preprocessing region may include a second bending fold with a second bending direction.

In some embodiments, the first bending direction may be the same as or different from the second bending direction.

In some embodiments, the first bending direction may be opposite to the second bending direction.

In some embodiments, the first bending direction may be perpendicular to the second bending direction.

In some embodiments, a projection area of the second bending ring on a plane perpendicular to a vibration direction of the mass element may be smaller than a projection area of the first bending ring on the plane perpendicular to the vibration direction of the mass element.

In some embodiments, the vibration component may further include a flexible connection layer disposed between the elastic element and the mass element.

In some embodiments, a tensile strength of the flexible connection layer may be in a range of 0.5 MPa-200 MPa.

In some embodiments, a projection area of the flexible connection layer along a vibration direction of the mass element may be greater than or equal to a projection area of the mass element along the vibration direction of the mass element.

In some embodiments, the vibration component may further include a supporting element configured to support the elastic element; and the supporting element may encircle the elastic element and may be mechanically connected to the elastic element.

In some embodiments, the flexible connection layer may cover the elastic element.

In some embodiments, the flexible connection layer may be spaced apart from the elastic element to form a gap, and the gap may be filled with liquid.

Another aspect of the present disclosure provides a sound transmission device. The sound transmission device may include: a casing, the housing forming an acoustic cavity; a vibration component, the vibration component separating the acoustic cavity into a first acoustic cavity and a second acoustic cavity, and the vibration component vibrating relative to the housing so that a volume of the first acoustic cavity and a volume of the second acoustic cavity may change; and an acoustoelectric transducer, the acoustoelectric transducer being in acoustic communication with the first acoustic cavity or the second acoustic cavity, and the acoustoelectric transducer generating an electrical signal in response to a change of the volume of the first acoustic cavity or a change of the volume of the second acoustic cavity, wherein the vibration component may include a mass element and an elastic element; the elastic element includes a connection region and a first preprocessing region; the connection region is configured to support the mass element; and a deformation quantity of the first preprocessing region is greater than a deformation quantity of a region of the elastic element other than the first preprocessing region when the mass element vibrates.

In some embodiments, the connection region may be disposed in a middle of the elastic element, and the first preprocessing region may be disposed around a periphery of the connection region.

In some embodiments, the acoustoelectric transducer may include a substrate, and the first preprocessing region may be connected to the substrate.

In some embodiments, the first preprocessing region may be connected to the housing.

In some embodiments, the elastic element may further include a second preprocessing region, the second preprocessing region being disposed around a periphery of the first preprocessing region; and a deformation quantity of the second preprocessing region may be greater than a deformation quantity of a region of the elastic element other than the first preprocessing region and the second preprocessing region when the mass element vibrates.

In some embodiments, the second preprocessing region may be connected to the housing.

In some embodiments, the acoustoelectric transducer may include a substrate, and the second preprocessing region may be connected to the substrate.

In some embodiments, the vibration component may further include a supporting element configured to support the elastic element.

In some embodiments, the first preprocessing region may be connected to the supporting element.

In some embodiments, the second preprocessing region may be connected to the supporting element.

In some embodiments, the supporting element may be connected to the housing.

In some embodiments, the acoustoelectric transducer may include a substrate, and the supporting element may be connected to the substrate.

In some embodiments, the vibration component may further include a flexible connection layer disposed between the elastic element and the mass element.

In some embodiments, the flexible connection layer may cover the elastic element, and an edge of the flexible connection layer may be connected to the housing.

In some embodiments, the flexible connection layer may be spaced apart from the elastic element to form a gap, and the gap may be filled with liquid.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
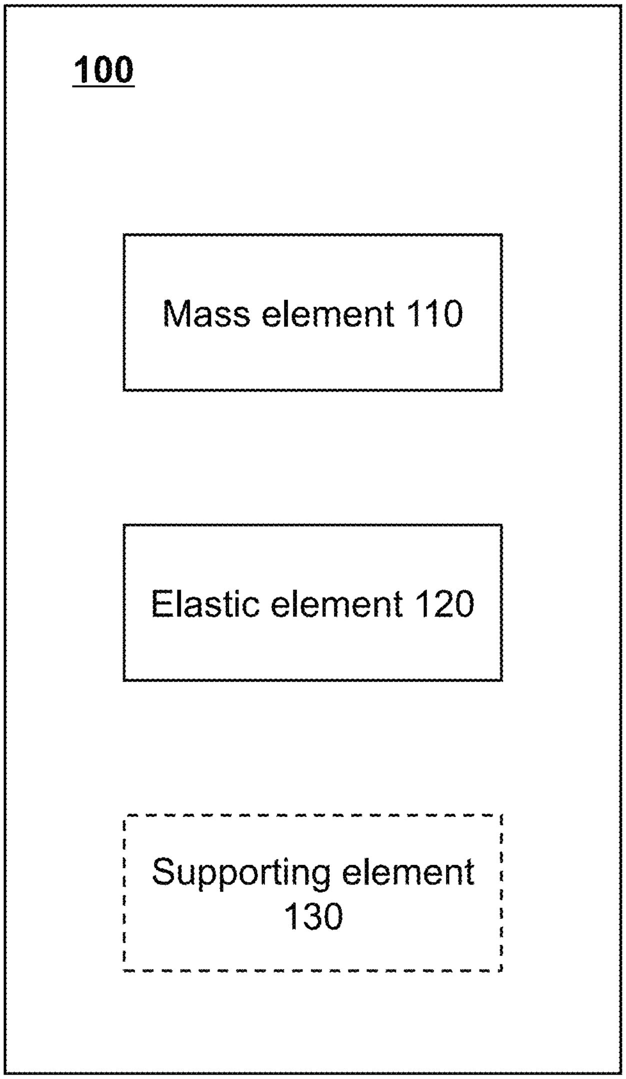
FIG. 1 is a block diagram illustrating an exemplary vibration component according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

Some embodiments of the present disclosure provide a vibration component. The vibration component may generate vibration in response to a vibration signal from an external environment. In some embodiments, the vibration component may be disposed in a sound transmission device, and transmit the vibration signal to other components (e.g., an acoustoelectric transducer) of the sound transmission device. In some embodiments, the vibration component may include a mass element and an elastic element. The mass element may be physically connected to the elastic element. In some embodiments, the mass element may be located on an upper surface and/or a lower surface of the elastic element. In some embodiments, the elastic element may also encircle a sidewall of the mass element and may be mechanically connected to the sidewall of the mass element. When the vibration component receives the vibration signal, the mass element and the elastic element may vibrate under an action of the vibration signal. The elastic element may be deformed during vibration to provide the mass element with a vibration displacement or a vibration amplitude along a vibration direction of the mass element. In some embodiments, the elastic element may include a connection region and one or more preprocessing regions. The connection region may be located in a middle of the elastic element and may be configured to support the mass element. The one or more preprocessing regions may be disposed around a periphery of the connection region to provide the mass element with one or more displacements along the vibration direction of the mass element. In some embodiments, the vibration displacement or the vibration amplitude provided by the elastic element for the mass element may be superimposed by the one or more displacements along the vibration direction of the mass element provided by the one or more preprocessing regions. The one or more preprocessing regions may be one or more regions of the elastic element that are preprocessed, and the one or more preprocessing regions of the elastic element have a stronger deformability than other regions (regions that have not been preprocessed) of the elastic element. In some embodiments, the preprocessing may include but be not limited to bending, changing hardness of the material, or the like. Since the one or more preprocessing regions have a stronger deformability than other regions of the elastic element, a total displacement provided by the elastic element for the mass element may be increased by setting the one or more preprocessing regions, that is, the vibration displacement or vibration amplitude of the mass element may be increased. In some embodiments, the elastic element may include a first preprocessing region. The first preprocessing region may provide the mass element with a first displacement along the vibration direction of the mass element. The first displacement in the vibration direction of the mass element may be a displacement contributed by the first preprocessing region to the mass element in the vibration direction of the mass element during the vibration. In some embodiments, the elastic element may further include a second preprocessing region. The second preprocessing region may provide the mass element with a second displacement along the vibration direction of the mass element. The second displacement in the vibration direction of the mass element may be a displacement contributed by the second preprocessing region to the mass element in the vibration direction of the mass element during the vibration. In some embodiments, the one or more preprocessing regions may include one or more bending rings (e.g., a first bending ring, a second bending ring, etc.). The one or more bending rings may be deformed when subjected to vibration. A deformation quantity of the one or more bending rings subjected to vibration may be greater than a deformation quantity of the elastic element without preprocessing (non-bending ring), thereby increasing a total deformation quantity of the elastic element when the mass element vibrates and increasing the vibration displacement or the vibration amplitude of the mass element in the vibration direction of the mass element, so as to improve the sensitivity of the vibration component responding to an external vibration signal.

In some embodiments, the one or more preprocessing regions of the elastic element (e.g., the one or more bending rings) may also improve a deformability of the elastic element, so that the elastic element may have a greater deformability in the vibration direction of the mass element, and the one or more preprocessing regions may be deformed to disperse the stress generated by a vibration shock in the one or more preprocessing regions when the vibration component is subjected to a relatively large external vibration, which may prevent the stress concentration of the elastic element, avoid the vibration component (especially the elastic element) from being damaged when receiving the external vibration, and improve the reliability of the vibration component.

FIG. 1 is a block diagram illustrating an exemplary vibration component according to some embodiments of the present disclosure. As shown in FIG. 1, the vibration component 100 may include a mass element 110 and an elastic element 120.

The mass element 110 may also be referred to as a mass block. In some embodiments, a material of the mass element 110 may be a material with a density greater than a certain density threshold (e.g., 6 $g/cm^3$). In some embodiments, the material of the mass element 110 may be metallic or non-metallic. The metallic material may include but be not limited to a steel (e.g., a stainless steel, a carbon steel), a lightweight alloy (e.g., an aluminum alloy, a beryllium copper, a magnesium alloy, a titanium alloy), or the like, or any combination thereof. The non-metallic material may include but be not limited to, a polyurethane foam, a glass fiber, a carbon fiber, a graphite fiber, a silicon carbide fiber, a silicon, a silicon oxide, a silicon nitride, etc. When the vibration component 100 receives a vibration signal, the mass element 110 may vibrate in response to the vibration signal. In some embodiments, when the vibration component 100 is applied to a vibration sensor or a sound transmission device, a material density of the mass element 110 may have a relatively great influence on a resonance peak and sensitivity of the frequency response curve of the vibration sensor or the sound transmission device. Under a same volume, the greater the density of the mass element 110 is, the greater the mass may be, and the resonance peak of the vibration sensor or the sound transmission device may move to a low frequency, so that a low low-frequency sensitivity of the vibration sensor or the sound transmission device may increase. In some embodiments, the material density of the mass element 110 may be in a range of 6 $g/cm^3$~20 $g/cm^3$. In some embodiments, the material density of the mass element 110 may be in a range of 6 $g/cm^3$~15 $g/cm^3$. In some embodiments, the material density of the mass element 110 may be in a range of 6 $g/cm^3$~10 $g/cm^3$. In some embodiments, the material density of the mass element 110 may be in a range of 6 $g/cm^3$~8 $g/cm^3$.

In some embodiments, a projection of the mass element 110 along a vibration direction of the mass element 110 may be a regular and/or irregular polygon such as a circle, a rectangle, a rectangle with rounded corners, a pentagon, or a hexagon.

In some embodiments, a thickness of the mass element 110 along the vibration direction of the mass element may be in a range of 50 um-1000 um. In some embodiments, the thickness of the mass element 110 along the vibration direction of the mass element may be in a range of 60 um-900 um. In some embodiments, the thickness of the mass element 110 along the vibration direction of the mass element may be in a range of 70 um-800 um. In some embodiments, the thickness of the mass element 110 along the vibration direction of the mass element may be in a range of 80 um-700 um. In some embodiments, the thickness of the mass element 110 along the vibration direction of the mass element may be in a range of 90 um-600 um. In some embodiments, the thickness of the mass element 110 along the vibration direction of the mass element may be in a range of 100 um-500 um. In some embodiments, the thickness of the mass element 110 along the vibration direction of the mass element may be in a range of 100 um-400 um. In some embodiments, the thickness of the mass element 110 along the vibration direction of the mass element may be in a range of 100 um-300 um. In some embodiments, the thickness of the mass element 110 along the vibration direction of the mass element may be in a range of 100 um-200 um. In some embodiments, the thickness of the mass element 110 along the vibration direction of the mass element may be in a range of 100 um-150 um.

More descriptions about a structure and a dimension of the mass element 110 may be found elsewhere in the present disclosure, e.g., FIGS. 2-10, and related descriptions thereof.

The elastic element may be an element capable of elastic deformation under an action of an external load. In some embodiments, the elastic element may be a vibrating diaphragm. In some embodiments, the elastic element 120 may be made of a high-temperature resistant material, so that the elastic element 120 may maintain performance in a manufacturing process when the vibration component 100 is applied to the vibration sensor or the sound transmission device. In some embodiments, when the elastic element 120 is in an environment of 200° C. to 300° C., Young's modulus and shear modulus of the elastic element 120 may have no change or little change (e.g., the change is within 5%). The Young's modulus may be used to characterize the deformability of the elastic element 120 when stretched or compressed, and the shear modulus may be used to characterize the deformability of the elastic element 120 when sheared. In some embodiments, the elastic element 120 may be made of a material with good elasticity (i.e., prone to elastic deformation), so that the vibration component 100 may have a good vibration response ability. In some embodiments, the material of the elastic element 120 may be an organic polymer material, a rubber-like material, or the like, or any combination thereof. In some embodiments, the organic polymer material may include Polycarbonate (PC), Polyamides (PA), Acrylonitrile Butadiene Styrene (ABS), Polystyrene (PS), High Impact Polystyrene (HIPS), Polypropylene (PP), Polyethylene Terephthalate (PET), Polyvinyl Chloride (PVC), Polyurethanes (PU), Polyethylene (PE), Phenol Formaldehyde (PF), Urea-Formaldehyde (UF), Melamine-Formaldehyde (MF), Polyarylate (PAR), Polyetherimide (PEI), Polyimide (PI), Polyethylene Naphthalate two formic acid glycol ester (PEN), Polyetheretherketone (PEEK), silica gel, or the like, or any combination thereof. The PET may be a kind of thermoplastic polyester that is well formed, and a vibrating diaphragm made of the PET may be often referred to as a Mylar membrane. The PC may have a relatively strong impact resistance and may be dimensionally stable after molding. The PAR may be an advanced version of the PC, mainly for environmental reasons. The PEI may be softer than PET and may have higher internal damping. The PI may have a high temperature resistance, and a relatively high molding temperature and long processing time. The PEN may have high strength and may be relatively hard, and a characteristic of PEN is that PEN can be painted, dyed, and plated. The PU may be often used in a damping layer or a bending ring of a composite material, with high elasticity and high internal damping. The PEEK may be a newer type of material, which may be resistant to friction and fatigue. It is worth noting that a composite material can generally take into account characteristics of various materials, commonly, such as a double-layer structure (e.g., generally hot-pressed PU to increase internal resistance), a three-layer structure (e.g., a sandwich structure, intermediate damping layer PU, acrylic glue, UV glue, pressure-sensitive glue, etc.), a five-layer structure (e.g., two layers of membrane are bonded by double-sided adhesive, and the double-sided adhesive has a base layer, usually PET). In some embodiments, the organic polymer material may also be various types of glue, including but not limited to a gel, a silicone gel, an acrylic, a polyurethane, a rubber, an epoxy, a hot melt, a light curing, etc., preferably a silicone adhesive glue, a silicone adhesive glue.

In some embodiments, a Shore hardness of the elastic element 120 may be in a range of 1 HA-50 HA. In some embodiments, the Shore hardness of the elastic element 120 may be in a range of 1 HA-45 HA. In some embodiments, the Shore hardness of the elastic element 120 may be in a range of 1 HA-40 HA. In some embodiments, the Shore hardness of the elastic element 120 may be in a range of 1 HA-35 HA. In some embodiments, the Shore hardness of the elastic element 120 may be in a range of 1 HA-30 HA. In some embodiments, the Shore hardness of the elastic element 120 may be in a range of 1 HA-25 HA. In some embodiments, the Shore hardness of the elastic element 120 may be in a range of 1 HA-20 HA. In some embodiments, the Shore hardness of the elastic element 120 may be in a range of 1 HA-15 HA. In some embodiments, the Shore hardness of the elastic element 120 may be in a range of 1 HA-10 HA. In some embodiments, the Shore hardness of the elastic element 120 may be in a range of 1 HA-5 HA. In some embodiments, the Shore hardness of the elastic element 120 may be in a range of 14.9 HA-15.1 HA.

In some embodiments, a projection of the elastic element 120 along the vibration direction of the mass element 110 may be a regular and/or irregular polygon such as a circle, a rectangle, a pentagon, or a hexagon.

In some embodiments, the elastic element 120 may include a connection region and a first preprocessing region. The connection region may be located in a middle of the elastic element 120, and may be configured to support the mass element 110. The first preprocessing region may be disposed around a periphery of the connection region to provide the mass element 110 with a first displacement along the vibration direction of the mass element 110. In some embodiments, the mass element 110 may be physically connected (e.g., glued) to the elastic element 120. In some embodiments, the mass element 110 may be bonded to the connection region of the elastic element 120. In some embodiments, the mass element 110 may be bonded to a surface perpendicular to the vibration direction of the mass element 110 on the connection region. In some embodiments, the mass element 110 may also be bonded to a surface parallel to the vibration direction of the mass element 110 on the connection region. In some embodiments, the mass element 110 may include a first mass element and a second mass element. The first mass element and the second mass element may be connected to two side surfaces of the elastic element 120 perpendicular to the vibration direction of the mass element 110, respectively. In some embodiments, in order to prevent the physical connection between the mass element 110 and the elastic element 120 from being damaged due to deformation of the connection region, the connection region may be strengthened (e.g., hardening) to reduce a deformability of the connection region.

The first preprocessing region may be a preprocessing region of the elastic element. In some embodiments, the preprocessing may change the hardness of the material. In some embodiments, the first preprocessing region may be a region whose hardness is lower than the hardness of other parts of the elastic element 120. Since the hardness of the first preprocessing region is lower than the hardness of other parts of the elastic element 120, when the mass element 110 vibrates and drives the elastic element 120 to move, the first preprocessing region may be more likely to be deformed, so that a deformation quantity generated by the first preprocessing region may be greater than deformation quantities generated by other regions other than the one or more preprocessing regions (e.g., the first preprocessing region) of the elastic element 120, thereby increasing a total deformation quantity generated by the elastic element 110 as a whole. Moreover, since the first preprocessing region is more likely to be deformed, in the vibration process of the mass element 110, the stress generated in the first preprocessing region may be more likely to be dispersed in the entire first preprocessing region, so that the stress concentration in some specific positions may be avoided, and the elastic element 120 may be prevented from being damaged.

In some embodiments, the preprocessing may be bending. In some embodiments, the first preprocessing region may include a first bending ring. The bending ring may be a structure with a bending portion protruding from a plane connecting two ends of the first preprocessing region with respect to the plane. The first bending ring may be deformed when the mass element 110 vibrates, and the bending portion of the first bending ring may have a tendency to straighten in the vibration process, so that a deformation quantity generated by the first bending ring may be greater than a deformation quantity generated by a non-bending ring region (i.e. the other region other than the bending ring region (e.g., the first bending ring) of the elastic element 120, thereby increasing the total deformation quantity of the elastic element 120 as a whole. In some embodiments, a dimension of the first bending ring after deformation during the vibration may correspond to a component (i.e., the first displacement) of the mass element 110 in the vibration direction of the mass element 110. In the vibration process of the mass element 110, the first bending ring may generate a greater deformation quantity through the straightening tendency of the bending portion, therefore, the first bending ring may make the stress generated in the first preprocessing region more easily dispersed in the first bending ring, so as to avoid the stress concentration in some specific positions and prevent the elastic element 120 from being damaged.

Since the one or more preprocessing regions are more prone to deformation than other regions of the elastic element 120, by disposing the first preprocessing region, a total stiffness of the elastic element 120 may be reduced, and the compliance of the vibration component 100 may be improved. When a mass of the mass element 110 remains unchanged, the resonance peak f0 of the vibration component 100 may be moved forward, thereby improving the low-frequency sensitivity of the vibration component 100.

In some embodiments, a shape of a cross-section of the first bending ring parallel to the vibration direction of the mass element 110 may include but be not limited to one or more of an arc shape, an elliptical arc shape, a polyline shape, a pointed tooth shape, or a square tooth shape.

In some embodiments, the first bending ring may have a first bending direction. The first bending direction may be a direction that is perpendicular to a line segment connecting the two ends of the first bending ring and points toward the bending portion on a projection plane parallel to the vibration direction of the mass element 110. In some embodiments, when the shape of the cross-section of the first bending ring on the projection plane parallel to the vibration direction of the mass element 110 is the arc shape, the first bending direction may be a direction that is perpendicular to a line segment connecting the two ends of the arc and points toward a raised portion of the arc (i.e., the bending portion). In some embodiments, the first bending direction may be parallel to the vibration direction of the mass element. In some embodiments, the first bending direction may be perpendicular to the vibration direction of the mass element. In some embodiments, the first bending direction and the vibration direction of the mass element may form a first angle. More descriptions about the first preprocessing region may be found elsewhere in the present disclosure, e.g., FIGS. 2-10 and the related descriptions thereof.

In some embodiments, the elastic element 120 may further include a second preprocessing region, and the second preprocessing region may be disposed around a periphery of the first preprocessing region. In some embodiments, the second preprocessing region may be directly connected to the first preprocessing region, i.e., a distance between the second preprocessing region and the first preprocessing region may be zero. In some embodiments, the second preprocessing region may also be spaced apart from the first preprocessing region, i.e., there may be a preset distance (e.g., 10 microns, 100 microns) between the second preprocessing region and the first preprocessing region. In some embodiments, the second preprocessing region may provide the mass element 110 with a second displacement along the vibration direction of the mass element 110. The second displacement may be a displacement contributed by the second preprocessing region to the mass element 110 in the vibration direction of the mass element 110 during the vibration.

In some embodiments, the second preprocessing region may be another preprocessed region of the elastic element other than the first preprocessing region. Therefore, when the mass element 110 vibrates and drives the elastic element 120 to move, a deformation quantity generated by the second preprocessing region may be greater than a deformation quantity generated by other regions of the elastic element 120 other than the one or more preprocessing regions (e.g., the first preprocessing region and the second preprocessing region). In some embodiments, the second preprocessing region may have a similar structure to the first preprocessing region.

In some embodiments, the second preprocessing region may include a second bending ring. The second bending ring may be deformed when the mass element 110 vibrates, and the bending portion of the second bending ring may have a tendency to straighten in the vibration process, so that a deformation quantity generated by the second bending ring may be greater than a deformation quantity generated by the non-bending ring region, thereby increasing the total deformation quantity of the elastic element 120 as a whole. A dimension of the second bending ring after deformation during the vibration may correspond to a component (i.e., the second displacement) of the mass element 110 in the vibration direction of the mass element 110. In some embodiments, a shape of a cross-section of the second bending ring parallel to the vibration direction of the mass element 110 may include but be not limited to, one or more of an arc shape, an elliptical arc shape, a polyline shape, a pointed tooth shape, or a square tooth shape.

In some embodiments, the second bending ring may have a second bending direction. The second bending direction may be a direction that is perpendicular to a line segment connecting two ends of the second bending ring and points toward the bending portion on a projection plane parallel to the vibration direction of the mass element 110. In some embodiments, the second bending direction may be the same as or different from (e.g., opposite to, perpendicular to) the first bending direction. The second bending direction being opposite to the first bending direction may mean that a direction in which the bending portion of the first bending ring protrudes is opposite to a direction in which the bending portion of the second bending ring protrudes within a same plane. In some embodiments, when the first bending ring and the second bending ring are smooth curves (curvatures of the curves are not equal to 0, and first derivatives of the curves are continuous), and a center of curvature corresponding to any point of the first bending ring and a center of curvature corresponding to any point of the second bending ring are located on both sides of the elastic element, respectively, the second bending direction may be opposite to the first bending direction. In some embodiments, more descriptions about the second preprocessing region may be found elsewhere in the present disclosure, e.g., FIGS. 11-22 and the related descriptions thereof.

In some embodiments, the elastic member 120 may also include a non-preprocessing region. In some embodiments, when the first preprocessing region is spaced apart from the second preprocessing region, a connection region connecting the first preprocessing region and the second preprocessing region may be a non-preprocessing region. In some embodiments, when the first preprocessing region is spaced apart from the connection region, a region connecting the first preprocessing region and the connection region may be a non-preprocessing region. In some embodiments, when the mass element 110 vibrates, the non-preprocessing region may also deform to provide a displacement for the vibration displacement or vibration amplitude of the mass element 110. In some embodiments, a deformation quantity of the non-preprocessing region may depend on a parameter (e.g., Young's modulus) of the material of the elastic element 120. The displacement provided by the non-preprocessing region when the mass element 110 vibrates may be much smaller than the first displacement or the second displacement. In some embodiments, when the connection region, the first preprocessing region, and the second preprocessing region are all directly connected (not spaced apart), the elastic element 120 may not include the non-preprocessing region.

In some embodiments, the vibration component 100 may further include a supporting element 130. The supporting element 130 may be connected to the first preprocessing region or the second preprocessing region of the elastic element 120 and may be configured to support the elastic element 120. In some embodiments, the supporting element 130 may be stretchable along the vibration direction of the mass element 110, so as to provide the mass element 110 with a third displacement along the vibration direction of the mass element 110 through tensile deformation when the mass element 110 vibrates. The third displacement may be a displacement contributed by the supporting element 130 to the mass element 110 in the vibration direction of the mass element 110 during the vibration.

In some embodiments, a material of the supporting element 130 may include a rigid material, a semiconductor material, an organic polymer material, a rubber-like materials, or the like, or any combination thereof. In some embodiments, the rigid material may include but be not limited to, a metal material, an alloy material, etc. The semiconductor material may include but be not limited to a silicon, a silicon dioxide, a silicon nitride, a silicon carbide, or the like, or any combination thereof. The organic polymer material may include but be not limited to a polyimide (PI), a Parylene, a Polydimethylsiloxane (PDMS), a hydrogel, or the like, or any combination thereof. The rubber-like material may include but be not limited to a gel, a silicone, an acrylic, a polyurethane, a rubber, an epoxy, a hot melt, a light curing, or the like, or any combination thereof. In some embodiments, in order to enhance a connection force between the supporting element 130 and the elastic element 120 and improve the reliability between the supporting element 130 and the elastic element 120, the material of the supporting element 130 may be a silicone adhesive glue, a silicone sealing glue, etc. In some embodiments, a shape of a cross-section of the supporting element 130 parallel to the vibration direction of the mass element 110 may be a regular and/or irregular geometric shape such as a rectangle, a circle, an ellipse, or a pentagon. At the same time, the flexible supporting element 130 may be disposed, which may prevent the elastic element 120 from directly contacting the housing, and reduce the stress concentration (the housing may be generally a rigid body) at a connection end between the elastic element 120 and the housing (or the supporting element 130), thereby further protecting the elastic element 120. Furthermore, the supporting element 130 may be disposed at the same time, which may prevent the elastic element 120 from directly contacting the housing. When acting on the housing, a large external impact may need to go through a substrate and the supporting element 130 to reach the vibrating diaphragm, which may greatly reduce the vibration energy reaching the vibrating diaphragm and greatly improve the impact resistance of the device.

In some embodiments, a cross-section of the supporting element 130 perpendicular to the vibration direction of the mass element 110 may have different cross-sectional areas along the vibration direction of the mass element 110. For example, a bending structure may be disposed on a side surface (also referred to as an inner side surface of the supporting element 130) of the supporting element 130 perpendicular to the vibration direction of the mass element 110 and close to the mass element 110, so that a cross-sectional area of the inner side surface of the supporting element 130 may be larger than a cross-sectional area of an outer side surface (a side surface of the supporting element 130 perpendicular to the vibration direction of the mass element 110 and away from the mass element 110) of the supporting element 130.

In some embodiments, the supporting element 130 may be deformed in response to the vibration signal of the vibration component 100, which may provide the mass element 110 with the third displacement along the vibration direction of the mass element 110, thereby increasing the displacement generated by the mass element 110 in the vibration direction of the mass element 110, further dispersing the stress on the elastic element, and improving the reliability of the vibration component 100. More descriptions about the supporting element 130 may be found elsewhere in the present disclosure, e.g., FIGS. 23-33, and the related descriptions thereof. It should be noted that the supporting element 130 is not a necessary component of the vibration component 100, i.e., the vibration component 100 may not include the supporting element 130.

FIGS. 2-10 are structural diagrams illustrating exemplary vibration components according to some embodiments of the present disclosure.

Figure 2:
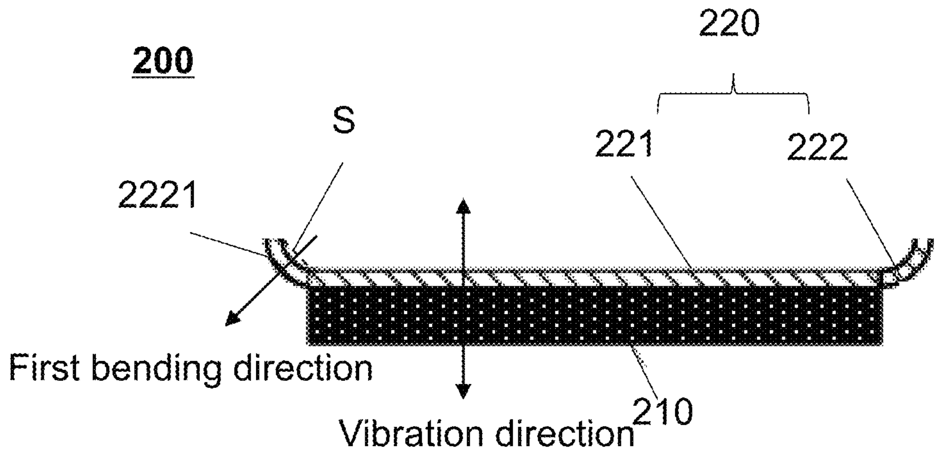
FIG. 2 is a structural diagram illustrating an exemplary vibration component according to some embodiments of the present disclosure.
Figure 3:
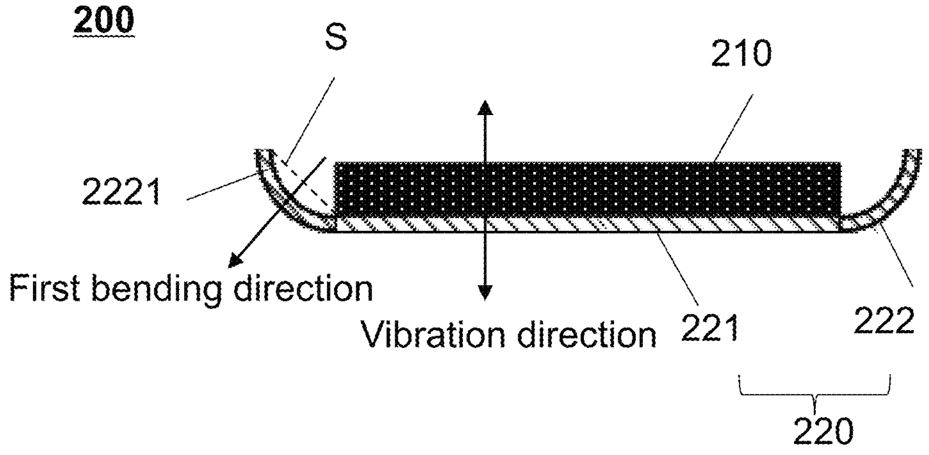
FIG. 3 is a structural diagram illustrating an exemplary vibration component according to some embodiments of the present disclosure.

As shown in FIG. 2, the vibration component 200 may include a mass element 210 and an elastic element 220. In some embodiments, the mass element 210 may be physically connected to the elastic element 220. In some embodiments, as shown in FIG. 2 and FIG. 3, the mass element 210 may be located on any surface of the elastic element 220 perpendicular to a vibration direction of the mass element 210, and a surface of the mass element 210 in contact with the elastic element 220 may be a connection surface. When the vibration component 200 receives a vibration signal, the mass element 210 may vibrate in response to the vibration signal, and the mass element 210 may generate a displacement (i.e., vibration displacement or vibration amplitude) in the vibration direction of the mass element 210.

In some embodiments, the elastic element 220 may include a connection region 221 and a first preprocessing region 222. The connection region 221 may be located in a middle of the elastic element 220 and may be configured to support the mass element 210. The first preprocessing region 222 may be disposed around a periphery of the connection region 221 to provide the mass element 210 with a first displacement along the vibration direction of the mass element 210. In some embodiments, the first preprocessing region 222 may generate a certain degree of deformation along the vibration direction of the mass element 210 in the vibration process, so as to provide the mass element 210 with the first displacement along the vibration direction of the mass element 210, thereby increasing the displacement generated by the mass element 210 in the vibration direction of the mass element 210.

In some embodiments, at least one of a projection of the elastic element 220 or a projection of the mass element 210 along the vibration direction of the mass element 210 may be a regular and/or irregular polygon such as a circle, a rectangle, a rectangle with rounded corners, a pentagon, or a hexagon. A projection of the first preprocessing region 222 of the elastic element 220 along the vibration direction of the mass element 210 may be a regular and/or irregular polygonal ring such as a circular ring, a rectangular ring, a pentagon ring, or a hexagonal ring corresponding to a regular and/or irregular polygon such as a circle, a rectangle, a pentagon, or a hexagon.

In some embodiments, the first preprocessing region 222 may include a first bending ring 2221, and the first bending ring 2221 may have a first bending direction. Referring to FIGS. 2-7, the first bending direction may be a direction that is perpendicular to a line segment S connecting two ends of the first bending ring 2221 and points toward the bending portion on a projection plane parallel to the vibration direction of the mass element 110.

In some embodiments, referring to FIGS. 2-3, the connection region 221 may be connected to any side surface of the mass element 210 that is perpendicular to the vibration direction of the mass element 210, and one end of the first bending ring 2221 may be connected to the connection region 221. The other end of the first bending ring 2221 may protrude beyond the connection surface between the connection region 221 and the mass element 210. In some embodiments, the first bending direction and the vibration direction of the mass element 210 may form a first angle. When the first bending direction and the vibration direction of the mass element 210 form the first angle, the first bending ring 2221 may be deformed in the first bending direction (or in a direction perpendicular to the first bending direction), and the first bending direction (or the direction perpendicular to the first bending direction) may have a certain deformation component in the vibration direction of the mass element 210, and the deformation component may make the first preprocessing region 222 provide the mass element 210 with the first displacement along the vibration direction of the mass element 210.

In some embodiments, the first bending ring 2221 may be an arc-shaped bending ring (e.g., an arc bending ring, an elliptical arc bending ring). In some embodiments, the first bending ring 2221 may also be a curved bending ring (e.g., a parabola bending ring). In some embodiments, the first bending ring 2221 may also be a polyline shape bending ring (e.g., a pointed tooth shape polyline bending ring, a square toothed shape polyline bending ring).

In some embodiments, the greater the first displacement, the greater the deformation quantity provided by the first bending ring 2221. Therefore, the first displacement may reflect the deformation quantity of the first bending ring 2221 through a straightening tendency of the bending portion during the vibration of the vibration component 100. By designing the first bending ring 2221, the elastic element 220 may have a relatively large deformation quantity along the vibration direction of the mass element 210. When the mass element 210 vibrates up and down or is subject to relatively a large impact, the entire bending portion of the first bending ring 2221 may obtain a relatively uniform deformation, which may greatly reduce the stress concentration, thereby improving the reliability of the vibration component 200.

In some embodiments, the first angle between the first bending direction and the vibration direction of the mass element 210 may be in a range of 0°-360°. In some embodiments, the first angle between the first bending direction and the vibration direction of the mass element 210 may be in a range of 0°-180°. In some embodiments, the first angle between the first bending direction and the vibration direction of the mass element 210 may be in a range of 10°-170°. In some embodiments, the first angle formed by the first bending direction and the vibration direction of the mass element 210 may be in a range of 40°-140°. In some embodiments, the first angle between the first bending direction and the vibration direction of the mass element 210 may be in a range of 60-1200.

Figure 4:
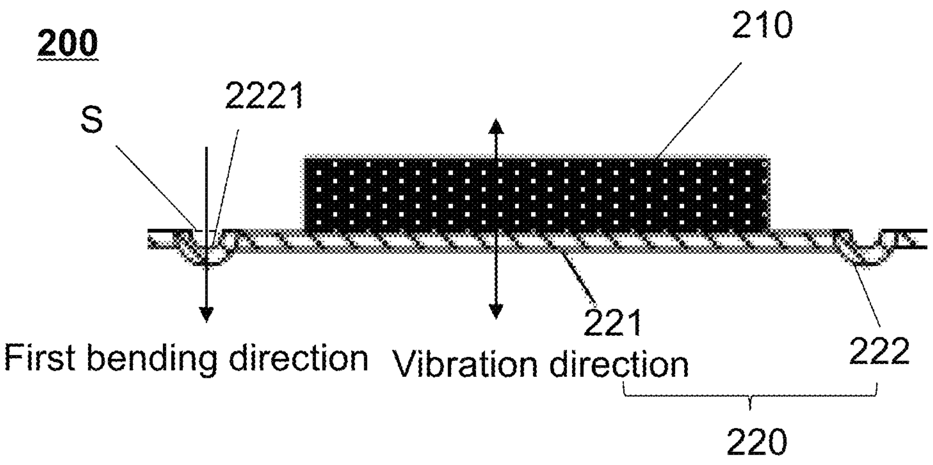
FIG. 4 is a structural diagram illustrating an exemplary vibration component according to some embodiments of the present disclosure.
Figure 5:
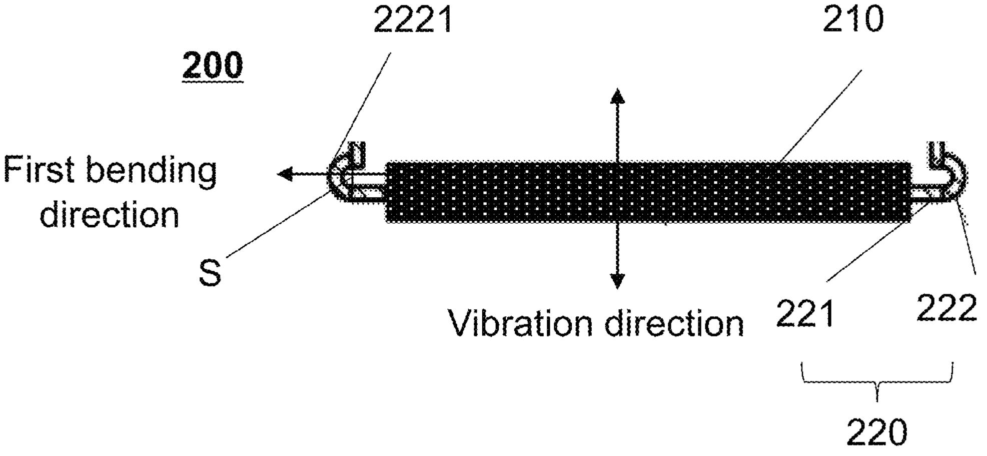
FIG. 5 is a structural diagram illustrating an exemplary vibration component according to some embodiments of the present disclosure.

In some embodiments, referring to FIG. 4, the first bending ring 2221 may be disposed around a circumferential side of the mass element 210 relative to the mass element 210 along a direction perpendicular to the vibration direction of the mass element 210. In some embodiments, the first bending direction and the vibration direction of the mass element 210 may be parallel. When the first bending direction is parallel to the vibration direction of the mass element 210, the first bending ring 2221 may be deformed in the first bending direction, i.e., the first bending ring 2221 may be deformed in the vibration direction of the mass element 210, so that the first preprocessing region 222 may provide the mass element 210 with the first displacement along the vibration direction of the mass element 210. When the first bending direction is parallel to the vibration direction of the mass element 210, the first displacement may be a component of a length of the first preprocessing region 222 (a length connecting two ends of the first preprocessing region 222 on a projection plane parallel to the vibration direction of the mass element 210) after the first preprocessing region 222 is deformed in the vibration direction. According to the Pythagorean theorem, the component may be greater than a change in the length of the first preprocessing region 222 (i.e., the deformation quantity) after deformation of the first preprocessing region 222, i.e., the first bending direction may be disposed parallel to the vibration direction of the mass element 210, which may make the first displacement provided by the first preprocessing region 222 greater than the deformation quantity of the first preprocessing region 222, thereby increasing the vibration displacement or the vibration amplitude of the mass element 210.

In order to ensure a resonance frequency required by the vibration component 200, when an overall dimension of the vibration component 200 is constant, the larger the projection dimension of the mass element 210 along the vibration direction of the mass element 210 is, the better. When the overall dimension of the vibration component 200 is constant, and the larger the projection dimension of the mass element 210 along the vibration direction of the mass element 210 is, the smaller the arrangeable space of the first bending ring 2221 around the mass element 210 is, and further, the smaller the dimension of the first bending ring 2221 is, which may result in an increase in a stiffness of the elastic element 220 and an increase in the resonance frequency of the device. In some embodiments, referring to FIG. 5, the first bending ring 2221 may be disposed on a side surface of the mass element 210 parallel to the vibration direction of the mass element 210. In some embodiments, the first bending direction may be perpendicular to the vibration direction of the mass element 210. In some embodiments, the first bending direction may be perpendicular to the vibration direction of the mass element 210 and away from the mass element 210. When the first bending direction is perpendicular to the vibration direction of the mass element 210, the first bending ring 2221 may be deformed along a direction perpendicular to the first bending direction, i.e., the first bending ring 2221 may be deformed in the vibration direction of the mass element 210, so that the first preprocessing region 222 may provide the mass element 210 with a first displacement along the vibration direction of the mass element 210. When the first bending direction is perpendicular to the vibration direction of the mass element 210, the first displacement may be the change in the length of the first preprocessing region 222 (i.e., deformation quantity) after deformation of the first preprocessing region 222.

Compared with other non-perpendicular arrangements, the first bending direction is perpendicular to the vibration direction of the mass element 210, which may make the first bending ring 2221 have a larger design dimension, thereby greatly improving the deformability of the first bending ring 2221 along the vibration direction of the mass element 210 (i.e., with a larger deformation quantity), greatly reducing the stiffness of the elastic element 220 along the vibration direction of the mass element 210, and at the same time, reducing the projection dimension of the first bending ring 2221 along the vibration direction of the mass element 210.

In some embodiments, in order to improve the deformation quantity of the first bending ring 2221 during the vibration of the mass element 210, referring to FIGS. 2-5, a height dimension of the first bending ring 2221 along the first bending direction may be larger than a length dimension along the direction perpendicular to the first bending direction. In some embodiments, the height dimension of the first bending ring 2221 along the first bending direction may be represented by a maximum value of a distance dimension of the bending portion of the first bending ring 2221 from the line segment S in the first bending direction on the projection plane parallel to the vibration direction of the mass element 210. The length dimension of the first bending ring 2221 along the direction perpendicular to the first bending direction may be represented by a distance dimension (i.e., a length of the line segment S) of a straight line connecting two ends of the first bending ring 2221 on the projection plane parallel to the vibration direction of the mass element 210.

In some embodiments, the height dimension of the first bending ring 2221 along the first bending direction may be greater than the length dimension along the direction perpendicular to the first bending direction, so that the bending portion of the first bending ring 2221 may have a larger unfolded dimension, and the first bending ring 2221 may have a larger deformation quantity when the mass element 210 vibrates, so as to increase the first displacement provided by the first preprocessing region 222 for the mass element 210 along the vibration direction of the mass element 210.

In some embodiments, the height dimension of the first bending ring 2221 along the first bending direction may be in a range of 20 um-1200 um. In some embodiments, the height dimension of the first bending ring 2221 along the first bending direction may be in a range of 50 um-800 um. In some embodiments, the height dimension of the first bending ring 2221 along the first bending direction may be in a range of 100 um-600 um. In some embodiments, the height dimension of the first bending ring 2221 along the first bending direction may be in a range of 300 um-600 um. In some embodiments, the length dimension of the first bending ring 2221 along the direction perpendicular to the first bending direction may be in a range of 50 um-1200 um. In some embodiments, the length dimension of the first bending ring 2221 along the direction perpendicular to the first bending direction may be in a range of 100 um-1000 um. In some embodiments, the length dimension of the first bending ring 2221 along the direction perpendicular to the first bending direction may be in a range of 100 um-800 um. In some embodiments, the length dimension of the first bending ring 2221 along the direction perpendicular to the first bending direction may be in a range of 100 um-600 um. In some embodiments, a ratio of the height dimension of the first bending ring 2221 along the first bending direction to the length dimension of the first bending ring 2221 along the direction perpendicular to the first bending direction may be in a range of 1:10-10:1. In some embodiments, the ratio of the height dimension of the first bending ring 2221 along the first bending direction to the length dimension of the first bending ring 2221 along the direction perpendicular to the first bending direction may be in a range of 1:5-8:1. In some embodiments, the ratio of the height dimension of the first bending ring 2221 along the first bending direction to the length dimension of the first bending ring 2221 along the direction perpendicular to the first bending direction may be in a range of 3:10-5:1.

In some embodiments, when the first bending ring 2221 is disposed in different ways, the height dimension of the first bending ring 2221 along the first bending direction and the length dimension of the first bending ring 2221 along the direction perpendicular to the first bending direction may be different.

In some embodiments, one end of the first bending ring 2221 may be connected to the mass element 210, and the other end of the first bending ring 2221 may be bent along the vibration direction of the mass element 210 and protrude beyond a surface of the mass element 210 along the direction. In this arrangement, referring to FIGS. 2-3, the height dimension of the first bending ring 2221 along the first bending direction may be in a range of 20 um-600 um. In some embodiments, referring to FIGS. 2-3, in this arrangement, the height dimension of the first bending ring 2221 along the first bending direction may be in a range of 300 um-800 um. In some embodiments, referring to FIGS. 2-3, in this arrangement, the length dimension of the first bending ring 2221 along the direction perpendicular to the first bending direction may be in a range of 50 um-800 um. In some embodiments, referring to FIGS. 2-3, in this arrangement, the length dimension of the first bending ring 2221 along the direction perpendicular to the first bending direction may be in a range of 50 um-1000 um. In some embodiments, referring to FIGS. 2-3, in this setting mode, a ratio of the height dimension of the first bending ring 2221 along the first bending direction to the length dimension of the first bending ring 2221 along the direction perpendicular to the first bending direction may be in a range of 1:10-10:1. In some embodiments, referring to FIGS. 2-3, in this arrangement, the ratio of the height dimension of the first bending ring 2221 along the first bending direction to the length dimension of the first bending ring 2221 along the direction perpendicular to perpendicular to the first bending direction may be in a range of 3:10-10:3.

In some embodiments, the first bending ring 2221 may be disposed on a periphery of the mass element 210 relative to the mass element 210 along the vibration direction perpendicular to the mass element 210. In this arrangement, referring to FIG. 4, the height dimension of the first bending ring 2221 along the first bending direction may be in a range of 50 um-600 um. In some embodiments, referring to FIG. 4, the height dimension of the first bending ring 2221 along the first bending direction may be in a range of 100 um-500 um. In some embodiments, referring to FIG. 4, the length dimension of the first bending ring 2221 along the first bending direction may be in a range of 100 um-1200 um. In some embodiments, referring to FIG. 4, the length dimension of the first bending ring 2221 along the direction perpendicular to the first bending direction may be in a range of 300 um-800 um. In some embodiments, referring to FIG. 4, a ratio of the height dimension of the first bending ring 2221 along the first bending direction to the length dimension of the first bending ring 2221 along the direction perpendicular to the first bending direction may be in a range of 0.2:1-5:1. In some embodiments, referring to FIG. 4, the ratio of the height dimension of the first bending ring 2221 along the first bending direction to the length dimension of the first bending ring 2221 along the direction perpendicular to the first bending direction may be in a range of 0.2:1-1:1. In some embodiments, referring to FIG. 4, the ratio of the height dimension of the first bending ring 2221 along the first bending direction to the length dimension of the first bending ring 2221 along the direction perpendicular to the first bending direction may be in a range of 1:1-5:1.

In some embodiments, the first bending ring 2221 may be disposed on one side of the mass element 210 relative to the mass element 210 along the vibration direction of the mass element 210. In this arrangement, referring to FIG. 5, the height dimension of the first bending ring 2221 along the first bending direction may be in a range of 50 um-600 um. In some embodiments, referring to FIG. 5, the height dimension of the first bending ring 2221 along the first bending direction may be in a range of 100 um-500 um. In some embodiments, referring to FIG. 5, the length dimension of the first bending ring 2221 along the direction perpendicular to the first bending direction may be in a range of 100 um-1200 um. In some embodiments, referring to FIG. 5, the length dimension of the first bending ring 2221 along the direction perpendicular to the first bending direction may be in a range of 300 um-800 um. In some embodiments, referring to FIG. 5, a ratio of the height dimension of the first bending ring 2221 along the first bending direction to the length dimension of the first bending ring 2221 along the direction perpendicular to the first bending direction may be in a range of 0.2:1-5:1. In some embodiments, referring to FIG. 5, the ratio of the height dimension of the first bending ring 2221 along the first bending direction to the length dimension of the first bending ring 2221 along the direction perpendicular to the first bending direction may be in a range of 0.2:1-1:1. In some embodiments, referring to FIG. 5, the ratio of the height dimension of the first bending ring 2221 along the first bending direction to the length dimension of the first bending ring 2221 along the direction perpendicular to the first bending direction may be in a range of 1:1-5:1.

In some embodiments, a ratio of a dimension of the first bending ring 2221 along a direction perpendicular to the vibration direction of the mass element 210 to a length dimension of the mass element 210 along the direction perpendicular to the vibration direction of the mass element 210 may be in a range of 1:100-1:1. In some embodiments, the ratio of the dimension of the first bending ring 2221 along the direction perpendicular to the vibration direction of the mass element 210 to the length dimension of the mass element 210 along the direction perpendicular to the vibration direction of the mass element 210 may be in a range of 1:50-1:2.5. In some embodiments, the ratio of the dimension of the first bending ring 2221 along the direction perpendicular to the vibration direction of the mass element 210 to the length dimension of the mass element 210 along the direction perpendicular to the vibration direction of the mass element 210 may be in a range of 1:50-1:5. In some embodiments, the ratio of the dimension of the first bending ring 2221 along the direction perpendicular to the vibration direction of the mass element 210 to the length dimension of the mass element 210 along the direction perpendicular to the vibration direction of the mass element 210 may be in a range of 1:40-1:5. In some embodiments, the ratio of the dimension of the first bending ring 2221 along the direction perpendicular to the vibration direction of the mass element 210 to the length dimension of the mass element 210 along the direction perpendicular to the vibration direction of the mass element 210 may be in a range of 1:30-1:5. In some embodiments, the ratio of the dimension of the first bending ring 2221 along the direction perpendicular to the vibration direction of the mass element 210 to the length dimension of the mass element 210 along the direction perpendicular to the vibration direction of the mass element 210 may be in a range of 1:20-1:5. In some embodiments, the dimension of the first bending ring 2221 along the direction perpendicular to the vibration direction of the mass element 210 may be the length dimension of the first bending ring 2221 along the direction perpendicular to the first bending direction. In some embodiments, the dimension of the first bending ring 2221 along the direction perpendicular to the vibration direction of the mass element 210 may also be the height dimension of the first bending ring 2221 along the first bending direction.

In some embodiments, the first bending ring 2221 may be disposed on the periphery of the mass element 210 relative to the mass element 210 along the direction perpendicular to the vibration direction of the mass element 210, and the first bending direction of the first bending ring 2221 may be parallel to the vibration direction of the mass element 210. In this arrangement, referring to FIG. 4, a ratio of the length dimension of the first bending ring 2221 along the direction perpendicular to the first bending direction to a length dimension of the mass element 210 along the direction perpendicular to the vibration direction of the mass element 210 may be in a range of 1:50-1:2.5. In some embodiments, referring to FIG. 4, the ratio of the length dimension of the first bending ring 2221 along the direction perpendicular to the first bending direction to the length dimension of the mass element 210 along the direction perpendicular to the vibration direction of the mass element 210 may be in a range of 1:50-1:5. In some embodiments, referring to FIG. 4, the ratio of the length dimension of the first bending ring 2221 along the direction perpendicular to the first bending direction to the length dimension of the mass element 210 along the direction perpendicular to the vibration direction of the mass element 210 may be in a range of 1:40-1:5. In some embodiments, referring to FIG. 4, the ratio of the length dimension of the first bending ring 2221 along the direction perpendicular to the first bending direction to the length dimension of the mass element 210 along the direction perpendicular to the vibration direction of the mass element 210 may be in a range of 1:30-1:5. In some embodiments, referring to FIG. 4, the ratio of the length dimension of the first bending ring 2221 along the direction perpendicular to the first bending direction to the length dimension of the mass element 210 along the direction perpendicular to the vibration direction of the mass element 210 may be in a range of 1:20-1:5.

In some embodiments, the first bending ring 2221 may be disposed on the side surface of the mass element 210 parallel to the vibration direction of the mass element 210, and the first bending direction of the first bending ring 2221 may be perpendicular to the vibration direction of the mass element 210. In this arrangement, referring to FIG. 5, a ratio of the height dimension of the first bending ring 2221 along the first bending direction to the length dimension of the mass element 210 along the direction perpendicular to the vibration direction of the mass element 210 may be in a range of 1:50-1:2.5. In some embodiments, referring to FIG. 5, the ratio of the height dimension of the first bending ring 2221 along the first bending direction to the length dimension of the mass element 210 along the direction perpendicular to the vibration direction of the mass element 210 may be in a range of 1:50-1:5. In some embodiments, referring to FIG. 5, the ratio of the height dimension of the first bending ring 2221 along the first bending direction to the length dimension of the mass element 210 along the direction perpendicular to the vibration direction of the mass element 210 may be in a range of 1:40-1:5. In some embodiments, referring to FIG. 5, the ratio of the height dimension of the first bending ring 2221 along the first bending direction to the length dimension of the mass element 210 along the vibration direction perpendicular to the mass element 210 may be in a range of 1:30-1:5. In some embodiments, referring to FIG. 5, the ratio of the height dimension of the first bending ring 2221 along the first bending direction to the length dimension of the mass element 210 along the direction perpendicular to the vibration direction of the mass element 210 may be in a range of 1:20-1:5.

Figure 6:
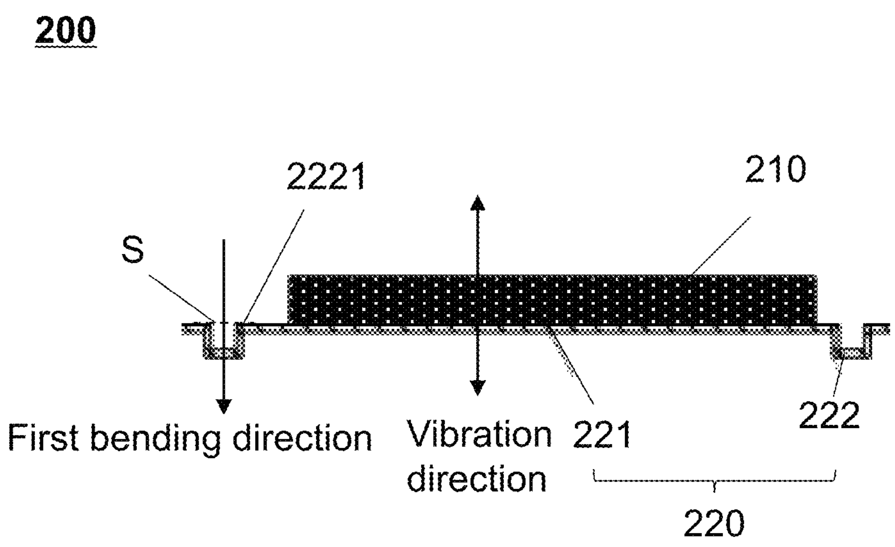
FIG. 6 is a structural diagram illustrating an exemplary vibration component according to some embodiments of the present disclosure.
Figure 7:
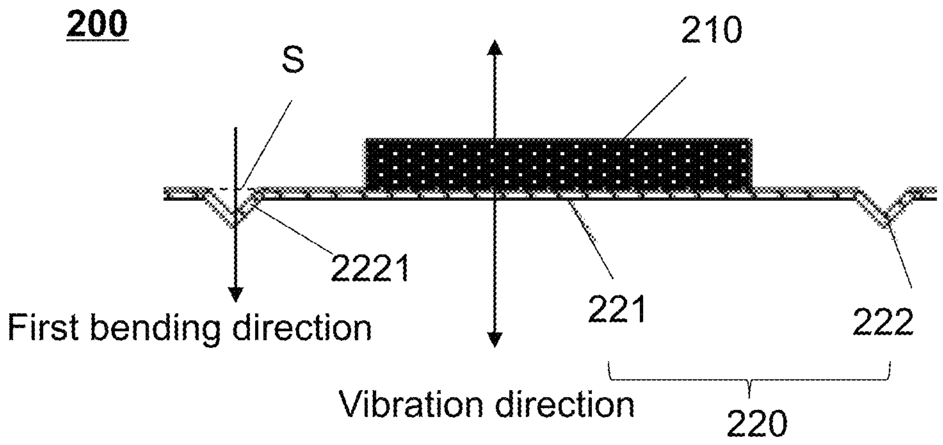
FIG. 7 is a structural diagram illustrating an exemplary vibration component according to some embodiments of the present disclosure.

In some embodiments, referring to FIGS. 2-7, a shape of a cross-section of the first bending ring 2221 parallel to the vibration direction of the mass element 210 may include but be not limited to, one or more of an arc shape, an elliptical arc shape, a polyline shape, a pointed tooth shaped, or a square tooth shape. For example, as shown in FIGS. 2-5, the shape of the cross-section of the first bending ring 2221 parallel to the vibration direction of the mass element 210 may be the arc shape. As another example, as shown in FIG. 6, the shape of the cross-section of the first bending ring 2221 parallel to the vibration direction of the mass element 210 may be the square tooth shape. As yet another example, as shown in FIG. 7, the shape of the cross-section of the first bending ring 2221 parallel to the vibration direction of the mass element 210 may be the pointed tooth shape.

In some embodiments, in the vibration direction of the mass element 210, the first bending rings 2221 with different shapes of cross-sections may have different deformability, so that the first preprocessing region 222 may provide the mass element 210 with different first displacements along the vibration direction of the mass element 210. In some embodiments, according to a requirement that the first preprocessing region 222 provides the mass element 210 with the first displacement along the vibration direction of the mass element 210, the shape of the cross-section of the first bending ring 2221 may be set accordingly, which is not particularly limited in the embodiment.

Figure 8:
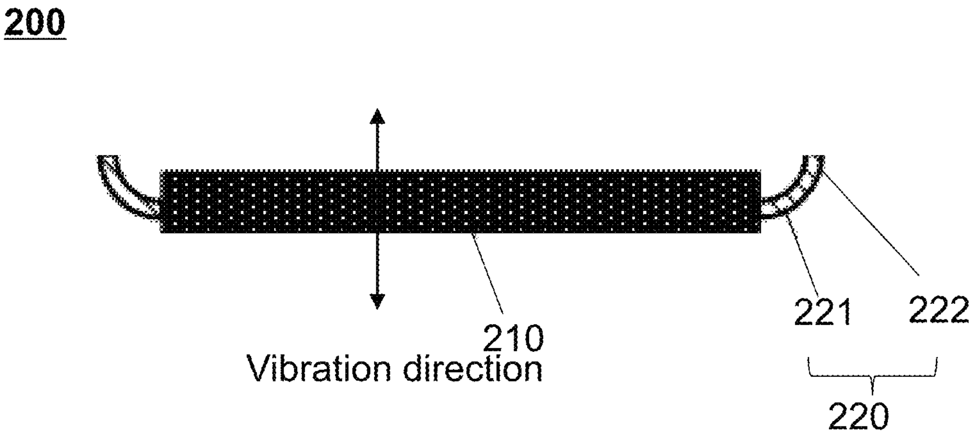
FIG. 8 is a structural diagram illustrating an exemplary vibration component according to some embodiments of the present disclosure.
Figure 9:
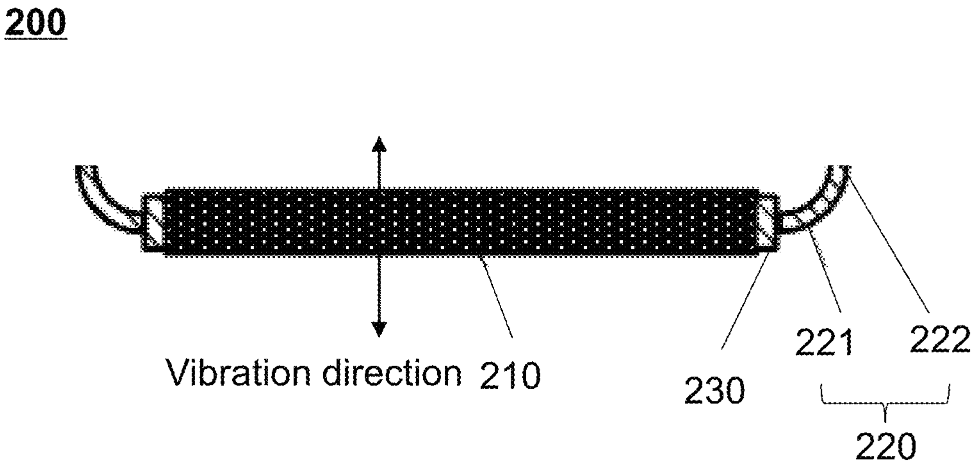
FIG. 9 is a structural diagram illustrating an exemplary vibration component according to some embodiments of the present disclosure.

In some embodiments, referring to FIGS. 8-9, the connection region 221 of the elastic element 220 may encircle a sidewall of the mass element 210 and may be mechanically connected to the sidewall of the mass element 210. Specifically, the mass element 210 may be located in a middle of the elastic element 220, and the sidewall of the mass element 210 may be encircled by the connection region 221 of the elastic element 220 and may be mechanically connected to the connection region 221 of the elastic element 220. In some embodiments, the connection region 221 of the elastic element 220 may encircle the sidewall of the mass element 210 and may be mechanically connected to the sidewall of the mass element 210, which may prevent the elastic element 220 from being connected to a sharp edge of the mass element 210, thereby reducing the stress concentration on a connection edge of the elastic element 220, reducing the possibility of damage to the elastic element 220 when it is impacted by external vibration, and improving the reliability of the vibration component 200.

In some embodiments, referring to FIG. 9, the elastic element 220 may also be indirectly connected to the mass element 210. As shown in FIG. 9, the vibration component 200 may include a connection block 230 located between the mass element 210 and the elastic element 220. The connection region 221 of the elastic element 220 may encircle the sidewall of the mass element 210 and may be mechanically connected to the sidewall of the mass element 210 through the connection block 230. In some embodiments, the connection block 230 may be made of a same material as the elastic element 220. In some embodiments, the connection block 230 may increase a connection area between the connection region 221 and the sidewall of the mass element 210, thereby further reducing the stress concentration on the elastic element 220, increasing the adhesive force, and improving the reliability of the vibration component 200.

In some embodiments, when a connection position of the connection region 221 on the sidewall of the mass element 210 is different, the length of the first bending ring 2221 of the first preprocessing region 222, the height dimension of the first bending ring 2221 along the first bending direction, and the length dimension of the first bending ring 2221 along the direction perpendicular to the first bending direction may also be different, so as to change the deformation of the first bending ring 2221 in the vibration direction of the mass element 210, thereby affecting the first displacement provided by the first preprocessing region 222 for the mass element 210 along the vibration direction of the mass element 210. On the other hand, the connection position of the connection region 221 on the sidewall of the mass element 210 is different, which may also affect (increase or decrease) the stiffness of the vibration component 200, thereby affecting the resonance frequency and sensitivity of the vibration component 200.

In some embodiments, the connection position of the connection region 221 on the sidewall of the mass element 210 may deviate from a midline on the sidewall. The midline may be a line connecting midpoints on the sidewall along the vibration direction of the mass element 210. For example, the connection position of the connection region 221 on the sidewall of the mass element 210 may be close to any surface of the mass element 210 perpendicular to the vibration direction. In some embodiments, the connection position of the connection region 221 on the sidewall of the mass element 210 may also be located on the midline on the sidewall, i.e., a distance between the connection position of the connection region 221 on the sidewall of the mass element 210 and an upper surface of the mass element 210 may be equal to a distance between the connection position of the connection region 221 on the sidewall of the mass element 210 and a lower surface of the mass element 210.

For the convenience of description, the distance between the connection position of the connection region 221 on the sidewall of the mass element 210 and the upper surface of the mass element 210 may simply be referred to as a first connection distance. The distance between the connection position of the connection region 221 on the sidewall of the mass element 210 and the lower surface of the mass element 210 may be simply referred to as a second connection distance. In some embodiments, a ratio of the first connection distance to the second connection distance may be in a range of 1:10-10:1. In some embodiments, the ratio of the first connection distance to the second connection distance may be in a range of 1:5-8:1. In some embodiments, the ratio of the first connection distance to the second connection distance may be in a range of 1:3-6:1.

In some embodiments, according to different requirements of the vibration component 200 (e.g., a requirement that the first preprocessing region 222 provides the mass element 210 with the first displacement along the vibration direction of the mass element 210, a resonance frequency requirement of the vibration component 200, or a sensitivity requirement of the vibration component 200), corresponding connection positions may be set, which are not specifically limited in the embodiment of the present disclosure.

Figure 10:
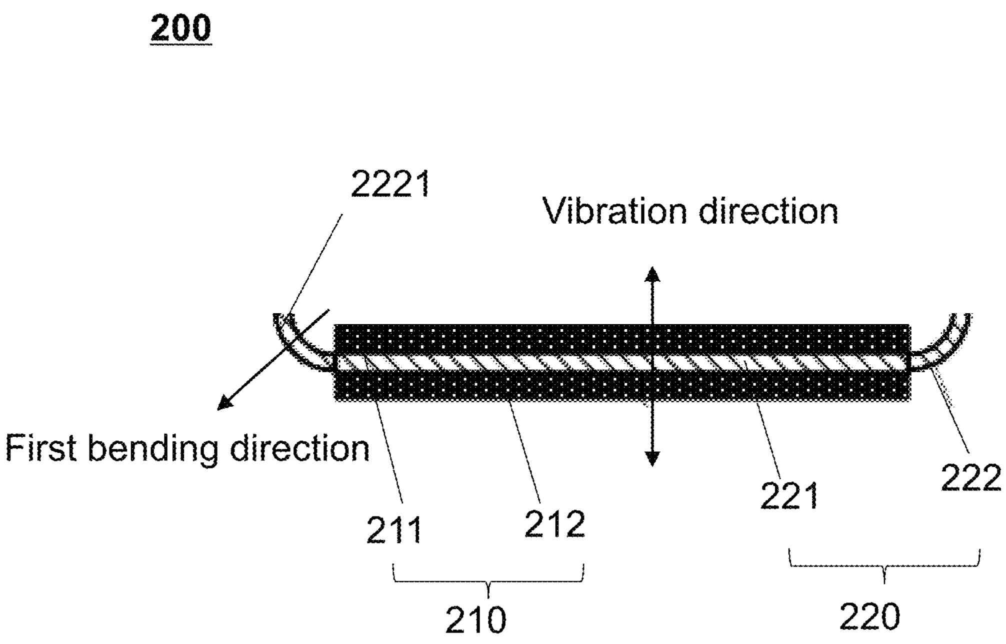
FIG. 10 is a structural diagram illustrating an exemplary vibration component according to some embodiments of the present disclosure.
Figure 11:
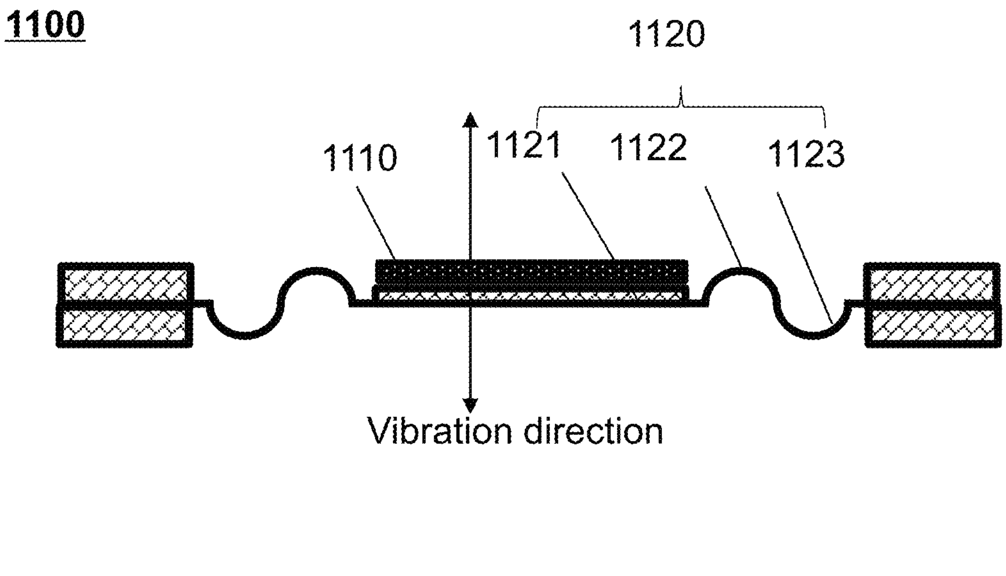
FIG. 11 is a structural diagram illustrating an exemplary vibration component according to some embodiments of the present disclosure.

In some embodiments, referring to FIG. 10, the mass element 210 may include a first mass element 211 and a second mass element 212, and the first mass element 211 and the second mass element 212 may be connected to two side surfaces of the connection region 221 perpendicular to the vibration direction of the mass element 210, respectively, so that the connection region 221 may be located between the first mass element 211 and the second mass element 212.

In some embodiments, a thickness of the first mass element 211 and a thickness of the second mass element 212 may affect a length of the first preprocessing region 222, the height dimension of the first bending ring 2221 along the first bending direction, and the length dimension of the first bending ring 2221 along the direction perpendicular to the first bending direction, so as to change the deformation of the first preprocessing region 222 in the vibration direction of the mass element 210, thereby affecting the first displacement provided by the first preprocessing region 222 for the mass element 210 along the vibration direction of the mass element 210. On the other hand, the thickness of the first mass element 211 may be different from that of the second mass element 212, which may also affect (increase or decrease) the stiffness of the vibration component 200, thereby affecting the resonance frequency and sensitivity of the vibration component 200.

In some embodiments, the thickness of the first mass element 211 and the thickness of the second mass element 212 along the vibration direction of the mass element 210 may be the same or different. The thickness of the first mass element 211 and the thickness of the second mass element 212 may be correspondingly set according to the requirement (e.g., resonance frequency or sensitivity) of the vibration component 200, respectively.

FIGS. 11-22 are structural diagrams illustrating exemplary vibration components according to some embodiments of the present disclosure.

In some embodiments, one or more elements (e.g., a mass element 1110, a connection region 1121, or a first preprocessing region 1122) of the vibration component 1100 may be the same as or similar to one or more elements (e.g., the mass element 210, the connection region 221, or the first preprocessing region 222) of the vibration component 200 shown in FIGS. 2-10. That is, the vibration component 1100 may include the mass element 1110, the connection region 1121, and the first preprocessing region 1122. A difference from the vibration component 200 may be that the elastic element 1120 of the vibration component 1100 may further include a second preprocessing region 1123. The second preprocessing region 1123 may provide the mass element 1110 with a second displacement along a vibration direction of the mass element 1110. The second displacement may be a displacement contributed by the second preprocessing region 1123 to the mass element 1110 in the vibration direction of the mass element 1110 during the vibration.

In some embodiments, the second preprocessing region 1123 of the elastic element 1120 may be disposed to provide the mass element 1110 with the second displacement along the vibration direction of the mass element 1110, thereby further increasing the vibration displacement or the vibration amplitude (including a first displacement and the second displacement) of the mass element 1110 along the vibration direction of the mass element 1110. Moreover, since the first preprocessing region 1122 and the second preprocessing region 1123 are more prone to deformation than other regions of the elastic element 1120, a deformation quantity generated by the first preprocessing region 1122 and the second preprocessing region 1123 may be greater than a deformation quantity generated by other regions other than the preprocessing regions of the elastic element 1120. Therefore, during the vibration of the mass element 1110, the stress generated in the first preprocessing region 1122 and the second preprocessing region 1123 may be more easily to be dispersed throughout the first preprocessing region 1122 and the second preprocessing region 1123, so that the stress concentration at some specific positions may be avoided, and the elastic element 1120 may be prevented from being damaged. In some embodiments, the vibration displacement or the vibration amplitude of the mass element 1110 in the vibration direction may be increased, so that when the vibration component 1100 is subjected to a relatively large external vibration, the first preprocessing region 1122 and the second preprocessing region 1123 may store vibration shock energy in the form of deformation energy in the first preprocessing region 1122 and the second preprocessing region 1123, respectively through deformations. The first preprocessing region 1122 and the second preprocessing region 1123 may perform a plurality of damping attenuation movements, thereby dispersing the relatively large vibration shock energy through the damping movements, preventing the vibration component 1100 (especially, the elastic element 1120) from being damaged when receiving external vibration, and improving the reliability of the vibration component 1100.

In some embodiments, the first displacement provided by the first preprocessing region 1122 for the mass element 1110 along the vibration direction of the mass element 1110 may be the same as or different from the second displacement provided by the second preprocessing region 1123 for the mass element 1110 along the vibration direction of the mass element 1110. In some embodiments, a ratio of the first displacement to the second displacement may be in a range of 1:20-50:1. In some embodiments, the ratio of the first displacement to the second displacement may be in a range of 1:10-10:1. In some embodiments, the ratio of the first displacement to the second displacement may be in a range of 1:2-5:1.

In some embodiments, the second preprocessing region 1123 may be disposed around a periphery of the first preprocessing region 1122. In some embodiments, a circumferential side of the second preprocessing region 1123 may encircle a circumferential side of the first preprocessing region 1122 and may be mechanically connected to the circumferential side of the first preprocessing region 1122. In some embodiments, projections of the connection region 1121, the first preprocessing region 1122, and the second preprocessing region 1123 of the elastic element 1120 along the vibration direction of the mass element 1110 may be disposed sequentially from inside to outside. In some embodiments, projections of the elastic element 1120 and the mass element 1110 along the vibration direction of the mass element 1110 may be a regular and/or irregular polygon such as a circle, a rectangle, a pentagon, or a hexagon. The projection of the second preprocessing region 1123 along the vibration direction of the mass element 1110 may be a regular and/or irregular polygonal ring such as a circular ring, a rectangular ring, or a pentagonal ring corresponding to a regular and/or irregular polygon such as a circle, a rectangle, a pentagon, or a hexagon.

Figure 12:
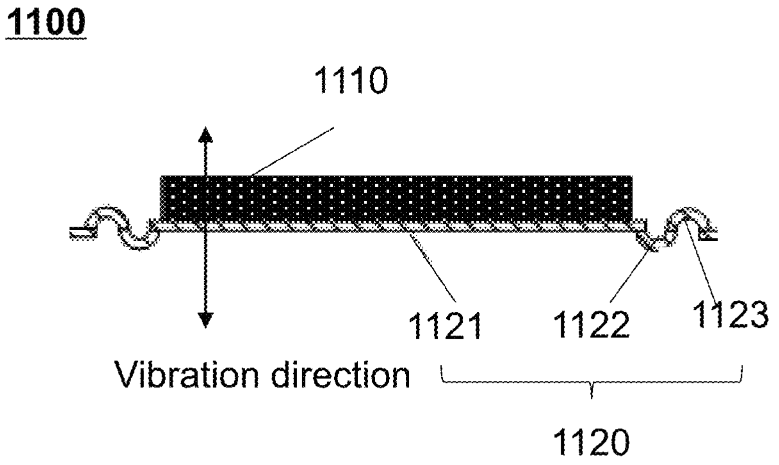
FIG. 12 is a structural diagram illustrating an exemplary vibration component according to some embodiments of the present disclosure.
Figure 13:
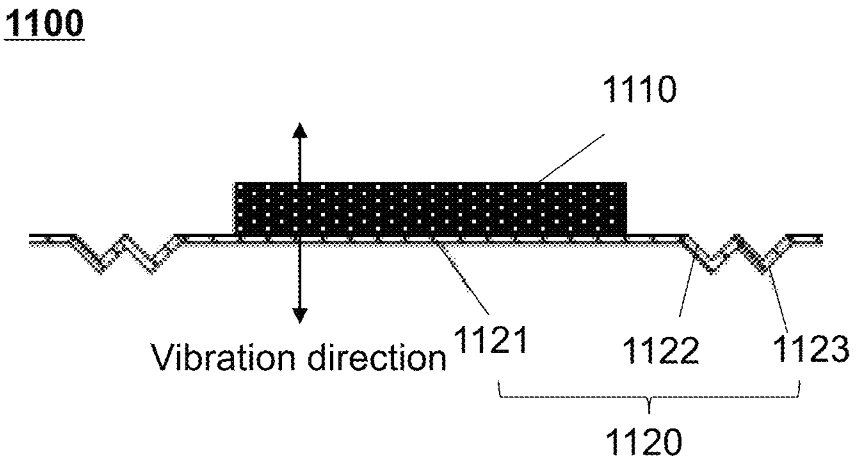
FIG. 13 is a structural diagram illustrating an exemplary vibration component according to some embodiments of the present disclosure.

In some embodiments, referring to FIGS. 12-13, the second preprocessing region 1123 may be directly connected to the first preprocessing region 1122, i.e., a distance between the second preprocessing region 1123 and the first preprocessing region 1122 may be zero. The second preprocessing region 1123 may be directly connected to the first preprocessing region 1122, which may also be understood that the circumferential side (the circumferential side close to the first preprocessing region 1122) of the second preprocessing region 1123 may be directly connected to the circumferential side (the circumferential side close to the second preprocessing region 1123) of the first preprocessing region 1122.

Figure 14:
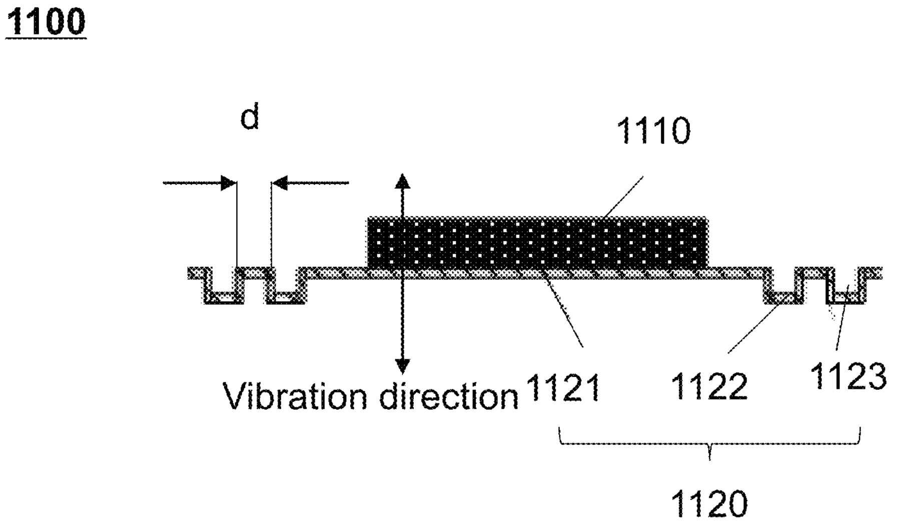
FIG. 14 is a structural diagram illustrating an exemplary vibration component according to some embodiments of the present disclosure.
Figure 15:
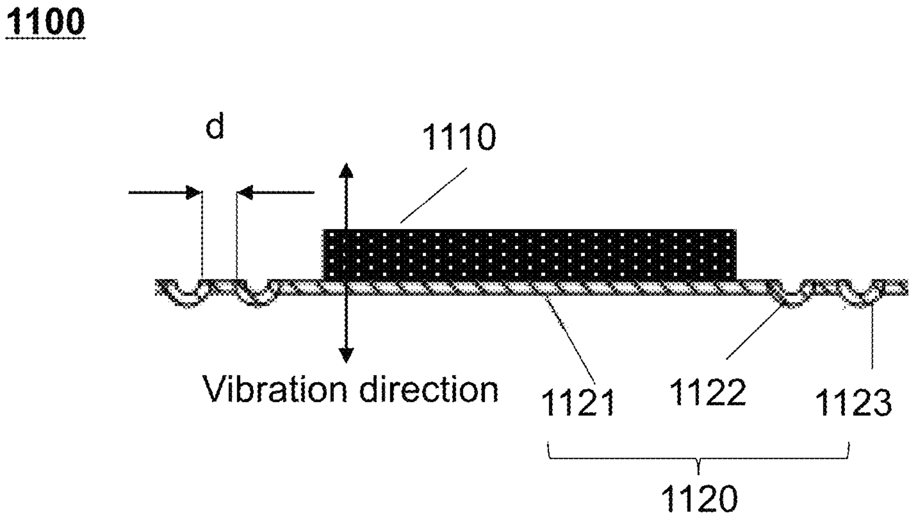
FIG. 15 is a structural diagram illustrating an exemplary vibration component according to some embodiments of the present disclosure.

In some embodiments, referring to FIGS. 14-15, the second preprocessing region 1123 may also be spaced apart from the first preprocessing region 1122, i.e., there may be a specific distance d between the second preprocessing region 1123 and the first preprocessing region 1122. The specific distance d may be a distance between the circumferential side of the second preprocessing region 1123 (the circumferential side close to the first preprocessing region 1122) and the circumferential side of the first preprocessing region 1122 (the circumferential side close to the second preprocessing region 1123). In some embodiments, the circumferential side of the second preprocessing region 1123 and the circumferential side of the first preprocessing region 1122 may be connected by a non-preprocessing region. In some embodiments, a width of a projection of the non-preprocessing region on a plane perpendicular to the vibration direction of the mass element 1110 may be d.

In some embodiments, the second preprocessing region 1123 may be directly connected to or spaced apart from the first preprocessing region 1122, which may adjust the deformability of the second preprocessing region 1123 and the deformability of the first preprocessing region 1122, thereby adjusting the second displacement provided by the second preprocessing region 1123 for the mass element 1110 along the vibration direction of the mass element 1110 and the first displacement provided by the first preprocessing region 1122 for the mass element 1110 along the vibration direction of the mass element 1110. On the other hand, the second preprocessing region 1123 may be directly connected to or spaced apart from the first preprocessing region 1122, which may also adjust the stiffness of the elastic element 1120. In some embodiments, when the second preprocessing region 1123 is directly connected to the first preprocessing region 1122, the stiffness of the elastic element 1120 may be smaller than the stiffness when the second preprocessing region 1123 is spaced apart from the first preprocessing region 1122. In some embodiments, by setting the connection manner between the second preprocessing region 1123 and the first preprocessing region 1122, the resonance frequency and sensitivity of the vibration component 1100 may be adjusted.

In some embodiments, the specific distance d between the second preprocessing region 1123 and the first preprocessing region 1122 may be in a range of 0 um-500 um. In some embodiments, the specific distance d between the second preprocessing region 1123 and the first preprocessing region 1122 may be in a range of 0 um-300 um. In some embodiments, the specific distance d between the second preprocessing region 1123 and the first preprocessing region 1122 may be in a range of 0 um-100 um.

In some embodiments, referring to FIGS. 16-19, the second preprocessing region 1123 may include a second bending ring 11231. The second bending ring 11231 may have a second bending direction. The second bending direction may be a direction that is perpendicular to a plane connecting two endpoints of the second bending ring 11231 and points toward a bending portion.

In some embodiments, a shape of a cross-section of the second bending ring 11231 parallel to the vibration direction of the mass element 1110 may include but be not limited to, one or more of an arc shape (e.g., FIG. 12), an elliptical arc shape, a polyline shape, a pointed tooth shape (e.g., FIG. 13), or a square tooth shape (e.g., FIG. 14). In some embodiments, in the vibration direction of the mass element 1110, the second bending rings 11231 with different shapes of cross-sections may have different deformability, so that the second preprocessing region 1123 may provide the mass element 1110 with different second displacements along the vibration direction of the mass element 1110. In some embodiments, the larger the second displacement is, the greater the deformation quantity provided by the second bending ring 11231 may be. Therefore, the second displacement may reflect the deformation quantity generated through a straightening tendency of the bending portion during the vibration of the vibration component 1100. In some embodiments, according to a requirement that the second preprocessing region 1123 provides the mass element 1110 with the second displacement along the vibration direction of the mass element 1110, the shape of the cross-section of the second bending ring 11231 may be set accordingly, which is not specifically limited in the embodiment.

Figure 16:
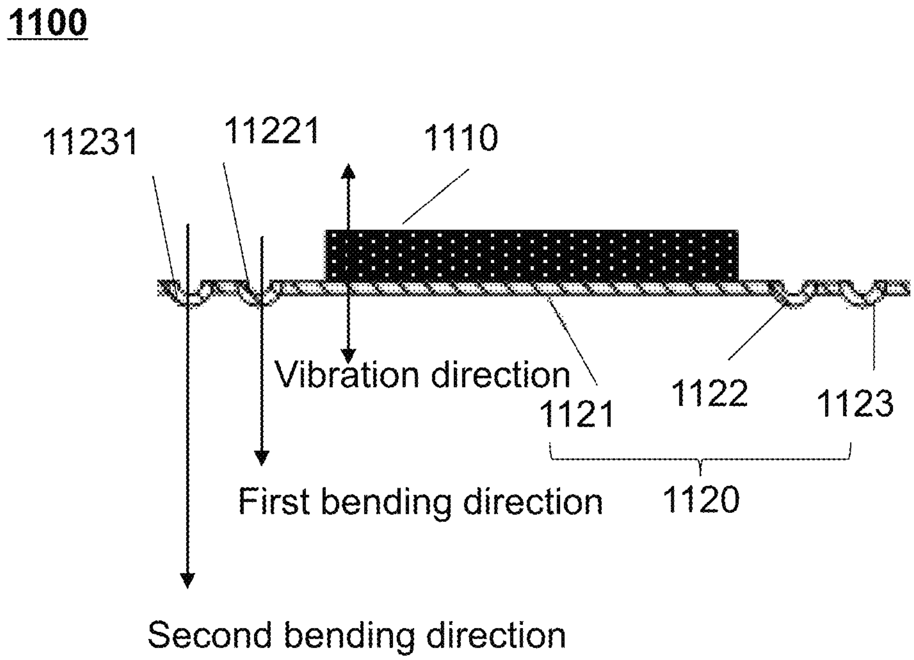
FIG. 16 is a structural diagram illustrating an exemplary vibration component according to some embodiments of the present disclosure.

In some embodiments, referring to FIG. 16, a first bending direction of the first bending ring 11221 and the second bending direction of the second bending ring 11231 may be the same. In some embodiments, referring to FIGS. 17-19, the first bending direction of the first bending ring 11221 may be different from the second bending direction of the second bending ring 11231. In some embodiments, when the first bending ring and the second bending ring are smooth curves (curvatures of the curves are not equal to 0, and first derivatives of the curves are continuous), and when the first bending direction of the first bending ring 11221 is the same as that of the second bending ring, a center of curvature corresponding to a point on the first bending ring 11221 and a center of curvature corresponding to a point on the second bending ring 11231 may be located on a same side of the elastic element 1120 in the vibration direction of the mass element 1110. In some embodiments, when the first bending ring and the second bending ring are smooth curves (curvatures of the curves are not equal to 0, and first derivatives of the curves are continuous), and when the first bending direction of the first bending ring 11221 is different from that of the second bending ring, the center of curvature corresponding to a point on the first bending ring 11221 and the center of curvature corresponding to a point on the second bending ring 11231 may be respectively located on both sides of the elastic element 1120 in the vibration direction of the mass element 1110.

Figure 17:
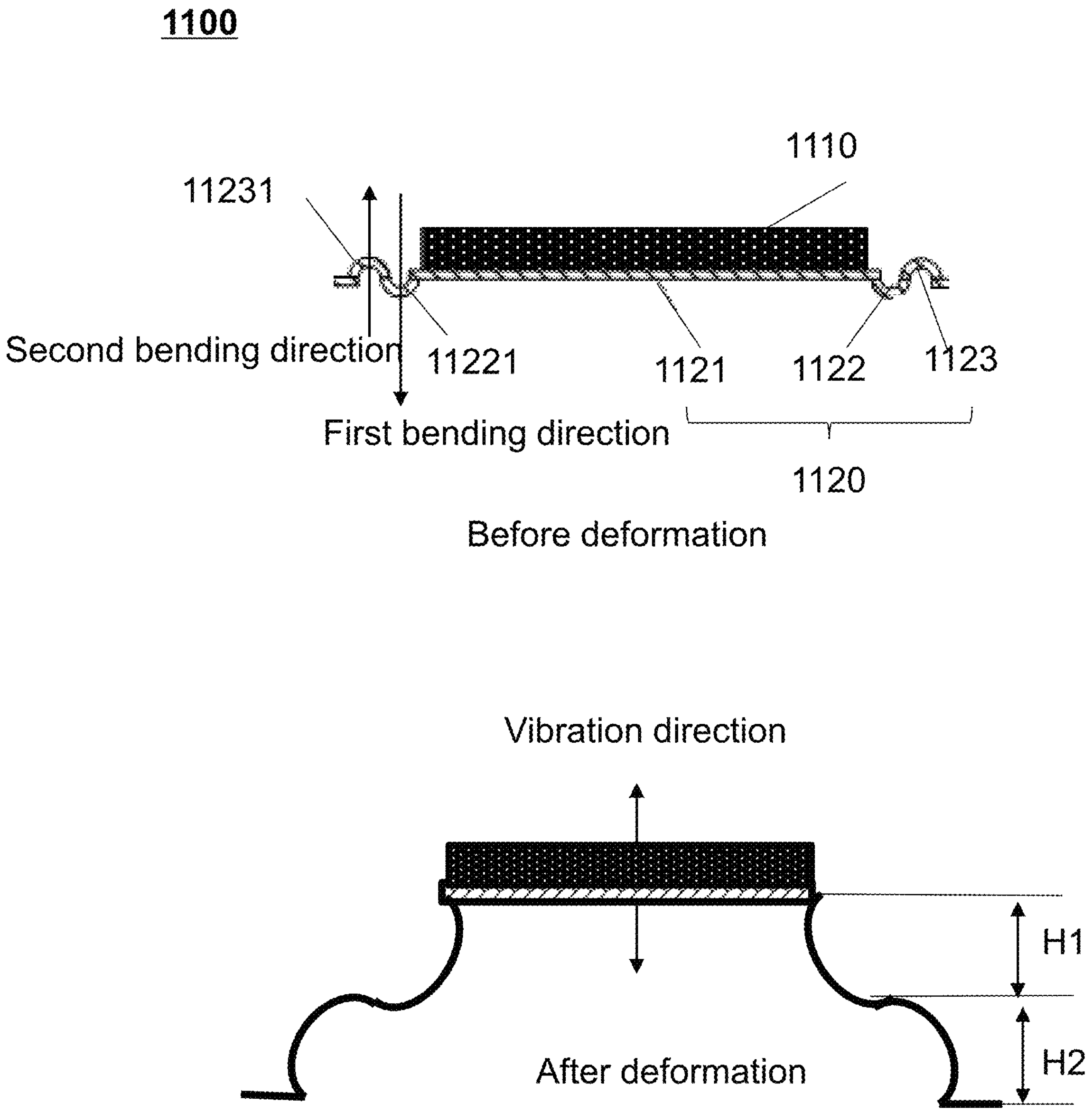
FIG. 17 is a structural diagram illustrating an exemplary vibration component according to some embodiments of the present disclosure.

In some embodiments, referring to FIG. 17, the first bending direction of the first bending ring 11221 and the second bending direction of the second bending ring 11231 may be opposite. The first bending direction of the first bending ring 11221 being opposite to the second bending direction of the second bending ring 11231 may be that a direction in which the bending portion of the first bending ring 11221 protrudes is opposite to a direction in which the bending portion of the second bending ring 11231 protrudes in a same plane. In this arrangement, the vibration displacement or the vibration amplitude of the mass element 1110 along the vibration direction of the mass element 1110 may be superimposed by the first displacement H1 and the second displacement H2.

Figure 18A:
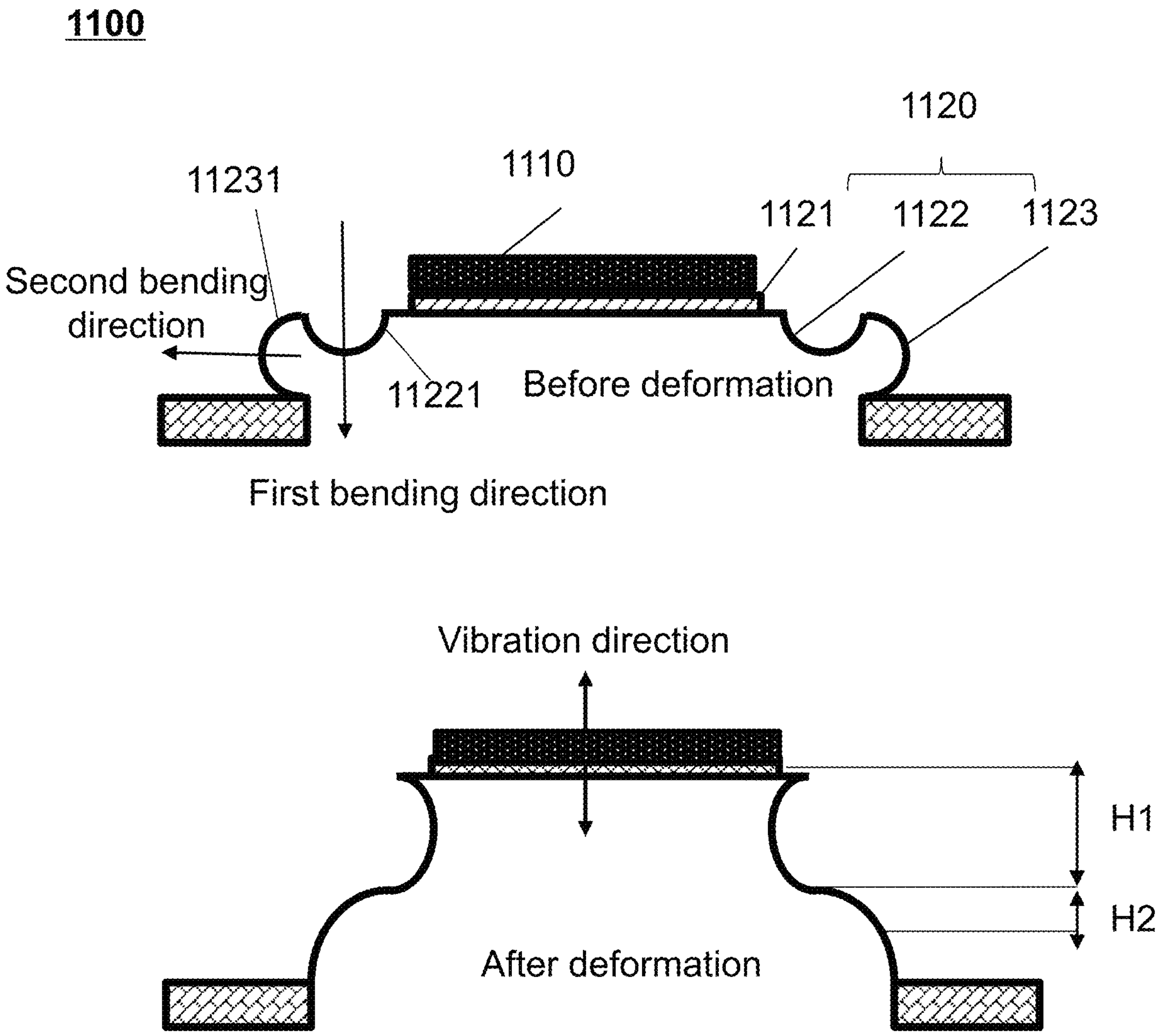
FIG. 18A is a structural diagram illustrating an exemplary vibration component according to some embodiments of the present disclosure.
Figure 18B:
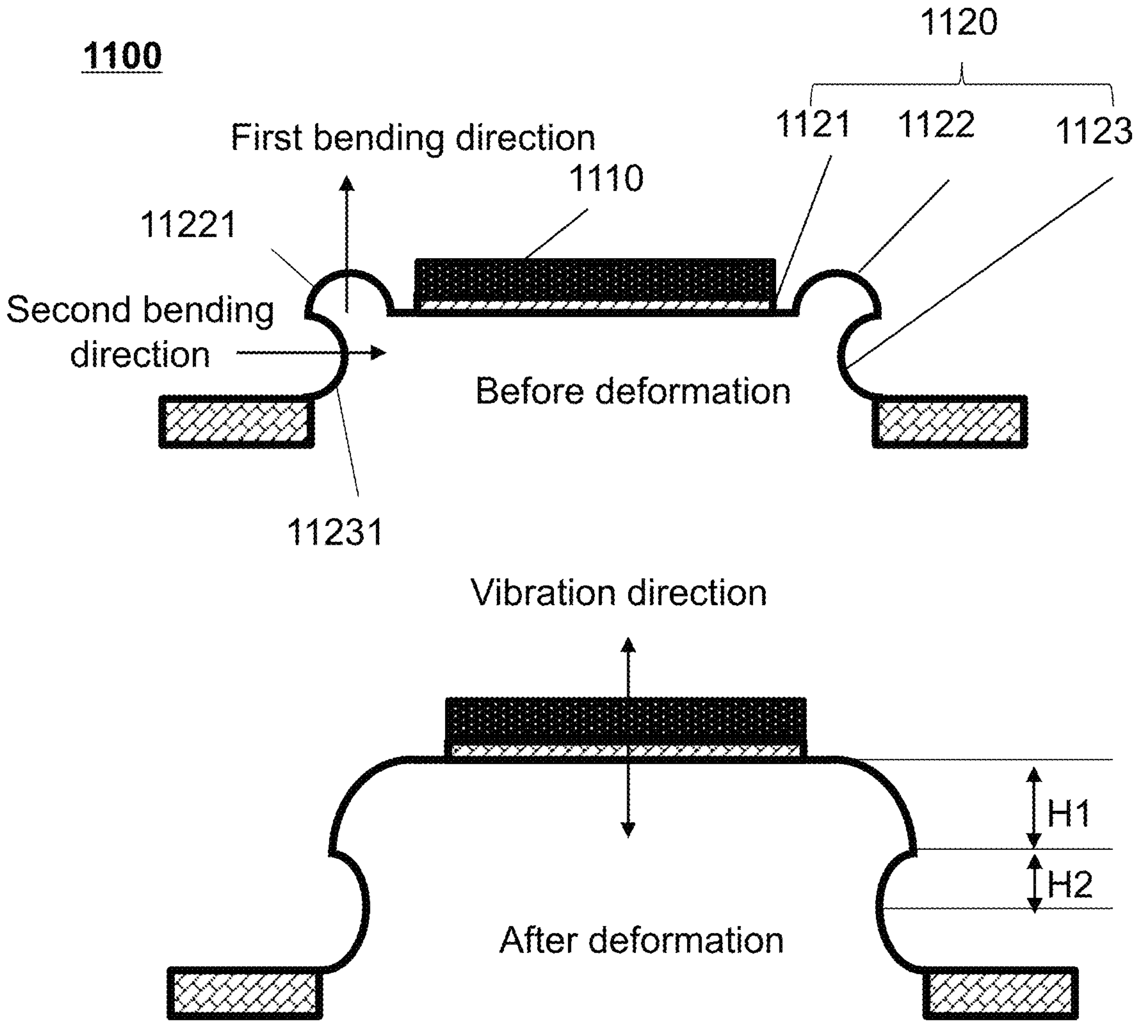
FIG. 18B is a structural diagram illustrating an exemplary vibration component according to some embodiments of the present disclosure.
Figure 18C:
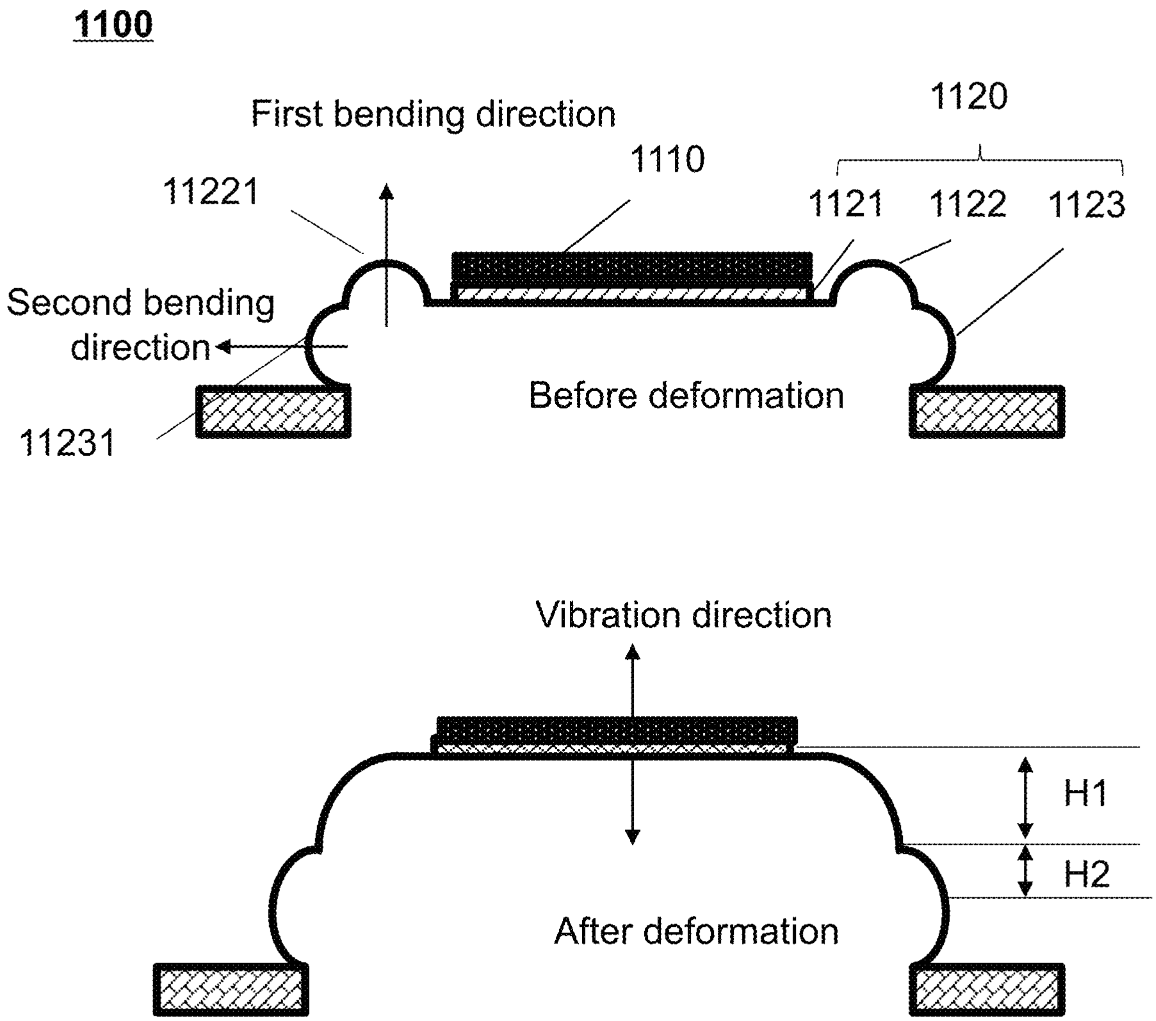
FIG. 18C is a structural diagram illustrating an exemplary vibration component according to some embodiments of the present disclosure.

In some embodiments, referring to FIGS. 18A-18C, the first bending direction of the first bending ring 11221 may be perpendicular to the second bending direction of the second bending ring 11231. In some embodiments, referring to FIG. 18A, the first bending direction of the first bending ring 11221 may be parallel to the vibration direction of the mass element 1110, one end of the second bending ring 11231 may be connected to the first bending ring, and the other end of the second bending ring 11231 may be away from a plane where the connection region 1121 is located along the direction opposite to the first bending direction. In some embodiments, the second bending direction may be perpendicular to the vibration direction of the mass element 1110. In some embodiments, referring to FIG. 18A, the second bending direction of the second bending ring 11231 may be away from a middle of the elastic element 1120. In some embodiments, the second bending direction may point toward the middle of the elastic element 1120. In this arrangement, the vibration displacement or the vibration amplitude of the mass element 1110 along the vibration direction of the mass element 1110 may be superimposed by the first displacement H1 and the second displacement H2. In some embodiments, referring to FIG. 18B and FIG. 18C, the first bending direction of the first bending ring 11221 may be parallel to the vibration direction of the mass element 1110, one end of the second bending ring 11231 may be connected to the first bending ring, and the other end of the second bending ring 11231 may be away from the plane where the connection region 1121 is located along the direction opposite to the first bending direction. In some embodiments, the second bending direction may be perpendicular to the vibration direction of the mass element 1110. In some embodiments, referring to FIG. 18B, the second bending direction of the second bending ring 11231 may point toward the middle of the elastic element 1120. In some embodiments, referring to FIG. 18C, the second bending direction of the second bending ring 11231 may be away from the middle of the elastic element 1120. In this arrangement, the vibration displacement or the vibration amplitude of the mass element 1110 along the vibration direction of the mass element 1110 may be superimposed by the first displacement H1 and the second displacement H2.

The first bending direction of the first bending ring 11221 is perpendicular to the second bending direction of the second bending ring 11231, which may make the second bending ring 11231 have a larger design dimension, so that the second bending ring 11231 may have a greater deformation quantity in the vibration direction of the mass element 1110, thereby increasing the second displacement provided by the second preprocessing region 1122 for the mass element 1110 along the vibration direction of the mass element 1110, and increasing a total displacement provided by the entire elastic element 1120 for the mass element 1110 provides along the vibration direction of the mass element 1110. At the same time, the second bending ring 11231 may have a greater deformation quantity in the vibration direction of the mass element 1110, which may make the stress generated by the elastic element 1120 more easily dispersed in the second preprocessing region 1123 during the vibration of the mass element 1110, and avoid a stress concentration situation.

Figure 19:
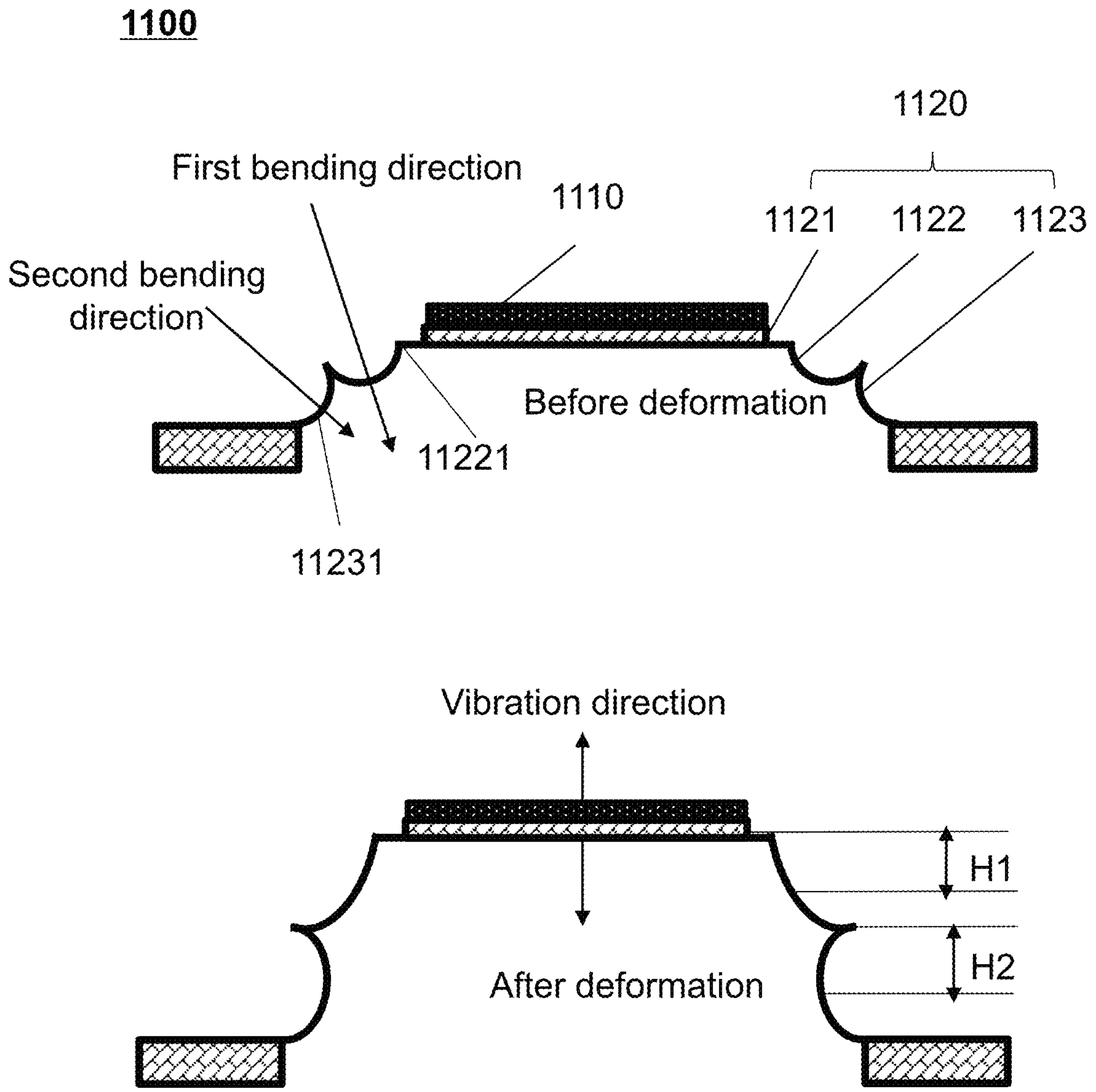
FIG. 19 is a structural diagram illustrating an exemplary vibration component according to some embodiments of the present disclosure.

In some embodiments, as shown in FIG. 19, the first bending direction of the first bending ring 11221 and the second bending direction of the second bending ring 11231 may form a second angle. In this arrangement, the vibration displacement or the vibration amplitude of the mass element 1110 along the vibration direction of the mass element 1110 may be superimposed by the first displacement H1 and the second displacement H2. In some embodiments, the first displacement H1 and the second displacement H2 may be adjusted by setting the first bending direction of the first bending ring 11221 and the second bending direction of the second bending ring 11231, thereby adjusting the vibration displacement or the vibration amplitude of the mass element 1110 along the vibration direction of the mass element 1110.

In some embodiments, the second angle between the first bending direction and the second bending direction may be in a range of 0°-360°. In some embodiments, the second angle between the first bending direction and the second bending direction may be in a range of 210°-270°. In some embodiments, the second angle between the first bending direction and the second bending direction may be in a range of 60°-120°. In some embodiments, the second angle between the first bending direction and the second bending direction may be in a range of 900 and 200°. In some embodiments, the second angle between the first bending direction and the second bending direction may be in a range of 10°-100°.

In some embodiments, the first bending direction of the first bending ring 11221 may be parallel to the second bending direction of the second bending ring 11231. For example, as shown in FIGS. 16-17, the first bending direction of the first bending ring 11221 may be parallel to the second bending direction of the second bending ring 11231. When the first bending direction of the first bending ring 11221 is parallel to the second bending direction of the second bending ring 11231, the first bending direction of the first bending ring 11221 may be the same as (e.g., as shown in FIG. 16) or opposite to (e.g., as shown in FIG. 17) the second bending direction of the second bending ring 11231.

It should be noted that for the disposing of the first bending direction and the second bending direction in the present disclosure, a certain error may be allowed in the direction described in each embodiment (e.g., angle deviation within ±10°), which is not strictly and precisely disposed.

In some embodiments, the first bending direction of the first bending ring 11221 may be different from the second bending direction of the second bending ring 11231, so that the elastic element 1120 may have a stronger deformability along the vibration direction of the mass element 1120, thereby increasing the vibration displacement or the vibration amplitude provided by the elastic element 1120 for the mass element 1110 along the vibration direction of the mass element 1110.

In some embodiments, a projection area of the second bending ring 11231 on a plane perpendicular to the vibration direction of the mass element 1110 may be smaller than a projection area of the first bending ring 11221 on the plane perpendicular to the vibration direction of the mass element 1110, so that an increase of a total projection area of the second bending ring 11231 and the first bending ring 11221 along the mass element 1110 on the plane perpendicular to the vibration direction may be relatively small when the second bending ring 11231 increases the second displacement. The total projection area of the second bending ring 11231 and the first bending ring 11221 on the plane perpendicular to the vibration direction may be relatively small, so that the mass element 1110 may have a relatively large projection area on the plane perpendicular to the vibration direction of the mass element 1110 (i.e., a contact surface between the mass element 1110 and the elastic element 1120 may have a relatively large area), and the mass element 1110 may push more air to vibrate during the vibration, thereby improving the low-frequency performance of the vibration component 1100.

In some embodiments, a ratio of a projection area of the second bending ring 11231 along the vibration direction of the mass element 1110 to a projection area of the first bending ring 11221 along the vibration direction of the mass element 1110 may be in a range of 1:60-1:2. In some embodiments, the ratio of the projection area of the second bending ring 11231 along the vibration direction of the mass element 1110 to the projection area of the first bending ring 11221 along the vibration direction of the mass element 1110 may be in a range of 1:50-2:5. In some embodiments, the ratio of the projection area of the second bending ring 11231 along the vibration direction of the mass element 1110 to the projection area of the first bending ring 11221 along the vibration direction of the mass element 1110 may be in a range of 1:20-1:5.

In some embodiments, referring to FIG. 18B, when the second bending direction of the second bending ring 11231 faces the middle of the elastic element 1120, a height dimension of the second bending ring 11231 along the second bending direction may be greater than a length dimension of the second bending ring 11231 along a direction perpendicular to the second bending direction. In some embodiments, the height dimension of the second bending ring 11231 along the second bending direction may be represented by a maximum height of the bending portion of the second bending ring 11231 to a line connecting two endpoints on a projection plane parallel to the vibration direction of the mass element 210. The length dimension of the second bending ring 11231 along the direction perpendicular to the second bending direction may be represented by a length of the line connecting the two endpoints of the second bending ring 11231.

In some embodiments, when the second bending direction of the second bending ring 11231 points to the middle of the elastic element 1120, the height dimension of the second bending ring 11231 along the second bending direction may be greater than the length dimension of the second bending ring 11231 along the direction perpendicular to the second bending direction, which may make the second bending ring 11231 have a larger deformation quantity in the vibration direction of the mass element 1110, thereby increasing the second displacement provided by the second preprocessing region 1122 for the mass element 1110 along the vibration direction of the mass element 1110. Moreover, in this arrangement, even if the height dimension of the second bending ring 11231 along the second bending direction is increased, a projection length of the elastic element 1120 along a direction perpendicular to the vibration direction of the mass element 1110 may not be increased. It should be noted that, as shown in FIG. 18B, the height dimension of the second bending ring 11231 along the second bending direction may also be smaller than or equal to the length dimension of the second bending ring 11231 along the direction perpendicular to the second bending direction.

In some embodiments, the height dimension of the second bending ring 11231 along the second bending direction may be in a range of 20 um-1200 um. In some embodiments, the height dimension of the second bending ring 11231 along the second bending direction may be in a range of 50 um-1200 um. In some embodiments, the height dimension of the second bending ring 11231 along the second bending direction may be in a range of 50 um-800 um. In some embodiments, the height dimension of the second bending ring 11231 along the second bending direction may be in a range of 100 um-600 um. In some embodiments, the height dimension of the second bending ring 11231 along the second bending direction may be in a range of 300 um-600 um.

In some embodiments, the length dimension of the second bending ring 11231 along the direction perpendicular to the second bending direction may be in a range of 20 um-1200 um. In some embodiments, the length dimension of the second bending ring 11231 along the direction perpendicular to the second bending direction may be in a range of 50 um-1200 um. In some embodiments, the length dimension of the second bending ring 11231 along the direction perpendicular to the second bending direction may be in a range of 100 um-1000 um. In some embodiments, the length dimension of the second bending ring 11231 along the direction perpendicular to the second bending direction may be in a range of 100 um-800 um. In some embodiments, the length dimension of the second bending ring 11231 along the direction perpendicular to the second bending direction may be in a range of 100 um-600 um. In some embodiments, the length dimension of the second bending ring 11231 along the direction perpendicular to the second bending direction may be in a range of 300 um-600 um.

In some embodiments, a ratio of the height dimension of the second bending ring 11231 along the second bending direction to the length dimension of the second bending ring 11231 along the direction perpendicular to the second bending direction may be in a range of 1:5-5:1. In some embodiments, the ratio of the height dimension of the second bending ring 11231 along the second bending direction to the length dimension of the second bending ring 11231 along the direction perpendicular to the second bending direction may be in a range of 1:3-3:1. In some embodiments, the ratio of the height dimension of the second bending ring 11231 along the second bending direction to the length dimension of the second bending ring 11231 along the direction perpendicular to the second bending direction may be in a range of 1:2-2:1.

In some embodiments, referring to FIG. 18A, when the second bending direction of the second bending ring 11231 is away from the middle of the elastic element 1120, the height dimension of the second bending ring 11231 along the second bending direction may be smaller than the length dimension of the second bending ring 11231 along the direction perpendicular to the second bending direction. The height dimension of the second bending ring 11231 along the second bending direction may be smaller than the length dimension of the second bending ring 11231 along the direction perpendicular to the second bending direction, so that the mass element 1110 may have a larger projection area on the plane perpendicular to the vibration direction of the mass element 1110, and the mass element 1110 may push more air to vibrate during the vibration, thereby improving the low-frequency performance of the vibration component 1100.

In some embodiments, a ratio of the height dimension of the second bending ring 11231 along the second bending direction to the length dimension of the second bending ring 11231 along the direction perpendicular to the second bending direction may be in a range of 1:100-1:1. In some embodiments, the ratio of the height dimension of the second bending ring 11231 along the second bending direction to the length dimension of the second bending ring 11231 along the direction perpendicular to the second bending direction may be in a range of 1:20-4:5. In some embodiments, the ratio of the height dimension of the second bending ring 11231 along the second bending direction to the length dimension of the second bending ring 11231 along the direction perpendicular to the second bending direction may be in a range of 1:10-1:2.

In some embodiments, referring to FIGS. 11-19, a ratio of the length dimension of the second bending ring 11231 along the direction perpendicular to the second bending direction to a length dimension of the mass element 1110 along the direction perpendicular to the vibration direction of the mass element 1110 may be in a range of 1:50-2:5. In some embodiments, the ratio of the length dimension of the second bending ring 11231 along the direction perpendicular to the second bending direction to the length dimension of the mass element 1110 along the direction perpendicular to the vibration direction of the mass element 1110 may be in a range of 1:20-1:5. In some embodiments, a ratio of a dimension of the second bending ring 11231 along the direction perpendicular to the vibration direction of the mass element 1110 to the length dimension of the mass element 1110 along the direction perpendicular to the vibration direction of the mass element 1110 may be in a range of 1:100-3:5. In some embodiments, the ratio of the dimension of the second bending ring 11231 along the direction perpendicular to the vibration direction of the mass element 1110 to the length dimension of the mass element 1110 along the direction perpendicular to the vibration direction of the mass element 1110 may be in a range of 1:50-1:2.5. In some embodiments, the ratio of the dimension of the second bending ring 11231 along the direction perpendicular to the vibration direction of the mass element 1110 to the length dimension of the mass element 1110 along the direction perpendicular to the vibration direction of the mass element 1110 may be in a range of 1:20-1:5.

Figure 20:
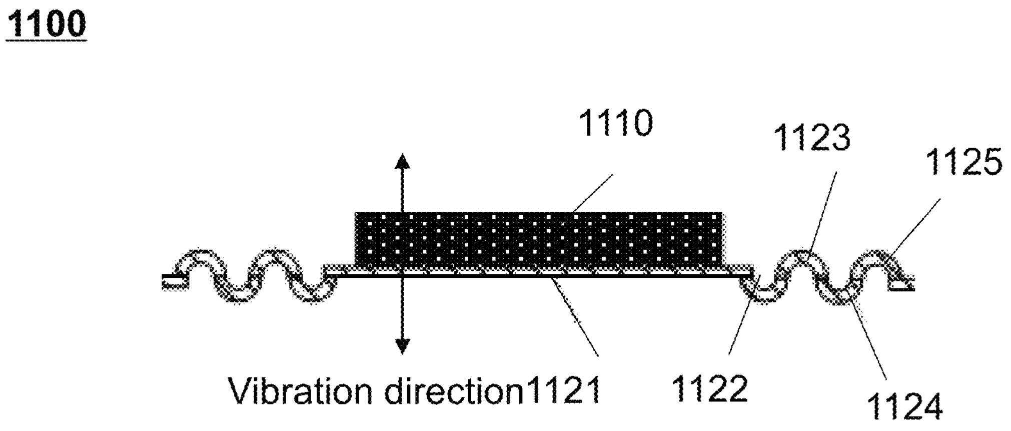
FIG. 20 is a structural diagram illustrating an exemplary vibration component according to some embodiments of the present disclosure.
Figure 21:
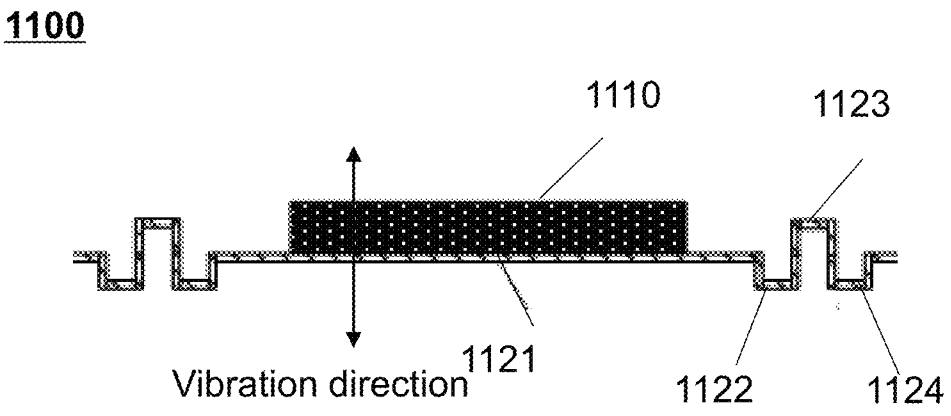
FIG. 21 is a structural diagram illustrating an exemplary vibration component according to some embodiments of the present disclosure.
Figure 22:
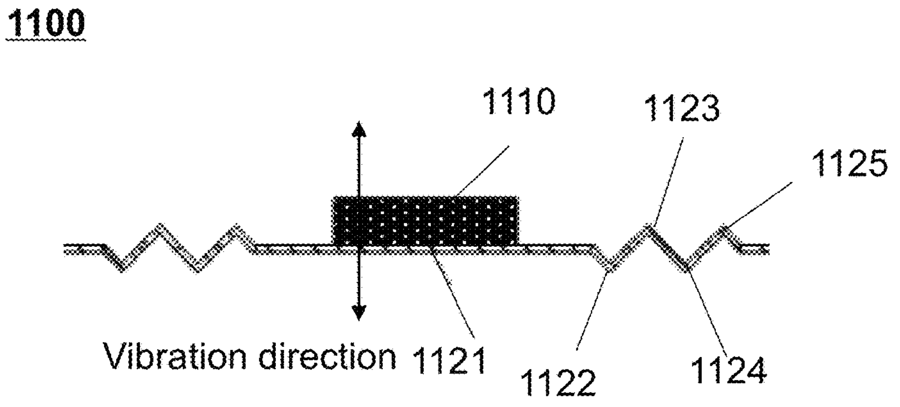
FIG. 22 is a structural diagram illustrating an exemplary vibration component according to some embodiments of the present disclosure.

It should be noted that, in addition to the first preprocessing region 1122 and the second preprocessing region 1123, the elastic element 1120 of the vibration component 1100 may also include more preprocessing regions, for example, a third preprocessing region 1124, a fourth preprocessing region 1125, etc., shown in FIGS. 20-22. The third preprocessing region 1124 may encircle a circumferential side of the second preprocessing region 1123 and may be mechanically connected to the circumferential side of the second preprocessing region 1123. The fourth preprocessing region 1125 may encircle a circumferential side of the third preprocessing region 1124 and may be mechanically connected to the circumferential side of the third preprocessing region 1124. A count of preprocessing regions included in the elastic element 1120 may be disposed according to a requirement (for example, the displacement provided by the elastic element 1120 for the mass element 1110 along the vibration direction of the mass element 1110) of the vibration component 1100, which is not specifically limited in the embodiment of the present disclosure.

FIGS. 23-32 are structural diagrams illustrating exemplary vibration components according to some embodiments of the present disclosure.

In some embodiments, referring to FIGS. 23-32, one or more elements (e.g., a mass element 2310, an elastic element 2320, a connection region 2321, a first preprocessing region 2322, or a first bending ring 23221) of vibration component 2300 may be the same as or similar to one or more elements (e.g., the mass element 210, the elastic element 220, the connection region 221, the first preprocessing region 222, or the first bending ring 2221) of the vibration component 200 shown in FIGS. 2-10. That is, the vibration component 2300 may include the mass element 2310, the connection region 2321, and the first preprocessing region 2322. A difference from the vibration component 200 may be that the vibration component 2300 may further include a supporting element 2330. In some embodiments, the supporting element 2330 may support the elastic element 2320.

In some embodiments, a material of the supporting element 2330 may include a semiconductor material, an organic polymer material, a rubber-like material, or the like, or any combination thereof. The semiconductor material may include but be not limited to, a silicon, a silicon dioxide, a silicon nitride, a silicon carbide, or the like, or any combination thereof. The organic polymer material may include but be not limited to a polyimide (PI), a parylene, a polydimethylsiloxane (PDMS), a hydrogel, a plastic, or the like, or any combination thereof. The rubber-like material may include but be not limited to a gel, a silicone, an acrylic, a polyurethane, a rubber, an epoxy, a hot melt, a light curing, or the like, or any combination thereof. In some embodiments, in order to enhance a connection force between the supporting element 2330 and the elastic element 2320 and improve the reliability between the supporting element 2330 and the elastic element 2320, the material of the supporting element 2330 may be a silicone adhesive glue, a silicone sealing glue, etc. In some embodiments, the material of supporting element 2330 may also be a rigid material. In some embodiments, the rigid material may include but be not limited to, a metal material, an alloy material, etc.

Figure 23:
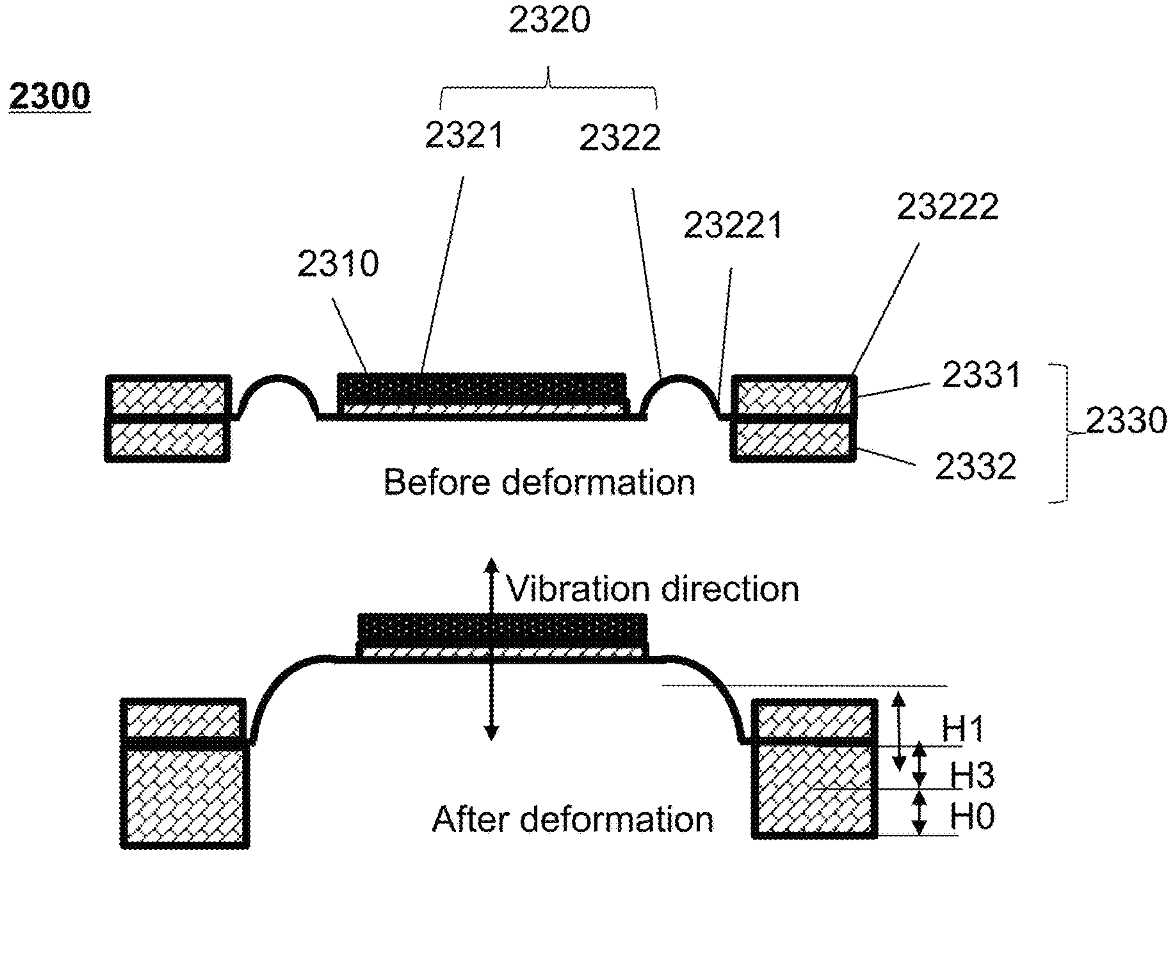
FIG. 23 is a structural diagram illustrating an exemplary vibration component according to some embodiments of the present disclosure.

In some embodiments, referring to FIG. 23, the elastic element 2320 of the vibration component 2300 may further include a fixed region 23222. The fixed region 23222 may be located at a periphery of the first preprocessing region 2322 and may encircle a circumferential side of the first preprocessing region 2322 and may be mechanically connected to the circumferential side of the first preprocessing region 2322. The supporting element 2330 may be located on any surface of the fixed region 23222 along a vibration direction of the mass element 2310, and may be connected to the first preprocessing region 2322 through the fixed region 23222.

In some embodiments, the supporting element 2330 may include a clamping portion 2331 and a deformation portion 2332. In some embodiments, the clamping portion 2331 may be disposed opposite to the deformation portion 2332, and the fixed region 23222 may be clamped between the clamping portion 2331 and the deformation portion 2332 of the supporting element 2330. In some embodiments, the deformation portion 2332 of the supporting element 2330 may provide a third displacement for the mass element 2310 along the vibration direction of the mass element 2310 through deformation. The third displacement may be a displacement contributed by the supporting element 2330 to the mass element 2310 along the vibration direction of the mass element 2310 during the vibration. In some embodiments, as shown in FIG. 23, an initial height (a height of the deformation portion 2332 without deformation) of the deformation portion 2332 of the supporting element 2330 along the vibration direction of the mass element 2310 is H0. When the deformation portion 2332 vibrates in response to a vibration signal of the vibration component 2300, the deformation portion 2332 may be deformed along the vibration direction of the mass element 2310, so that an height increase (i.e., a deformation quantity of the deformation portion 2332) of the deformation portion 2332 along the vibration direction of the mass element 2310 may be H3. The height increase H3 of the deformation portion 2332 along the vibration direction of the mass element 2310 may be the third displacement provided by the deformation portion 2332 for the mass element 2310 along the vibration direction of the mass element 2310.

In some embodiments, the deformation portion 2332 may be disposed, which may increase the third displacement H3 provided by the supporting element 2330 for the mass element 2310 along the vibration direction of the mass element 2310, thereby increasing a vibration displacement or a vibration amplitude of the mass element 2310 along the vibration direction of the mass element 2310, thereby pushing more air to vibrate and improving the low-frequency performance of the vibration component 2300. In some embodiments, since the deformation portion 2332 of the supporting element 2330 is more prone to deformation, during the vibration of the mass element 2310, the stress generated by the elastic element 2320 may be prevented from concentrating on some specific positions (e.g., a connection between the first preprocessing region 23221 and the fixed region 23222) to prevent the elastic element 2320 from being damaged. In some embodiments, when the vibration component 2300 is subjected to a relatively large external vibration, the first preprocessing region 2322 and the supporting element 2330 may store vibration shock energy in the form of deformation energy in the first preprocessing region 2322 and the supporting element 2330, respectively through deformations, and the first preprocessing region 2322 and the supporting element 2330 may perform a plurality of damping attenuation movements, thereby dispersing the relatively large vibration shock energy through the damping movements, preventing the vibration component 2300 (especially, the elastic element 2320) from being damaged when receiving external vibration, and improving the reliability of the vibration component 2300.

In some embodiments, the supporting element 2330 may not include the clamping portion 2331, and the fixed region 23222 of the elastic element 2320 may be directly connected (e.g., glued, etc.) to the deformation portion 2332.

In some embodiments, a ratio of the first displacement H1 provided by the first preprocessing region 2322 for the mass element 2310 along the vibration direction of the mass element 2310 to the third displacement H3 provided by the deformation portion 2332 for the mass element 2310 along the vibration direction of the mass element 2310 may be in a range of 1:20-50:1. In some embodiments, the ratio of the first displacement H1 to the third displacement H3 may be in a range of 1:10-10:1. In some embodiments, the ratio of the first displacement H1 to the third displacement H3 may be in a range of 3:10-3:1. In some embodiments, the ratio of the first displacement H1 to the third displacement H3 may be in a range of 1:1-10:1. In some embodiments, the ratio of the first displacement H1 to the third displacement H3 may be in a range of 1:1-5:1. In some embodiments, the ratio of the first displacement H1 to the third displacement H3 may be in a range of 1:1-3:1. In some embodiments, the ratio of the first displacement H1 to the third displacement H3 may be in a range of 1:1-2:1.

In some embodiments, the third displacement H3 provided by the supporting element 2330 for the mass element 2310 along the vibration direction of the mass element 2310 may be positively correlated with an elongation at break of the supporting element 2330 along the vibration direction of the mass element 2310. In some embodiments, the greater the elongation at break of the supporting element 2330 along the vibration direction of the mass element 2310 is, the greater the third displacement H3 provided by the supporting element 2330 for the mass element 2310 along the vibration direction of the mass element 2310 may be. In some embodiments, the elongation at break of the supporting element 2330 along the vibration direction of the mass element 2310 may be in a range of 5%-800%. In some embodiments, the elongation at break of the supporting element 2330 along the vibration direction of the mass element 2310 may be a range of 10%-600%. In some embodiments, the elongation at break of the supporting element 2330 along the vibration direction of the mass element 2310 may be a range of 50%-400%.

In some embodiments, the third displacement H3 provided by the supporting element 2330 for the mass element 2310 along the vibration direction of the mass element 2310 may be negatively correlated with a hardness of the supporting element 2330. In some embodiments, the greater the hardness of the supporting element 2330 is, the smaller the third displacement H3 provided by the supporting element 2330 for the mass element 2310 along the vibration direction of the mass element 2310 may be. In some embodiments, the hardness of the supporting element 2330 may be that Shore A is smaller than 90 degrees. In some embodiments, the supporting element 2330 may have a hardness of smaller than 80 Shore A. In some embodiments, the supporting element 2330 may have a hardness of smaller than 60 Shore A. In some embodiments, the supporting element 2330 may have a hardness of smaller than 30 Shore A.

In some embodiments, the third displacement H3 provided by the supporting element 2330 for the mass element 2310 along the vibration direction of the mass element 2310 may be negatively correlated with a tensile strength of the supporting element 2330. In some embodiments, the greater the tensile strength of the supporting element 2330 is, the smaller the third displacement H3 provided by the supporting element 2330 for the mass element 2310 along the vibration direction of the mass element 2310 may be. In some embodiments, the tensile strength of the supporting element 2330 may be in a range of 0.5 MPa-100 MPa. In some embodiments, the tensile strength of the supporting element 2330 may be in a range of 1 MPa-50 MPa. In some embodiments, the tensile strength of the supporting element 2330 may be in a range of 0.5 MPa-10 MPa.

In some embodiments, in order to increase the third displacement H3 provided by the supporting element 2330 for the mass element 2310 along the vibration direction of the mass element 2310, a structure of the supporting element 2300 (especially, the deformation portion 2332) may be set so that cross-sections of the supporting element 2330 perpendicular to the vibration direction of the mass element 2310 may have different cross-sectional areas along the vibration direction of the mass element. More descriptions may be found in FIGS. 24-30 and the relevant descriptions thereof.

Figure 24:
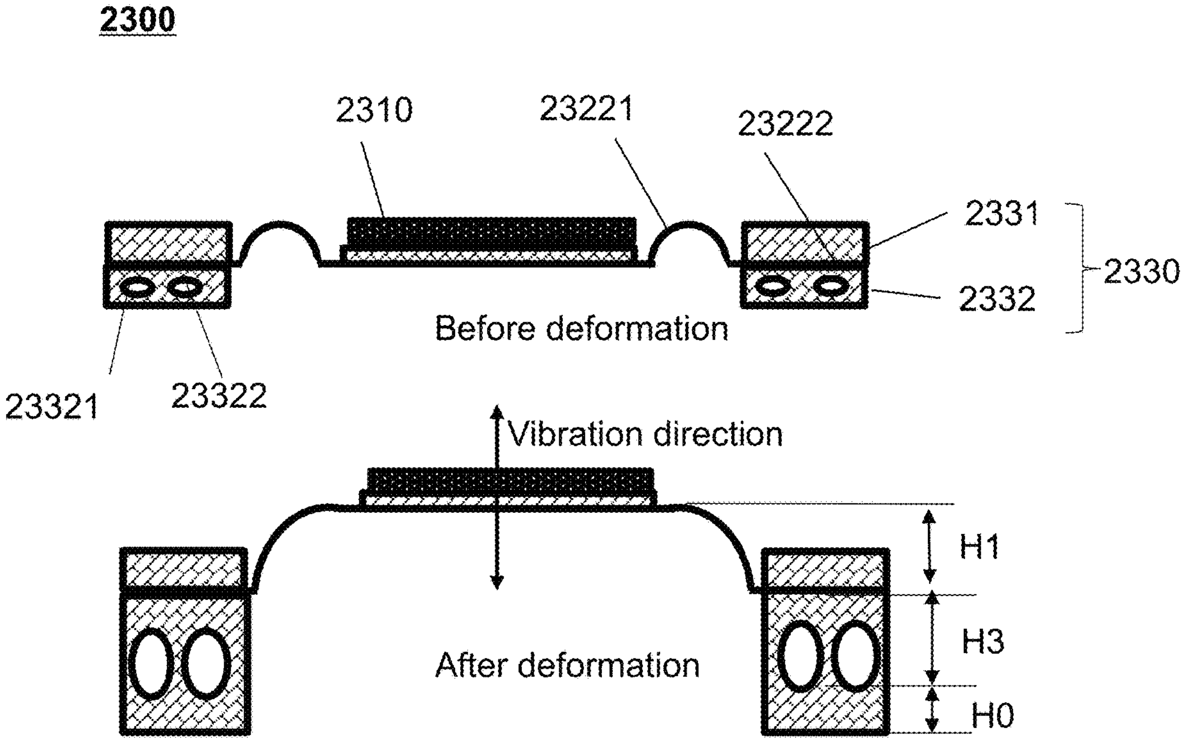
FIG. 24 is a structural diagram illustrating an exemplary vibration component according to some embodiments of the present disclosure.
Figure 25:
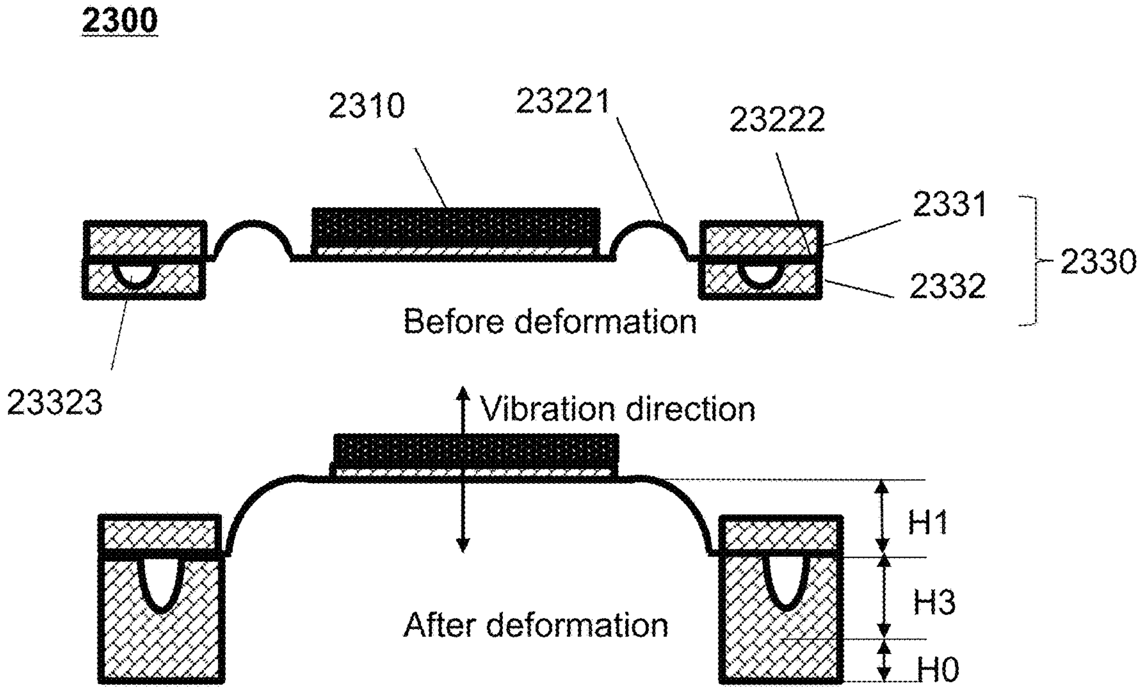
FIG. 25 is a structural diagram illustrating an exemplary vibration component according to some embodiments of the present disclosure.
Figure 26:
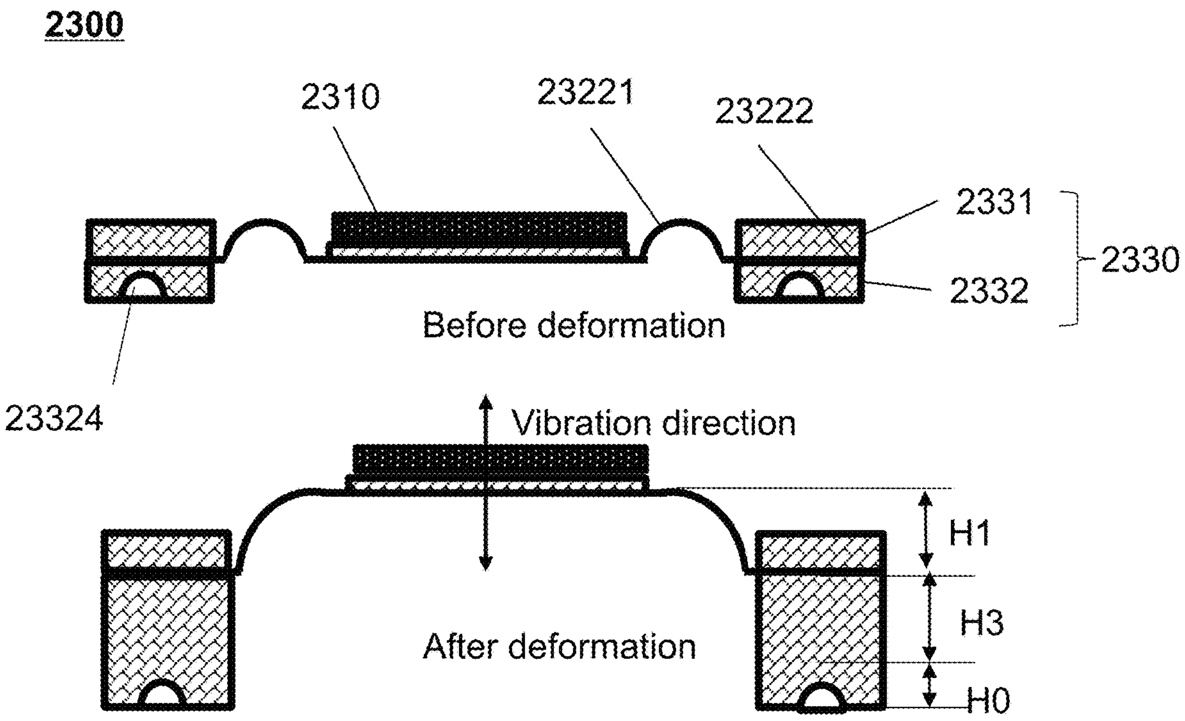
FIG. 26 is a structural diagram illustrating an exemplary vibration component according to some embodiments of the present disclosure.
Figure 27:
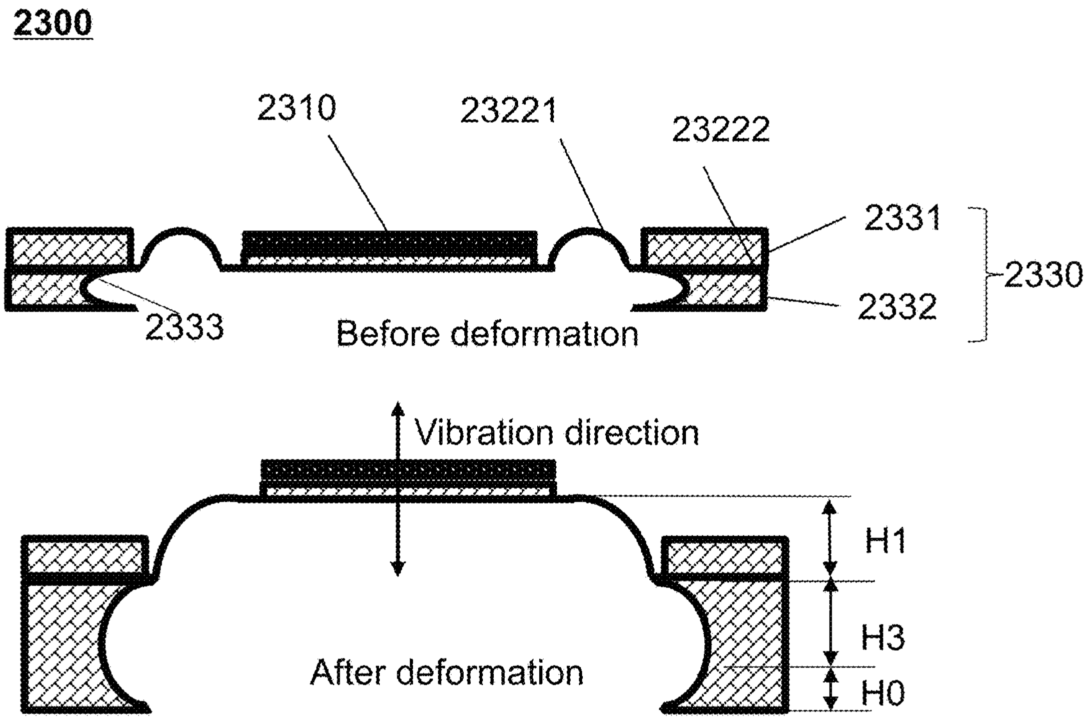
FIG. 27 is a structural diagram illustrating an exemplary vibration component according to some embodiments of the present disclosure.
Figure 28:
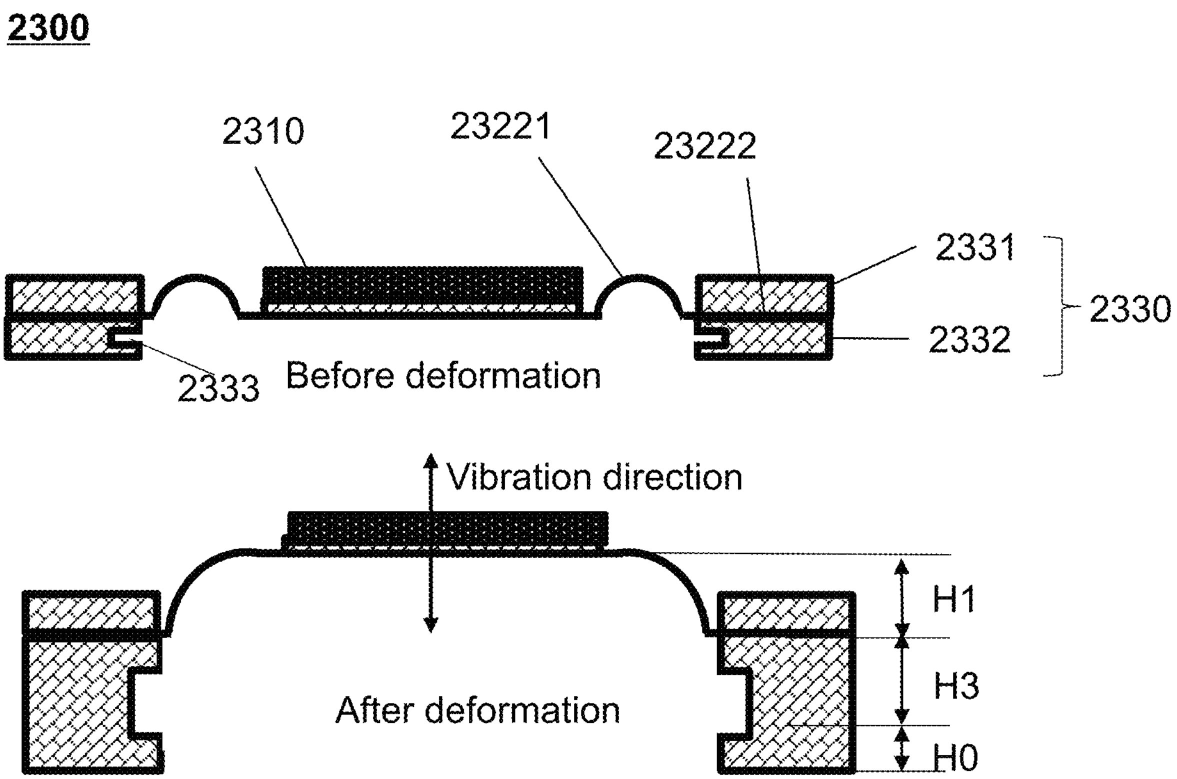
FIG. 28 is a structural diagram illustrating an exemplary vibration component according to some embodiments of the present disclosure.
Figure 29:
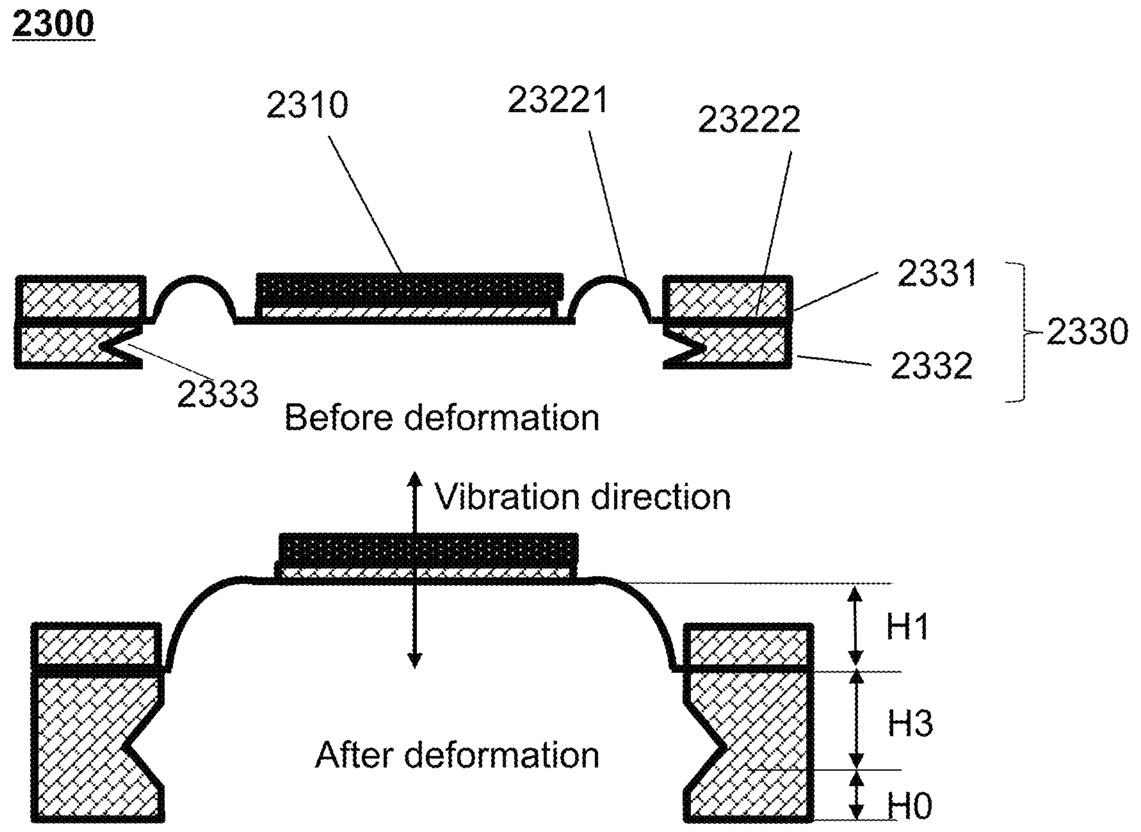
FIG. 29 is a structural diagram illustrating an exemplary vibration component according to some embodiments of the present disclosure.
Figure 30:
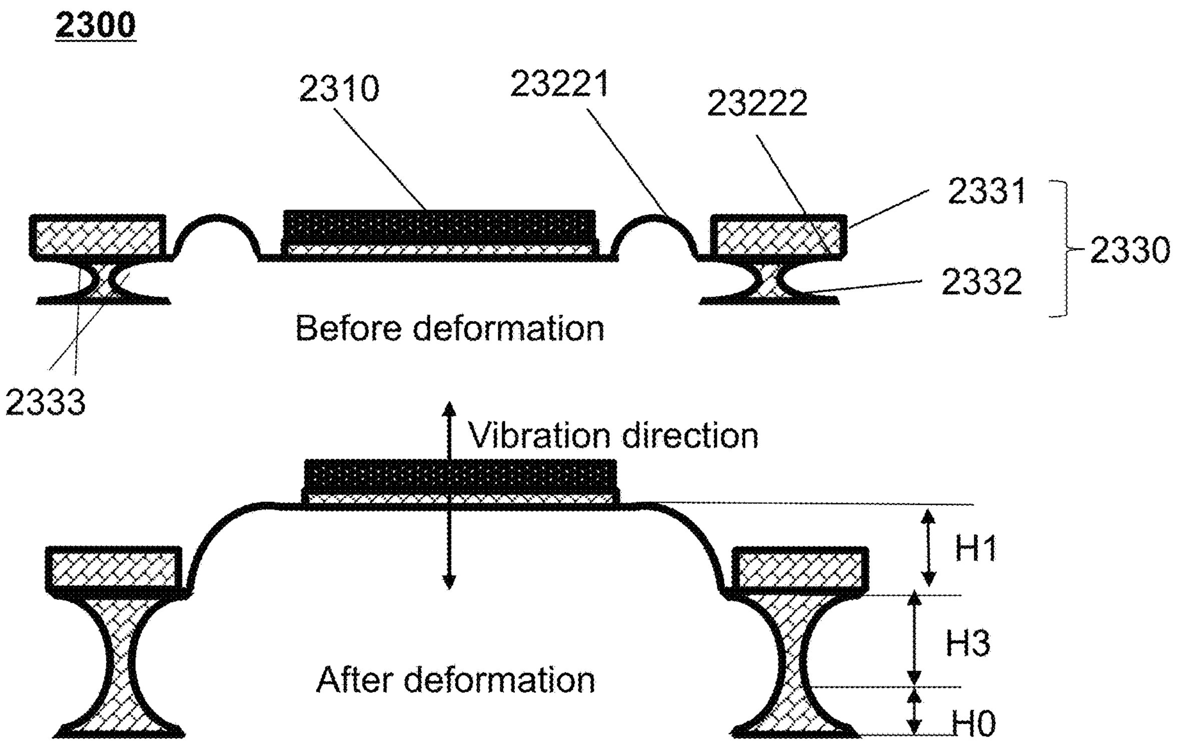
FIG. 30 is a structural diagram illustrating an exemplary vibration component according to some embodiments of the present disclosure.

In some embodiments, as shown in FIGS. 24-26, the supporting element 2330 may be a hole structure. In some embodiments, referring to FIG. 24, the supporting element 2330 may include a first hole 23321 and a second hole 23322, and the first hole 23321 and the second hole 23322 may be located in a middle of the supporting element 2330. A shape of a cross-section of the first hole 23321 parallel to the vibration direction of the mass element 2310 may be an ellipse. A shape of a cross-section of the second hole 23322 parallel to the vibration direction of the mass element 2310 may be an ellipse. In some embodiments, referring to FIG. 25, the supporting element 2330 may include a third hole 23323, and the third hole 23323 may be located inside the supporting element 2330 near the fixed region 23222. A shape of a cross section of the third hole 23323 parallel to the vibration direction of the mass element 2310 may be an arc-shape. In some embodiments, referring to FIG. 26, the supporting element 2330 may include a fourth hole 23324, and the fourth hole 23324 may be located inside the supporting element 2330 away from the fixed region 23222. A shape of a cross section of the fourth hole 23324 parallel to the vibration direction of the mass element 2310 may be an arc-shape.

In some embodiments, the supporting element 2330 may be set as the hole structure, which may improve a deformability of the supporting element 2330 along the vibration direction of the mass element 2310, thereby increasing the third displacement H3 provided by the supporting element 2330 for the mass element 2310 along the vibration direction of the mass element 23210, and further increasing the vibration amplitude or the vibration displacement of the mass element 2310 along the vibration direction of the mass element 2310. On the other hand, the supporting element 2330 may have a greater deformability along the vibration direction of the mass element 2310, which may make the supporting element 2330 provide a greater deformation quantity during the vibration of the vibration component 2300, thereby avoiding a stress concentration generated by the vibration component 2300 during the vibration.

It should be noted that a count of the holes, positions of the holes, dimensions of the holes, the shapes of the cross-sections of the holes parallel to the vibration direction of the mass element 2310, etc., of the supporting element 2330 may be set according to a requirement (e.g., the third displacement H3) of the supporting element 2330.

In some embodiments, referring to FIGS. 27-30, an inner side and/or outer side of the supporting element 2330 may have one or more recessed portion 2333*s*. In some embodiments, referring to FIG. 27, the recessed portion 2333 of the supporting element 2330 may be located in the inner side of the supporting element 2330, and a shape of a cross-section of the recessed portion 2333 along the vibration direction of the mass element 2310 may be an arc-shape. The inner side of the supporting element 2330 refers to a side surface of the supporting element 2330 close to the mass element 2310. A side surface opposite to the inner side of the supporting element 2330 may be the outer side of the supporting element 2330, and the outer side of the supporting element 2330 refers to a side surface of the supporting element 2330 away from the mass element 2310. In some embodiments, referring to FIG. 28, the recessed portion 2333 of the supporting element 2330 may be located in the inner side the supporting element 2330, and the shape of the cross-section of the recessed portion 2333 along the vibration direction of the mass element 2310 may be a square tooth shape. In some embodiments, referring to FIG. 29, the recessed portion 2333 of the supporting element 2330 may be located in the inner side the supporting element 2330, and the shape of the cross-section of the recessed portion 2333 along the vibration direction of the mass element 2310 may be a pointed tooth shape. In some embodiments, referring to FIG. 30, the recessed portions 2333 of the supporting element 2330 may be located in the inner side and the outer side of the supporting element 2330, and the shapes of the cross-sections of the recessed portions 2333 along the vibration direction of the mass element 2310 may be arc-shapes.

In some embodiments, the recessed portion 2333 may be disposed in the side surface (e.g., the inner side and/or the outer side) of the supporting element 2330, which may improve the deformability of the supporting element 2330 along the vibration direction of the mass element 2310, thereby increasing the third displacement H3 provided by the supporting element 2330 for the mass element 2310 along the vibration direction of the mass element 23210 and further increasing the vibration amplitude or the vibration displacement of the mass element 2310 along the vibration direction of the mass element 2310.

It should be noted that positions of the one or more recessed portions 2333, a count of the one or more recessed portions 2333, the shapes of the cross-sections of the one or more recessed portions 2333 parallel to the vibration direction of the mass element 2310, etc., of the supporting element 2330 may be set according to the requirement (e.g., the third displacement H3) of the supporting element 2330.

Figure 31:
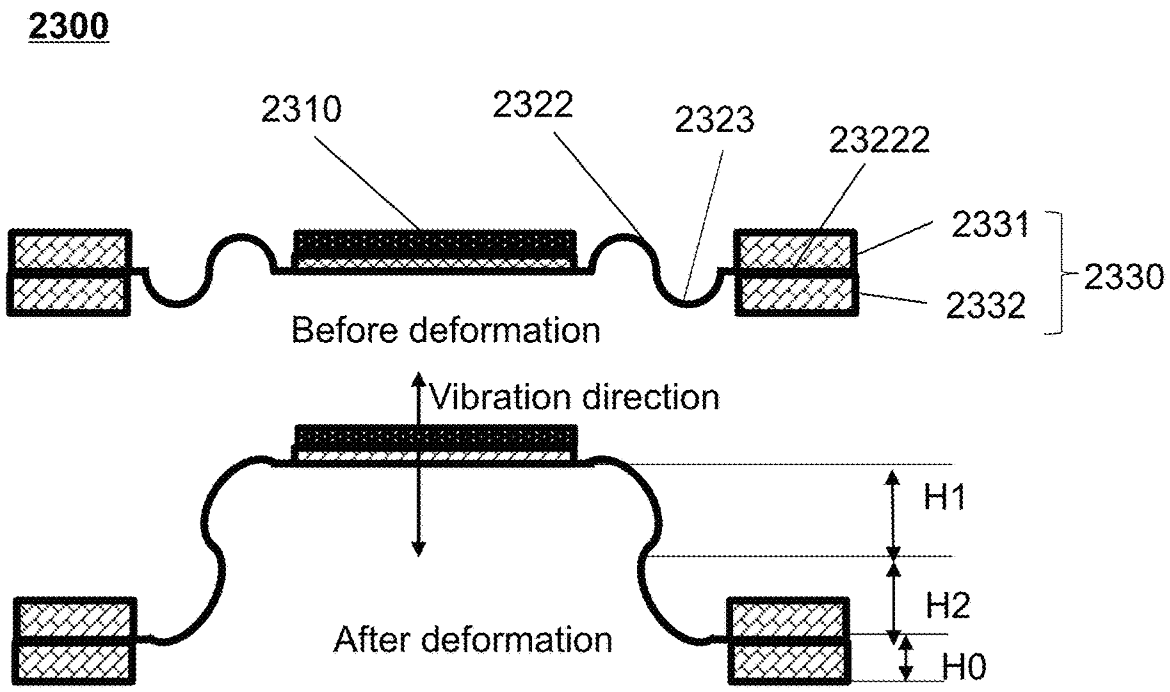
FIG. 31 is a structural diagram illustrating an exemplary vibration component according to some embodiments of the present disclosure.
Figure 32:
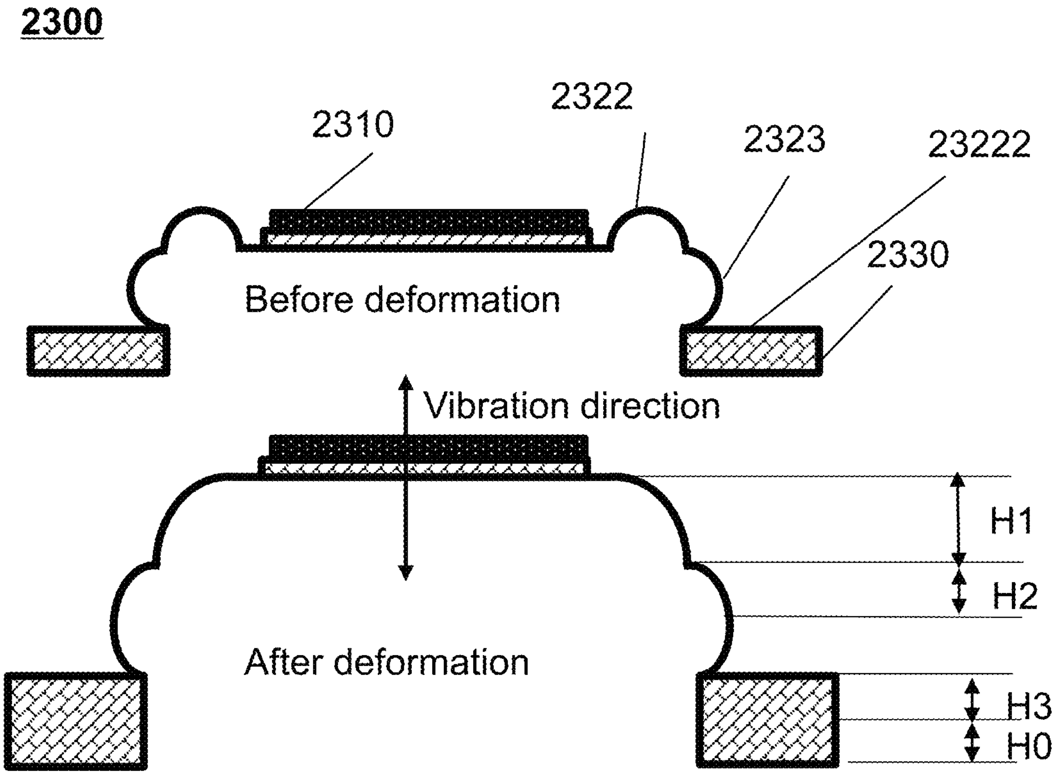
FIG. 32 is a structural diagram illustrating an exemplary vibration component according to some embodiments of the present disclosure.

In some embodiments, referring to FIGS. 31 and 32, the supporting element 2330 of the vibration component 2300 may be connected to the second preprocessing region 2323. Specifically, the fixed region 23222 of the elastic element 2320 may be located at a periphery of the second preprocessing region 2323, and encircle a circumferential side of the second preprocessing region 2322 and may be mechanically connected to the circumferential side of the second preprocessing region 2322. The supporting element 2330 may be located on any surface of the fixed region 23222 along the vibration direction of the mass element 2310, and may be connected to the second preprocessing region 2323 through the fixed region 23222.

In some embodiments, referring to FIG. 31, the supporting element 2330 may not be deformed along the vibration direction of the mass element 2310, i.e., the supporting element 2330 may not provide the mass element 2310 with the third displacement H3 along the vibration direction of the mass element 2310. In this arrangement, during the vibration of the vibration component 2300, the first preprocessing region 2322 may provide the mass element 2310 with the first displacement H1 along the vibration direction of the mass element 2310. The second preprocessing region 2323 of the elastic element 2320 may provide the mass element 2310 with the second displacement H2 along the vibration direction of the mass element 2310. The first displacement H1 and the second displacement H2 may be superimposed to constitute the vibration displacement or the vibration amplitude of the mass element 2310 along the vibration direction of the mass element 2310.

In some embodiments, referring to FIG. 32, the supporting element 2330 may be deformed along the vibration direction of the mass element 2310, and the supporting element 2330 may provide the mass element 2310 with the third displacement H3 along the vibration direction of the mass element 2310. In this arrangement, during the vibration of the vibration component 2300, the first preprocessing region 2322 of the elastic element 2320 may provide the mass element 2310 with the first displacement H1 along the vibration direction of the mass element 2310. The second preprocessing region 2323 of the elastic element 2320 may provide the mass element 2310 with the second displacement H2 along the vibration direction of the mass element 2310. The deformation portion 2332 of the supporting element 2330 may provide the mass element 2310 with the third displacement H3 along the vibration direction of the mass element 2310. The first displacement H1, the second displacement H2, and the third displacement H3 may be superimposed to constitute the vibration displacement or the vibration amplitude of the mass element 2310 along the vibration direction of the mass element 2310.

In some embodiments, the first preprocessing region 2322, the second preprocessing region 2323, and the supporting element 2330 (the deformation portion 2332) may be disposed in the vibration component 2300, which may increase the vibration displacement or the vibration amplitude (including the first displacement H1, the second displacement H2, and the third displacement H3) of the mass element 2310 along the vibration direction of the mass element 2310. On the one hand, the vibration displacement or the vibration amplitude of the mass element 2310 in the vibration direction of the mass element 2310 may be increased, since the first preprocessing region 2322, the second preprocessing region 2323, and the deformation portion 2332 of the supporting element 2330 are more prone to deformation, which may prevent the stress generated by the elastic element 2320 from concentrating at some specific positions (e.g., the connection position between the elastic element 2320 and the supporting element 2330) during the vibration of the elastic element 2310, and prevent the elastic element 2320 from being damaged. When the vibration component 2300 is subjected to a relatively large external vibration, the first preprocessing region 2322, the second preprocessing region 2323, and the supporting element 2330 may store vibration shock energy in the form of deformation energy in the first preprocessing region 2322, the second preprocessing region 2323, and the supporting element 2330, respectively through deformations, and the first preprocessing region 2322, the second preprocessing region 2323, and the supporting element 2330 may perform a plurality of damping attenuation movements, thereby dispersing the relatively large vibration shock energy through the damping movements, preventing the vibration component 2300 (especially, the elastic element 2320) from being damaged when receiving external vibration, and improving the reliability of the vibration component 2300. On the other hand, the vibration displacement or the vibration amplitude of the mass element 2310 in the vibration direction of the mass element 2310 may be increased, which may make the mass element 2310 push more air to vibrate during the vibration, thereby improving the low-frequency performance of the vibration component 2300.

FIGS. 33-38 are structural diagrams illustrating exemplary vibration components according to some embodiments of the present disclosure.

In some embodiments, the vibration component 3300 may include a mass element 3310, an elastic element 3320, and a flexible connection layer 3340. The flexible connection layer 3340 may be located between the elastic element 3320 and the mass element 3310, so that the elastic element 3320, the flexible connection layer 3340, and the mass element 3310 may be disposed in sequence along the vibration direction of the mass element 3310. The mass element 3310 may be connected to the elastic element 3320 through the flexible connection layer 3340. In some embodiments, a structure of the flexible connection layer 3340 may be a regular and/or irregular structure such as a plate structure, a film structure, or a ring structure.

In some embodiments, on the one hand, the mass element 3310 may be connected to the elastic element 3320 through the flexible connection layer 3340, which may increase a connection strength between the mass element 3310 and the elastic element 3320, prevent the mass element 3310 from disengaging from the elastic element 3320 during the vibration of the vibration component 3300 (or in a process of the vibration component 3300 being subjected to an external vibration shock), and improve the reliability and shock resistance of the vibration component 3300. On the other hand, the flexible connection layer 3340 may have a greater deformability, so that when the vibration component 3300 vibrates (or is subjected to the external vibration shock), the flexible connection layer 3340 may store vibration shock energy in the form of deformation energy through deformation in the flexible connection layer 3340, and the flexible connection layer 3340 may perform a plurality of damping attenuation movements, thereby dispersing the relatively large vibration shock energy through the damping movements, reducing vibration energy transmitted from the mass element 3310 to the elastic element 3320, preventing the elastic element 3320 from preventing stress concentration from being generated on the elastic element 3320, and increasing the reliability of vibration component 3300.

In some embodiments, the elastic element 3320 of the vibration component 3300 may include a first preprocessing region 3322. The first preprocessing region 3322 may include a first bending ring (not shown). The first bending ring of the first preprocessing region 3322 may have a relatively strong deformability along the vibration direction of the mass element 3310. The first bending ring of the first preprocessing region 3322 may increase a first displacement provided by the first preprocessing region 3322 for the mass element 3310 along the vibration direction of the mass element 3310. In some embodiments, when the first preprocessing region 3322 includes the first bending ring, the flexible connection layer 3340 may cover a connection region 3321 of the elastic element 3320, so that the flexible connection layer 3340 may increase the connection strength between the mass element 3310 and the elastic element 3320 while not affecting a deformation quantity generated by the first bending ring along the vibration direction of the mass element 3310 (i.e., the first displacement provided by the first bending ring for the mass element 3310 along the vibration direction of the mass element 3310). In some embodiments, the flexible connection layer 3340 may also cover the connection region 3321 and the first preprocessing region 3322 of the elastic element 3320, so that the flexible connection layer 3340 may absorb more shock energy.

In some embodiments, the elastic element 3320 of the vibration component 3300 may include the first preprocessing region 3322 and a second preprocessing region 3323. The first preprocessing region 3322 may include the first bending ring (not shown). The second preprocessing region 3323 may include a second bending ring (not shown). The first bending ring of the first preprocessing region 3322 may increase the first displacement provided by the first preprocessing region 3322 for the mass element 3310 along the vibration direction of the mass element 3310. The second bending ring of the second preprocessing region 3323 may increase a second displacement provided by the second preprocessing region 3323 for the mass element 3310 along the vibration direction of the mass element 3310. In some embodiments, when the first preprocessing region 3322 includes the first bending ring, and the second preprocessing region 3323 includes the second bending ring, the flexible connection layer 3340 may cover the connection region 3321 of the elastic element 3320, so that the flexible connection layer 3340 may increase the connection strength between the mass element 3310 and the elastic element 3320, while not affecting the deformation quantity generated by the first bending ring along the vibration direction of the mass element 3310 (i.e., the first displacement provided by the first bending ring for the mass element 3310 along the vibration direction of the mass element 3310), and a deformation quantity generated by the second bending ring along the vibration direction of the mass element 3310 (i.e., the second displacement provided by the second bending ring to the mass element 3310 along the vibration direction of the mass element 3310). In some embodiments, the flexible connection layer 3340 may also cover the connection region 3321, the first preprocessing region 3322, and the second preprocessing region 3323 of the elastic element 3320, so that the flexible connection layer 3340 may absorb more shock energy. In some embodiments, the flexible connection layer 3340 may also cover only the connection region 3321 and the first preprocessing region 3322 of the elastic element 3320.

In some embodiments, a preprocessing region (e.g., the first preprocessing region 3322 or the second preprocessing region 3323) of the elastic element 3320 of the vibration component 3300 may not include a bending ring (e.g., the first bending ring or the bending ring). The preprocessing region that does not include the bending ring (e.g., a region of a material with a reduced hardness) may also provide the mass element 3310 with a displacement along the vibration direction of the mass element 3310. In some embodiments, when the first preprocessing region 3322 and the second preprocessing region 3323 do not include the bending rings, the flexible connection layer 3340 may cover a portion of the elastic element 3320. For example, the flexible connection layer 3340 may cover the connection region 3321 of the elastic element 3320. As another example, the flexible connection layer 3340 may cover the connection region 3321 and the first preprocessing region 3322 of the elastic element 3320. In some embodiments, when the first preprocessing region 3322 and the second preprocessing region 3323 do not include the bending rings, the flexible connection layer 3340 may completely cover the elastic element 3320. For example, the flexible connection layer 3340 may cover the connection region 3321, the first preprocessing region 3322, and the second preprocessing region 3323 of the elastic element 3320.

In some embodiments, the elastic element 3320 of the vibration component 3300 may also not include a preprocessing region. In this arrangement, the flexible connection layer 3340 may cover a portion of the elastic element 3320, for example, a region where the elastic element 3320 is in contact with the mass element 3310. In some embodiments, the flexible connection layer 3340 may also completely cover the elastic element 3320, so that the flexible connection layer 3340 may absorb more vibration shock energy of the mass element 3310, thereby reducing the vibration energy transmitted from the mass element 3310 to the elastic element 3320, preventing stress concentration from being generated on the elastic element 3320, and improving the reliability of the vibration component 3300.

It should be noted that the connection region 3321, the first preprocessing region 3322, and the second preprocessing region 3323 of the elastic element 3320 may be made of different materials, have different stiffnesses, or have different shapes. In some embodiments, the stiffness of the first preprocessing region 3322 and the stiffness of the second preprocessing region 3323 may be smaller than the stiffness of the connection region 3321.

In some embodiments, a material of the flexible connection layer 3340 may include an organic polymer material, a rubber-like material, or the like, or any combination thereof. In some embodiments, the organic polymer material may include but be not limited to a polyimide (PI), a parylene, a polydimethylsiloxane (PDMS), a hydrogel, etc., or any combination thereof. The rubber-like material may include but be not limited to a gel, a silicone, an acrylic, a polyurethane, a rubber, an epoxy, a hot melt, a light curing, or the like, or any combination thereof. In some embodiments, in order to increase a connection force between the mass element 3310 and the elastic element 3320 and prevent the mass element 3310 from disengaging from the elastic element 3320 during the vibration of the vibration component 3300, the material of the flexible connection layer 3340 may be a silicone adhesive glue, a silicone sealing glue, etc.

In some embodiments, an equivalent damping, an equivalent total mass, and an equivalent stiffness of the vibration component 3300 may be adjusted by setting structural parameters of the flexible connection layer 3340, thereby adjusting (increasing or decreasing) the resonance frequency and a Q value of the vibration component 3300. In some embodiments, the structural parameters of the flexible connection layer 3340 may include but be not limited to, one or more of a material, a mass, a stiffness, a structural shape, etc. of the flexible connection layer 3340. In some embodiments, the stiffness of the flexible connection layer 3340 may be smaller than the stiffness of the elastic element 3320, which may reduce the influence of the flexible connection layer 3340 on the equivalent stiffness of the vibration component 3300, so that after the flexible connection layer 3340 is disposed, an increase of the equivalent stiffness of the vibration component 3300 may be relatively small. In some embodiments, the flexible connection layer 3340 may have a hole structure (not shown), and the hole structure may reduce the stiffness of the flexible connection layer 3340, thereby reducing the impact of the flexible connection layer 3340 on the equivalent stiffness of the vibration component 3300. In some embodiments, the hole structure may be located inside and/or on a circumferential side of the flexible connection layer 3340, and a shape of a cross-section of the hole structure parallel to the vibration direction of the mass element 3310 may be a regular and/or irregular polygon such as a circle, an ellipse, an arc, or a quadrangle.

In some embodiments, a tensile strength of the flexible connection layer 3340 may be in a range of 0.5 MPa-200 MPa. In some embodiments, the tensile strength of the flexible connection layer 3340 may be in a range of 0.5 MPa-100 MPa. In some embodiments, the tensile strength of the flexible connection layer 3340 may be in a range of 0.5 MPa-50 MPa.

In some embodiments, a height of a projection of the flexible connection layer 3340 along the vibration direction of the mass element 3310 may be in a range of 10 um-600 um. In some embodiments, the height of the projection of the flexible connection layer 3340 along the vibration direction of the mass element 3310 may be in a range of 20 um-500 um. In some embodiments, the height of the projection of the flexible connection layer 3340 along the vibration direction of the mass element 3310 may be in a range of 50 um-200 um.

In some embodiments, after the flexible connection layer 3340 is disposed, the height of the projection of the elastic element 3320 along the vibration direction of the mass element 3310 may be correspondingly reduced, so that a total height of the projection of the flexible connection layer 3340 and the elastic element 3320 along the vibration direction of the mass element 3310 may be within a certain range. In some embodiments, the total height of the projection of the flexible connection layer 3340 and the elastic element 3320 along the vibration direction of the mass element 3310 may be in a range of 10 μm~1000 μm. In some embodiments, the total height of the projection of the flexible connection layer 3340 and the elastic element 3320 along the vibration direction of the mass element 3310 may be in a range of 10 μm~800 μm. In some embodiments, the total height of the projection of the flexible connection layer 3340 and the elastic element 3320 along the vibration direction of the mass element 3310 may be in a range of 10 μm~500 μm. In some embodiments, the total height of the projection of the flexible connection layer 3340 and the elastic element 3320 along the vibration direction of the mass element 3310 may be in a range of 10 μm~300 μm. In some embodiments, the total height of the projection of the flexible connection layer 3340 and the elastic element 3320 along the vibration direction of the mass element 3310 may be in a range of 10 μm~100 μm.

Figure 33:
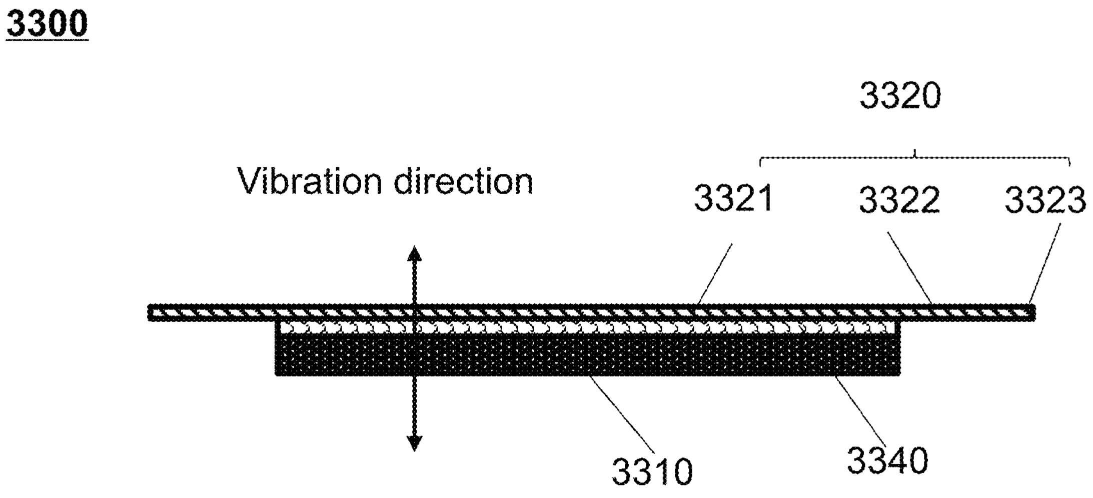
FIG. 33 is a structural diagram illustrating an exemplary vibration component according to some embodiments of the present disclosure.

In some embodiments, by setting a projection area of the flexible connection layer 3340 along the vibration direction of the mass element 3310, the mass of the flexible connection layer 3340 may be adjusted, thereby adjusting the equivalent mass and equivalent stiffness of the vibration component 3300. In some embodiments, the projection area of the flexible connection layer 3340 along the vibration direction of the mass element 3310 may be equal to a projection area of the mass element 3310 along the vibration direction of the mass element 3310. In this case, the flexible connection layer 3340 may completely cover the mass element 3310. As used herein, a projection of a component (e.g., the mass element 3310, the flexible connection layer 3340) along the vibration direction is obtained by projecting the component along the vibration direction on a plane perpendicular to the vibration direction, and a projection area of the component refers to the area of the projection on the plane perpendicular to the vibration direction. For example, as shown in FIG. 33, the projection area of the projection of the flexible connection layer 3340 on the plane perpendicular to the vibration direction is equal to that of the mass element 3310. In some embodiments, the projection area of the flexible connection layer 3340 along the vibration direction of the mass element 3310 may be larger than the projection area of the mass element 3310 along the vibration direction of the mass element 3310. At this case, the flexible connection layer 3340 may exceed a region where the mass element 3310 is located. In some embodiments, a portion of the projection area of the flexible connection layer 3340 along the vibration direction of the mass element 3310 exceeding the mass element 3310 may be smaller than or equal to the projection area of the mass element 3310 along the vibration direction of the mass element 3310. In some embodiments, the projection area of the flexible connection layer 3340 along the vibration direction of the mass element 3310 may be smaller than the projection area of the mass element 3310 along the vibration direction of the mass element 3310. In this case, the flexible connection layer 3340 may not completely cover the mass element 3310, or the flexible connection layer 3340 may be intermittently disposed between the mass element 3310 and the elastic element 3320.

In some embodiments, a ratio of the projection area of the flexible connection layer 3340 along the vibration direction of the mass element 3310 to the projection area of the mass element 3310 along the vibration direction of the mass element 3310 may be in a range of 1:1.2-50:1. In some embodiments, the ratio of the projection area of the flexible connection layer 3340 along the vibration direction of the mass element 3310 to the projection area of the mass element 3310 along the vibration direction of the mass element 3310 may be in a range of 1:1-50:1. In some embodiments, the ratio of the projection area of the flexible connection layer 3340 along the vibration direction of the mass element 3310 to the projection area of the mass element 3310 along the vibration direction of the mass element 3310 may be in a range of 1:1-30:1. In some embodiments, the ratio of the projection area of the flexible connection layer 3340 along the vibration direction of the mass element 3310 to the projection area of the mass element 3310 along the vibration direction of the mass element 3310 may be in a range of 1:1-10:1. In some embodiments, the ratio of the projection area of the flexible connection layer 3340 along the vibration direction of the mass element 3310 to the projection area of the mass element 3310 along the vibration direction of the mass element 3310 may be in a range of 1:1-5:1. In some embodiments, the ratio of the projection area of the flexible connection layer 3340 along the vibration direction of the mass element 3310 to the projection area of the mass element 3310 along the vibration direction of the mass element 3310 may be in a range of 1:1-2:1. When the projection area of the flexible connection layer 3340 along the vibration direction of the mass element 3310 is smaller than or equal to the projection area of the mass element 3310 along the vibration direction of the mass element 3310, an influence of the flexible connection layer 3340 on the equivalent mass of the vibration component 3300 may be greater than an influence of the flexible connection layer 3340 on the equivalent stiffness of the vibration component 3300, i.e., the flexible connection layer 3340 may mainly increase the equivalent mass of the vibration component 3300.

Figure 34:
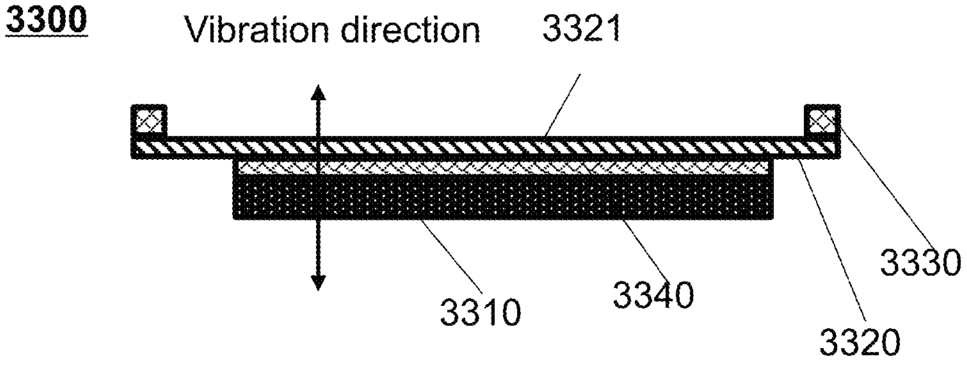
FIG. 34 is a structural diagram illustrating an exemplary vibration component according to some embodiments of the present disclosure.
Figure 35:
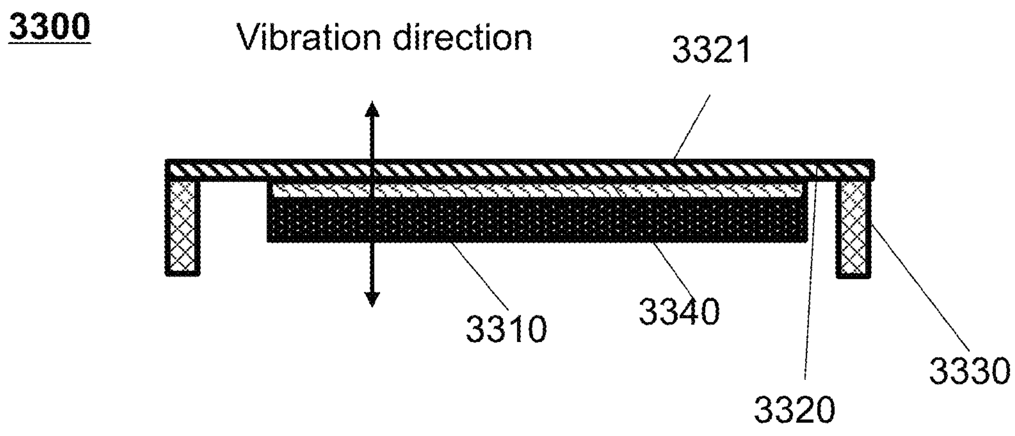
FIG. 35 is a structural diagram illustrating an exemplary vibration component according to some embodiments of the present disclosure.
Figure 36:
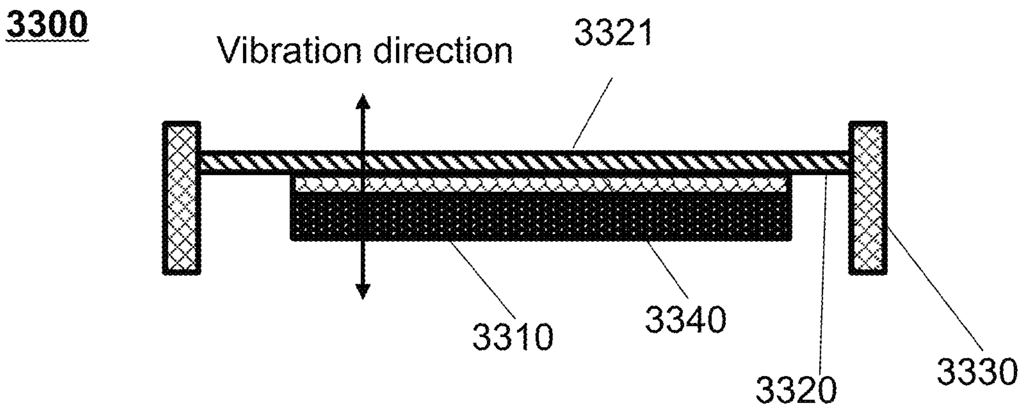
FIG. 36 is a structural diagram illustrating an exemplary vibration component according to some embodiments of the present disclosure.

In some embodiments, referring to FIGS. 34-36, the vibration component 3300 may further include a supporting element 3330. The supporting element 3330 may encircle the elastic element 3320 and may be mechanically connected to the elastic element 3320, and may be configured to support the elastic element 3320. Specifically, as shown in FIG. 34 and FIG. 35, the supporting element 3330 may be disposed on any surface of the elastic element 3320 perpendicular to the vibration direction of the mass element 3310. The supporting element 3330 may encircle a circumferential side of any surface of the elastic element 3320 and may be mechanically connected to the circumferential side of the surface of the elastic element 3320. As shown in FIG. 36, the supporting element 3330 may also be disposed on an outer side of the elastic element 3320, and the supporting element 3330 may encircle the outer side and may be mechanically connected to the outer side of the elastic element 3320.

Figure 37:
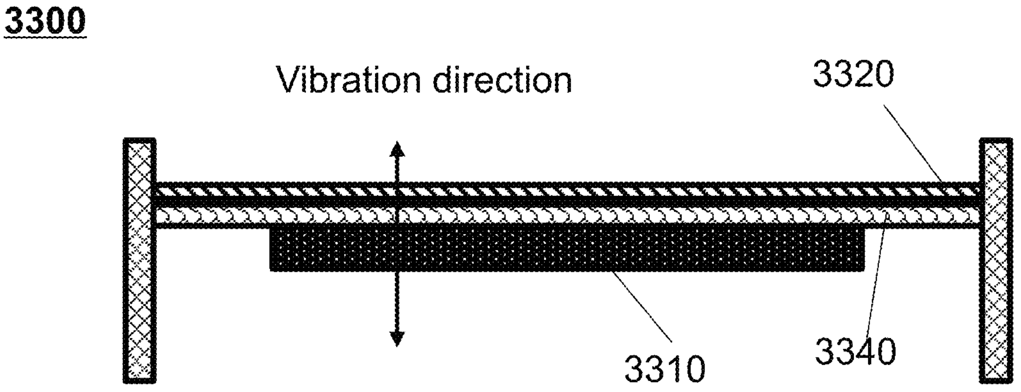
FIG. 37 is a structural diagram illustrating an exemplary vibration component according to some embodiments of the present disclosure.

In some embodiments, referring to FIG. 37, the flexible connection layer 3340 may cover the elastic element 3320, and the flexible connection layer 3340 may encircle the supporting element 3330 and may be mechanically connected to the supporting element 3330. Specifically, the elastic element 3320 may be connected to the flexible connection layer 3340 sequentially, and a circumferential side of the elastic element 3320 may be flush with a circumferential side of the flexible connection layer 3340, so that the flexible connection layer may completely cover the elastic element 3320. The supporting element 3330 may be disposed on the outer side of the flexible connection layer 3340 (or the elastic element 3320), and the supporting element 3330 may encircle the outer side of the flexible connection layer 3340 (or the elastic element 3320) and may be mechanically connected to the outer side of the flexible connection layer 3340 (or the elastic element 3320). In some embodiments, the flexible connection layer 3340 may also partially cover the elastic element 3320 (e.g., as shown in FIGS. 34-36). The flexible connection layer 3340 may cover a portion of the elastic element 3320 (i.e., the connection region 3321), the supporting element 3330 may be connected to the circumferential side of the elastic element 3320, and there may be a gap between the supporting element 3330 and the flexible connection layer 3340. In some embodiments, the vibration component 3300 may not include the supporting element 3330. When the flexible connection layer 3340 covers the elastic element 3320, the circumferential side of the elastic element 3320 and the circumferential side of the flexible connection layer 3340 may be in a free state. When the vibration component 3300 is used in a sensor device (e.g., a sound transmission device), the elastic element 3320 and the flexible connection layer 3340 may be connected to a housing of the sensor device. When the flexible connection layer 3340 covers the elastic element 3320, the flexible connection layer 3340 may have a greater impact on the equivalent stiffness of the vibration component 3300 than on the equivalent mass of the vibration component 3300, that is, the flexible connection layer 3340 may mainly increase the equivalent stiffness of the vibration component 3300.

Figure 38:
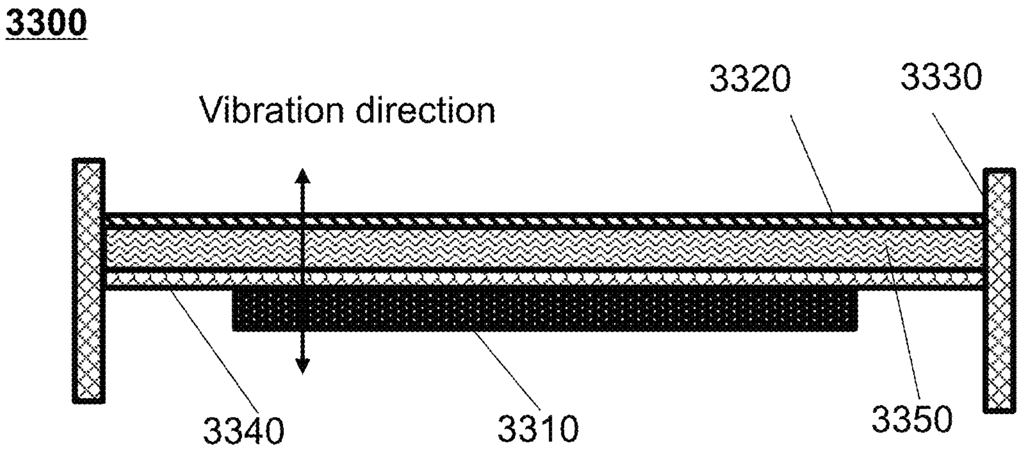
FIG. 38 is a structural diagram illustrating an exemplary vibration component according to some embodiments of the present disclosure.

In some embodiments, referring to FIG. 38, the flexible connection layer 3340 and the elastic element 3320 may be spaced apart, so that a gap 3350 may be formed between the flexible connection layer 3340 and the elastic element 3320. In some embodiments, the gap 3350 may form a closed spatial structure with the supporting element 3330. In some embodiments, the gap 3350 may be filled with liquid. In some embodiments, the liquid filled in the gap 3350 may be liquid with safety performance (e.g., non-flammable or non-explosive) and stable performance (e.g., non-volatile, not prone to high temperature deterioration or vaporization). In some embodiments, the liquid may include but be not limited to, oil (e.g., silicone oil, glycerin, castor oil, motor oil, lubricating oil, hydraulic oil (e.g., aviation hydraulic oil)), water (e.g., purified water, aqueous solutions of other inorganic or organic substances (e.g., brine)), oil-water emulsion, or liquid that meets a performance requirement thereof, or the like, or any combination thereof. Optionally, some air bubbles may exist in the liquid filled in the gap 3350.

In some embodiments, a height of the gap 3350 along the vibration direction of the mass element 3310 may be in a range of 50 um-5000 um. In some embodiments, the height of the gap 3350 along the vibration direction of the mass element 3310 may be in a range of 100 um-4000 um. In some embodiments, the height of the gap 3350 along the vibration direction of the mass element 3310 may be in a range of 1000 um-2000 um. In some embodiments, the height of the gap 3350 along the vibration direction of the mass element 3310 may be in a range of 500 um-1000 um.

In some embodiments, when the mass element 3310 vibrates (or is subject to a large vibration shock), the mass element 3310 may generate relatively large vibration energy, and the vibration energy may be transmitted to the elastic element 3320. In some embodiments, the liquid filled in the gap 3350 may attenuate the vibration energy transmitted from the mass element 3310 to the elastic element 3320, which may reduce the vibration energy transmitted from the mass element 3310 to the elastic element 3320, and avoid stress concentration on the elastic element 3320, thereby improving the reliability of the vibration component 3300 (especially, the elastic element 3320).

Figure 39:
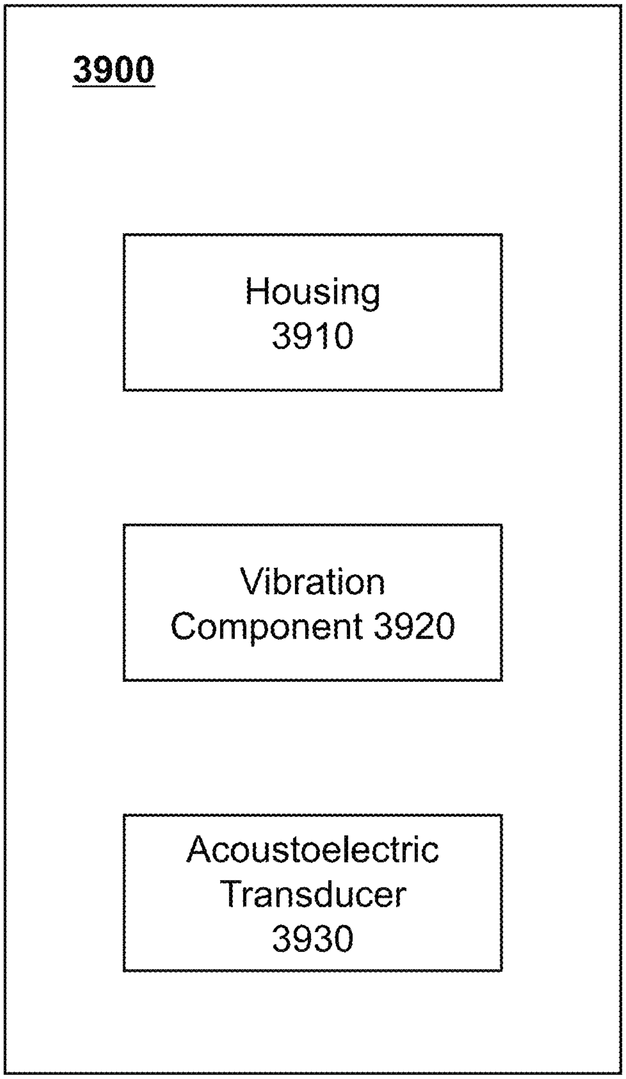
FIG. 39 is a block diagram illustrating an exemplary sound transmission device according to some embodiments of the present disclosure.

FIG. 39 is a block diagram illustrating an exemplary sound transmission device according to some embodiments of the present disclosure.

In some embodiments, the acoustic transmission device 3900 may be configured to convert an external signal (e.g., a sound signal, a vibration signal, a pressure signal) into a target signal (e.g., an electrical signal). For example, the sound transmission device 3900 may generate a mechanical vibration signal based on the sound signal, and the mechanical vibration signal may be further converted into the electrical signal by a transducing component (i.e., an acoustoelectric transducer 3930) of the sound transmission device 3900. In some embodiments, the sound transmission device 3900 may generate deformation and/or displacement based on an external signal (e.g., a mechanical signal (e.g., a pressure, a mechanical vibration), an electrical signal, an optical signal, or a thermal signal) other than the sound signal. The deformation and/or displacement may be further converted into the target signal by the transducing component of the sound transmission device 3900. In some embodiments, the target signal may include but be not limited to, the electrical signal, the mechanical signal (e.g., the mechanical vibration), the sound signal (e.g., a sound wave), the optical signal, the thermal signal, or the like, or any combination thereof. In some embodiments, the sound transmission device 3900 may be a microphone (e.g., an air conduction microphone or a bone conduction microphone), an accelerometer, a pressure sensor, a hydrophone, an energy harvester, a gyroscope, etc. The air conduction microphone refers to a microphone in which sound waves are conducted through the air. The bone conduction microphone refers to a microphone in which sound waves are mainly conducted through a solid (e.g., bone) in the form of the mechanical vibration. In some embodiments, the sound transmission device 3900 may also be a microphone combined with bone conduction and air conduction.

In some embodiments, the sound transmission device 3900 may include a housing 3910, a vibration component 3920, and an acoustoelectric transducer 3930. The housing 3910 may be a regular or irregular three-dimensional structure with an acoustic cavity (i.e., a hollow portion) inside. In some embodiments, the housing 3910 may be a hollow frame structure. In some embodiments, the hollow frame structure may include but be not limited to, a regular shape (e.g., a rectangular frame, a circular frame, or a regular polygonal frame), or any irregular shape. In some embodiments, the housing 3910 may be made of a metal (e.g., a stainless steel, a copper, etc.), a plastic (e.g., a polyethylene (PE), a polypropylene (PP), a polyvinyl chloride (PVC), a polystyrene (PS), or an acrylonitrile butadiene styrene copolymer (ABS), a composite material (e.g., a metal matrix composite or a non-metal matrix composite), etc. In some embodiments, the vibration component 3920 and the acoustoelectric transducer 3930 may be located in the acoustic cavity formed by the housing 3910 or at least partially suspended in the acoustic cavity of the housing 3910.

The vibration component 3920 may receive the vibration signal to generate vibration. In some embodiments, the vibration component 3920 may vibrate relative to the housing 3910 based on the vibration of the housing 3910. The vibration component 3920 may be any vibration component shown in FIGS. 1-38 in the embodiments of the present disclosure, for example, the vibration component 100, the vibration component 200, the vibration component 1100, or the vibration component 2300. In some embodiments, the vibration component 3920 may be located in the acoustic cavity formed by the housing 3910 or at least partially suspended in the acoustic cavity of the housing 3910, and the vibration component 3920 may be directly or indirectly connected to the housing 3910, thereby separating the acoustic cavity into a plurality of acoustic cavities including a first acoustic cavity and a second acoustic cavity.

In some embodiments, the vibration component 3920 may include a mass element and an elastic element. The mass element may be disposed on the elastic element. Specifically, the mass element may be disposed on an upper surface and/or a lower surface of the elastic element along the vibration direction of the mass element. The upper surface of the elastic element along the vibration direction of the mass element may be a surface of the elastic element close to the acoustoelectric transducer 3930 along the vibration direction of the mass element. The lower surface of the elastic element along the vibration direction of the mass element may be a surface of the elastic element away from the acoustoelectric transducer 3930 along the vibration direction of the mass element. In some embodiments, the mass element may also be disposed in a middle of the elastic element. The mass element may encircle the elastic element and may be mechanically connected to the mass element along a side wall perpendicular to the vibration direction of the mass element. In some embodiments, the elastic element may include a connection region and one or more preprocessing regions. The connection region may be configured to support the mass element. The one or more preprocessing regions may be disposed around a periphery of the connection region. The one or more preprocessing regions may provide the mass element with one or more displacements in the vibration direction of the mass element. In some embodiments, deformability of the one or more preprocessing regions of the elastic element in the vibration direction of the mass element may be greater than deformabilities of other regions (e.g., the connection region) of the elastic element. The one or more preprocessing regions may generate relatively large deformation along the vibration direction of the mass element during the vibration, so that one or more preprocessing regions may provide the mass element with one or more displacements along the vibration direction of the mass element.

In some embodiments, a circumferential side of the elastic element may be directly or indirectly connected to the housing 3910 and/or the acoustoelectric transducer 3930 (e.g., a substrate), thereby separating the acoustic cavity formed by the housing 3910 into the first acoustic cavity and the second acoustic cavity. In some embodiments, the substrate of the acoustoelectric transducer 3930 may be located in the acoustic cavity formed by the housing 3910 or at least partially suspended in the acoustic cavity of the housing 3910, and a circumferential side of the substrate may be connected to an inner wall of the housing 3910. The elastic element may be located on a side (i.e., a lower side of the substrate) of the substrate away from the acoustoelectric transducer 3930 and may be spaced apart from the substrate, and the circumferential side of the elastic element may be connected to an inner wall of the housing 3910, so that the first acoustic cavity may be formed between the upper surface of the elastic element along the vibration direction of the mass element, the acoustoelectric transducer 3930 (e.g., the substrate), and the housing 3910. When the circumferential side of the elastic element is connected to the inner wall of the housing 3910, the second acoustic cavity may be formed between the lower surface of the elastic element along the vibration direction of the mass element and the housing 3910. When the housing 3910 of the acoustic device 3900 vibrates in response to the external sound signal, since characteristics of the vibration component 3920 (the mass element and the elastic element) are different from those of the housing 3910, the mass element and the elastic element of the vibration component 3920 may move relative to the housing 3910, the mass element and the elastic element may cause the sound pressures in the first acoustic cavity and the second acoustic cavity to change during vibration relative to the housing 3910, and the sound transmission device 3900 (acoustoelectric transducer 3930) may convert the external sound signal into the electrical signal based on the change in the sound pressures in the first acoustic cavity and/or the second acoustic cavity.

The acoustoelectric transducer 3930 may be used to convert the external signal (e.g., the vibration signal) into the electrical signal including the sound signal. In some embodiments, the vibration component 3920 may receive the vibration signal of the housing 3910 and transmit the vibration signal to the first acoustic cavity. The vibration of the vibration component 3920 may cause the air in the first acoustic cavity to vibrate, thereby changing sound pressure in the first acoustic cavity. The acoustoelectric transducer 3930 may receive the vibration signal of the first acoustic cavity and convert the vibration signal of the first acoustic cavity into the electrical signal. In some embodiments, the acoustoelectric transducer 3930 may also convert the electrical signal including the sound signal into the vibration signal. In some embodiments, the acoustoelectric transducer 3930 may be electrically connected with a signal processing circuit of the acoustic device 3900 to receive the electrical signal (or a control signal), and convert the electrical signal into the vibration signal.

Taking the air-conduction microphone as an example, the acoustoelectric transducer 3930 may include a vibrating diaphragm, and the change in the sound pressure in the first acoustic cavity may act on the vibrating diaphragm, so that the vibrating diaphragm may vibrate (or deform), and the acoustoelectric transducer 3930 may convert the vibration of the vibrating diaphragm into the electrical signal.

FIGS. 40-49 are structural diagrams illustrating exemplary sound transmission devices according to some embodiments of the present disclosure.

Figure 40:
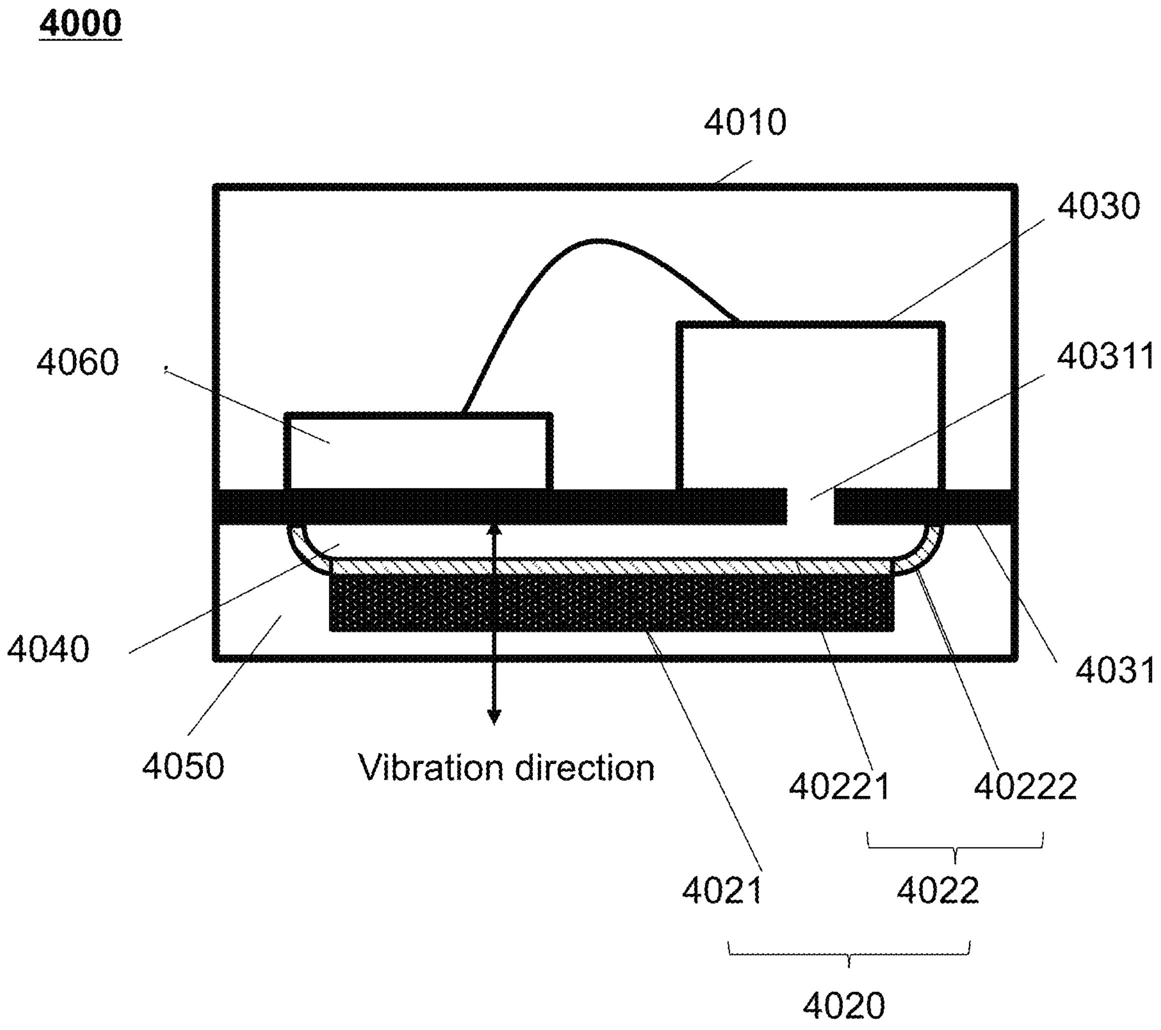
FIG. 40 is a structural diagram illustrating an exemplary sound transmission device according to some embodiments of the present disclosure.

In some embodiments, referring to FIG. 40, the sound transmission device 4000 may include a housing 4010, a vibration component 4020, and an acoustoelectric transducer 4030. The housing 4010 may be a regular or irregular three-dimensional structure with an acoustic cavity (i.e., a hollow portion) inside. For example, the housing 4010 may be a hollow frame structure. The hollow frame structure may include but be not limited to a regular shape (e.g., a rectangular frame, a circular frame, or a regular polygonal frame), or any irregular shape. The vibration component 4020 and the acoustoelectric transducer 4030 may be located in the acoustic cavity formed by the housing 4010 or at least partially suspended in the acoustic cavity of the housing 3910. In some embodiments, the acoustoelectric transducer 4030 may include a substrate 4031, and a circumferential side of the substrate 4031 may encircle an inner wall of the housing 4010 and may be mechanically connected to the inner wall of the housing 4010, thereby separating the acoustic cavity formed by the housing 4010 into two cavities disposed up and down. The acoustoelectric transducer 4030 may be located in a cavity corresponding to an upper surface of the substrate 4031, and the vibration component 4020 may be located in a cavity corresponding to a lower surface of the substrate 4031.

In some embodiments, the vibration component 4020 may include a mass element 4021 and an elastic element 4022. The mass element 4021 may be disposed on the elastic element 4022. Specifically, the mass element 4021 may be disposed on the upper surface and/or the lower surface of the elastic element 4022 along the vibration direction of the mass element 4021. In some embodiments, the elastic element 4022 may include a connection region 40221 and a first preprocessing region 40222. The connection region 40221 may be configured to support the mass element 4021. The first preprocessing region 40222 may be disposed around a periphery of the connection region 40221. An outer side of the first preprocessing region 40222 may be connected to the substrate 4031. In some embodiments, the first preprocessing region 40222 may provide the mass element 4021 with a first displacement along the vibration direction of the mass element 4021.

In some embodiments, a first acoustic cavity 4040 and a second acoustic cavity 4050 may be formed between the elastic element 4022 and the sound transmission device 4000. Specifically, an upper surface of the elastic element 4022 and the substrate 4031 may form the first acoustic cavity 4040, and a lower surface of the elastic element 4022 and the housing 4010 may form the second acoustic cavity 4050. In some embodiments, when the elastic element 4022 may be connected to the acoustic device 4000 in different manners, the first acoustic cavity 4040 and/or the second acoustic cavity 4050 may have different volumes. In some embodiments, referring to FIG. 40, when a circumferential side of the elastic element 4022 may be connected to the substrate 4031, the closer the connection position between the circumferential side of the elastic element 4022 and the substrate 4031 is to a middle of the substrate 4031, the smaller the volume of the first acoustic cavity 4040 is. The farther the connection position between the circumferential side of the elastic element 4022 and the substrate 4031 is from the middle of the substrate 4031, the larger the volume of the first acoustic cavity 4040 is. In some embodiments, the circumferential side of the elastic element 4022 may also be connected to the housing 4010. When the circumferential side of the elastic element 4022 is connected to the housing 4010, the closer the connection position of the elastic element 4022 to the housing 4010 is to the substrate 4031, the smaller the volume of the first acoustic cavity 4040 is. The farther the connection position between the elastic element 4022 and the housing 4010 is from the substrate 4031, the larger the volume of the first acoustic cavity 4040 is.

In some embodiments, the volume of the first acoustic cavity 4040 and a volume of the second acoustic cavity 4050 may be changed during the vibration of the mass element 4021. In some embodiments, the greater the vibration displacement or the vibration amplitude of the mass element 4021 along the vibration direction of the mass element 4021 is, the greater the change of the volume of the first acoustic cavity 4040 and the change of the volume of the second acoustic cavity 4050 are, i.e., the stronger the air vibration in the first acoustic cavity 4040 and the second acoustic cavity 4050 is. In some embodiments, the larger the volume of the first acoustic cavity 4040 is, the greater the design upper limit of the vibration amplitude of the mass element 4010 is, so that the mass element 4010 with a larger vibration amplitude may be designed, and the mass element 4010 may push more air to vibrate in the first acoustic cavity 4040 during the vibration, thereby improving the low-frequency performance of the sound transmission device 4000.

In some embodiments, the vibration of the mass element 4021 and the elastic element 4022 may cause the air in the first acoustic cavity 4040 to vibrate, and the air vibration in the first acoustic cavity 4040 may pass through at least one sound inlet hole 40311 disposed on the substrate 4031 and act on the acoustoelectric transducer 4030. The acoustoelectric transducer 4030 may convert the air vibration into an electrical signal or generate an electrical signal based on the change in the sound pressure in the first acoustic cavity 4040, and perform signal processing on the electrical signal through the processor 4060. In some embodiments, the processor 4060 may obtain the electrical signal from the acoustoelectric transducer 4030 and perform the signal processing. In some embodiments, the signal processing may include a frequency modulation processing, an amplitude modulation processing, a filtering processing, a noise reduction processing, etc. The processor 4060 may include a microcontroller, a microprocessor, an application-specific integrated circuit (ASIC), an application-specific instruction-set processor (ASIP), a central processing unit (CPU), a physical processing unit (PPU), a digital signal processor (DSP), a field programmable gate array (FPGA), an advanced reduced instruction set computer (ARM), a programmable logic device (PLD), or other types of processing circuits or processors.

Figure 41:
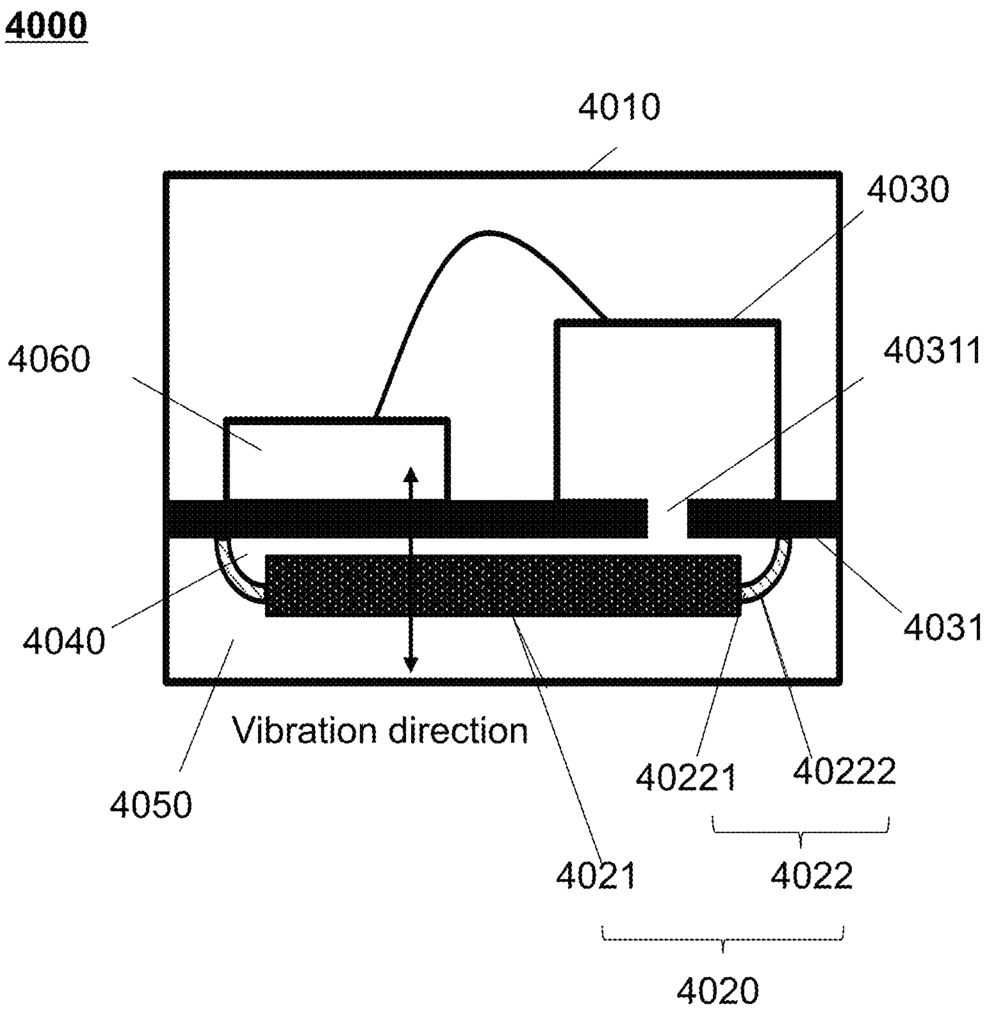
FIG. 41 is a structural diagram illustrating an exemplary sound transmission device according to some embodiments of the present disclosure.

In some embodiments, referring to FIG. 41, the connection region 40221 of the elastic element 4022 may encircle a sidewall of the mass element 4021 and may be mechanically connected to the sidewall of the mass element 4021. Specifically, the mass element 4021 may be located in a middle of the elastic element 4022, and the sidewall of the mass element 4021 may be encircled by the connection region 40221 of the elastic element 4022 and may be mechanically connected to the connection region 40221 of the elastic element 4022. In some embodiments, the connection region 40221 of the elastic element 4022 may encircle the sidewall of the mass element 4021 and may be mechanically connected to the sidewall of the mass element 4021, which may avoid edge connection between the elastic element 4022 and the mass element 4021, thereby reducing the stress concentration on a connection edge of the elastic element 4022, reducing the possibility of damage to the elastic element 4022 when the elastic element 4022 is shocked by external vibration, and improving the reliability of the sound transmission device 4000.

In some embodiments, when the connection region 40221 is connected to different positions of the sidewall of the mass element 4021, the first acoustic cavity 4040 and the second acoustic cavity 4050 may have different volumes, thereby changing the air vibration in the first acoustic cavity 4021 and the air vibration process in the second acoustic cavity 4050 caused during the vibration of the mass element 4021. Specifically, the closer the connection position of the connection region 40221 on the sidewall of the mass element 4021 is to the mass element 4021 along a surface (i.e., the upper surface of the mass element 4021) of the mass element 4021 facing the acoustoelectric transducer 4030, the smaller the volume of the first acoustic cavity 4040 is, the larger the volume of the second acoustic cavity 4050 is.

Figure 42:
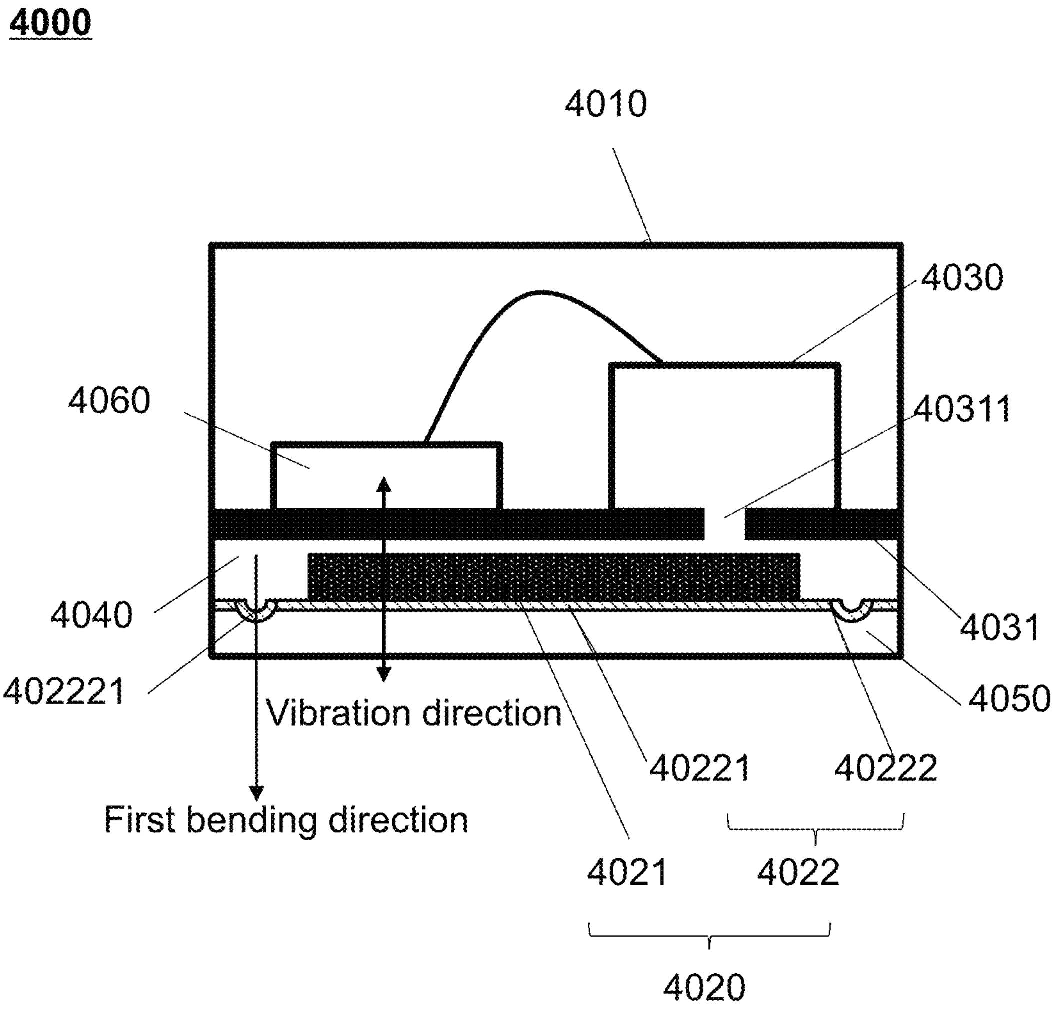
FIG. 42 is a structural diagram illustrating an exemplary sound transmission device according to some embodiments of the present disclosure.

In some embodiments, referring to FIG. 42, the first preprocessing region 40222 of the elastic member 4022 may be connected to the housing 4010. Specifically, the first preprocessing region 40222 may be disposed around the periphery of the connection region 40221, and the outer side of the first preprocessing region 40222 may be connected to the inner wall of the housing 4010. In this arrangement, the upper surface of the elastic element 4022, the substrate 4031, and the housing 4010 may form the first acoustic cavity 4040, and the lower surface of the elastic element 4022 and the housing 4010 may form the second acoustic cavity 4050.

In some embodiments, a height dimension of a first bending ring 402221 of the first preprocessing region 40222 along a first bending direction may affect a height dimension (or volume) of the first acoustic cavity 4040 and a height dimension (or volume) of the second acoustic cavity 4050.

Figure 43:
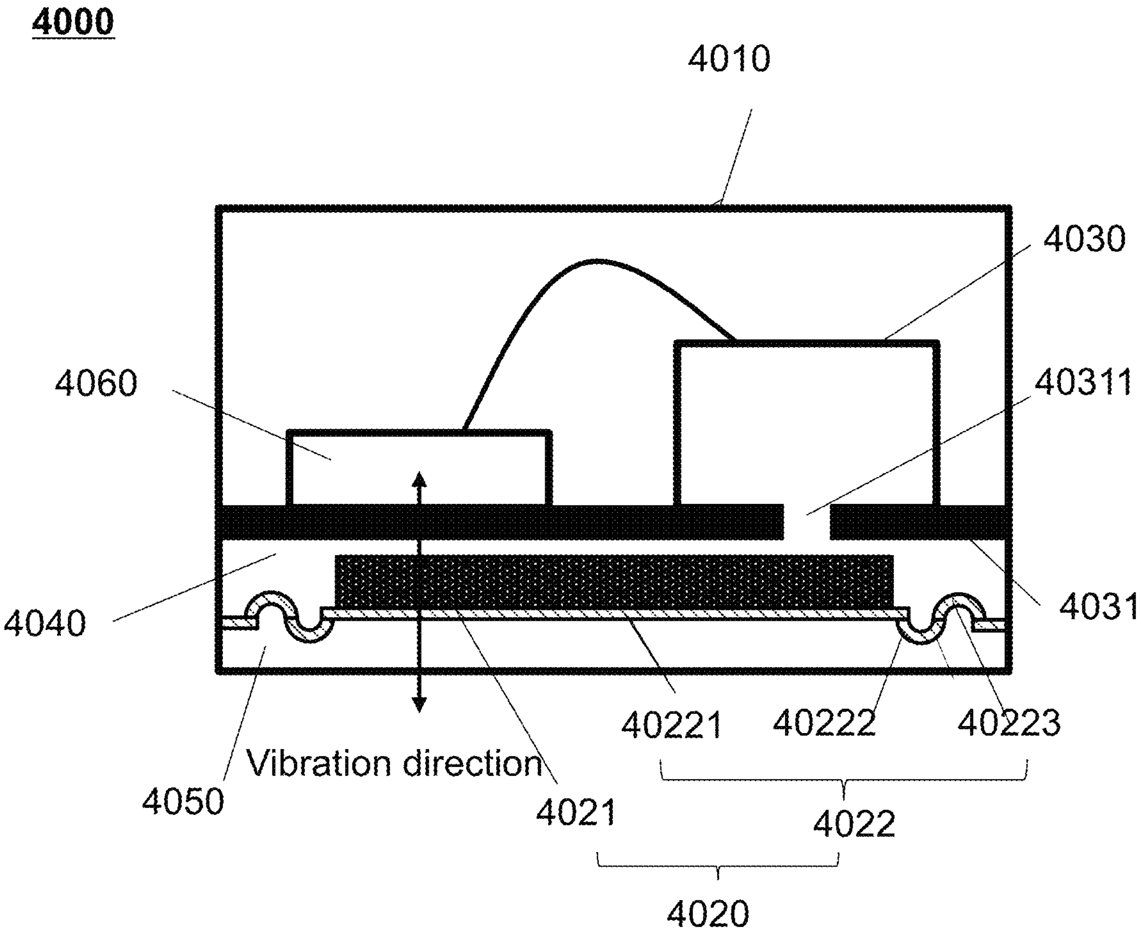
FIG. 43 is a structural diagram illustrating an exemplary sound transmission device according to some embodiments of the present disclosure.

In some embodiments, referring to FIG. 43, the elastic element 4022 may further include a second preprocessing region 40223, and the second preprocessing region 40223 may provide the mass element 4021 with a second displacement along the vibration direction of the mass element 4021. In some embodiments, the second preprocessing region 40223 may be disposed around a periphery of the first preprocessing region 40222, an inner side of the second preprocessing region 40223 may be connected to the outer side of the first preprocessing region 40222, and an outer side of the second preprocessing region 40223 may encircle the inner wall of the housing 4010 and may be mechanically connected to the inner wall of the housing 4010.

In some embodiments, the second preprocessing region 40223 of the elastic element 4022 may also be connected to the substrate 4031 of the acoustoelectric transducer 4030. Specifically, a circumferential side of the second preprocessing region 40223 may be connected to a lower surface of the substrate 4031 (i.e., a surface of the substrate 4031 away from the acoustoelectric transducer 4030).

In some embodiments, when the first preprocessing region 40222 and/or the second preprocessing region 40223 of the elastic element 4022 may be connected to the acoustic device 4000 in different manners, for example, the first preprocessing region 40222 and/or the second preprocessing region 40223 may be connected to the housing 4010, or the first preprocessing region 40222 and/or the second preprocessing region 40223 is connected to the substrate 4031, the volume of the first acoustic cavity 4040 and the volume of the second acoustic cavity 4050 of the sound transmission device 4000 may be different, thereby changing the air vibration in the first acoustic cavity 4040 and the air vibration in the second acoustic cavity 4050 caused during the vibration of the mass element 4031.

In some embodiments, referring to FIGS. 44-47, the vibration component 4020 may further include a supporting element 4023 configured to support the elastic element 4022. Specifically, the supporting element 4023 may be located on the circumferential side of the elastic element 4022, and an end or inner wall of the supporting element 4023 may encircle the elastic element 4022 and may be mechanically connected to the elastic element 4022.

Figure 44:
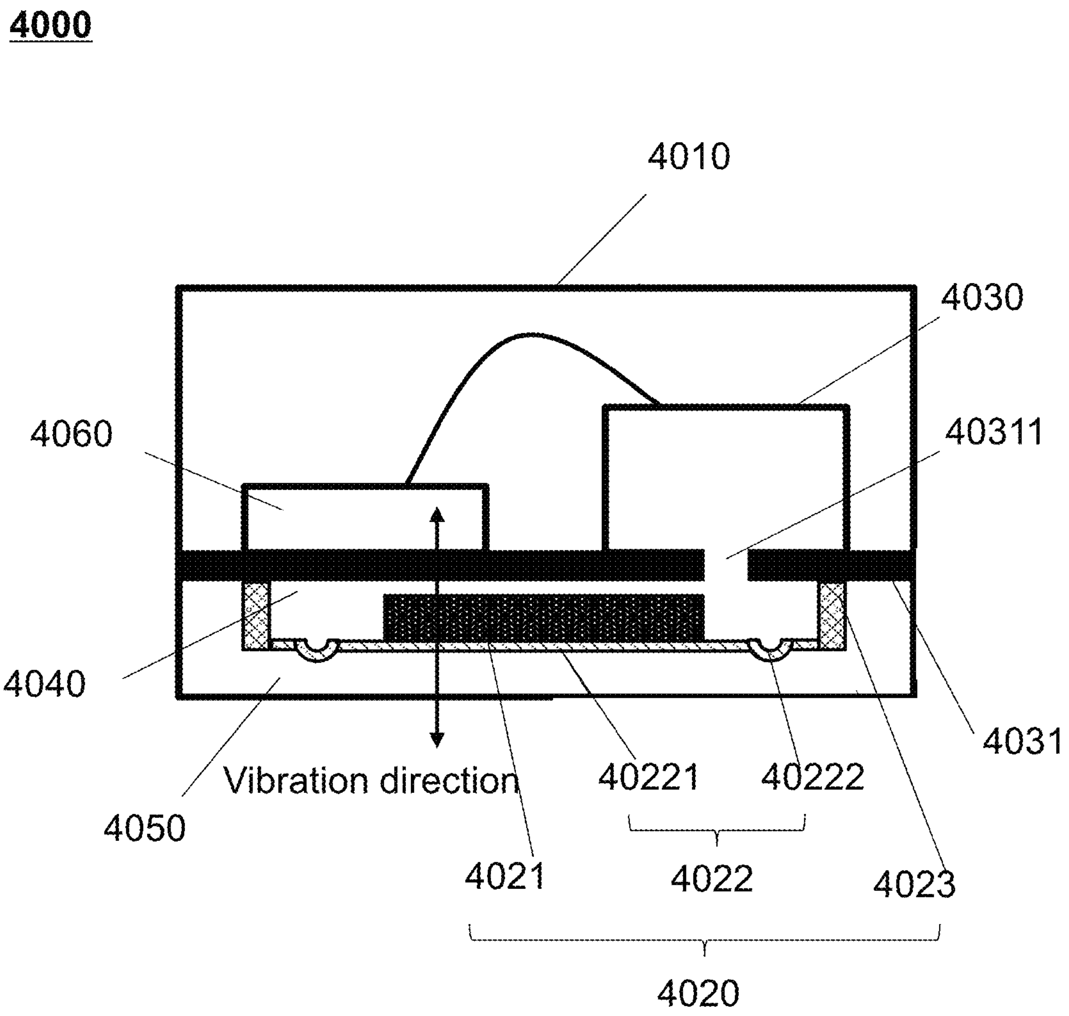
FIG. 44 is a structural diagram illustrating an exemplary sound transmission device according to some embodiments of the present disclosure.

In some embodiments, referring to FIG. 44, the supporting element 4023 may be located in the outer side of the first preprocessing region 40222 of the elastic element 4022. One end of the supporting element 4023 may encircle the outer side of the first preprocessing region 40222 and may be mechanically connected to the outer side of the first preprocessing region 40222, and the other end of the supporting element 4023 may encircle the lower surface of the substrate 4031 of the acoustoelectric transducer 4030 and may be mechanically connected to the lower surface of the substrate 4031 of the acoustoelectric transducer 4030. In this arrangement, the first acoustic cavity 4040 may be formed between the upper surface of the elastic element 4022, the supporting element 4023, and the substrate 4031, and the second acoustic cavity 4050 may be formed by the lower surface of the elastic element 4022, the supporting element 4023, the housing 4010, and the substrate 4031.

Figure 45:
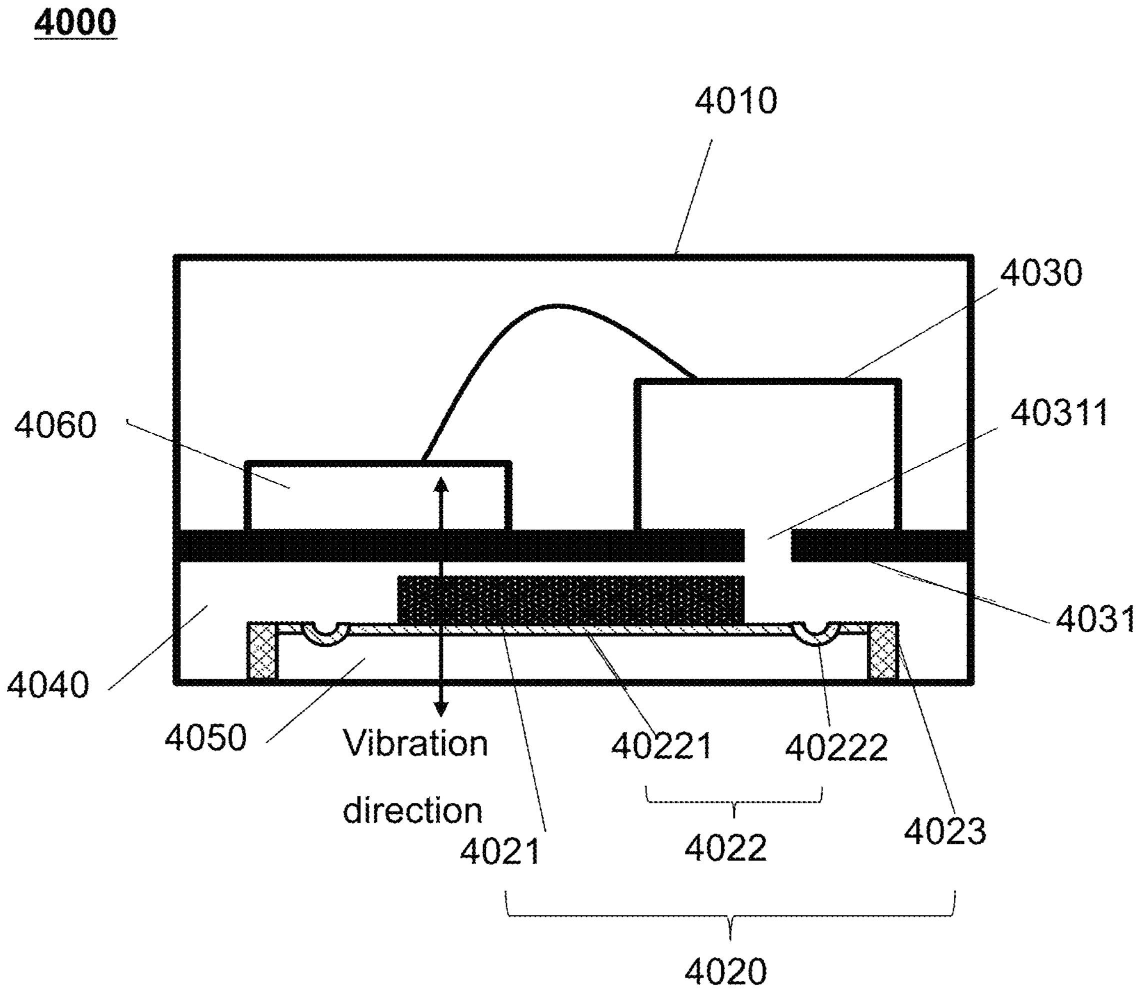
FIG. 45 is a structural diagram illustrating an exemplary sound transmission device according to some embodiments of the present disclosure.

In some embodiments, referring to FIG. 45, the supporting element 4023 may be located in the outer side of the first preprocessing region 40222 of the elastic element 4022. One end of the supporting element 4023 may encircle the outer side of the first preprocessing region 40222 and may be mechanically connected to the outer side of the first preprocessing region 40222, and the other end of the supporting element 4023 may encircle the inner wall of the housing 4010 and may be mechanically connected to the inner wall of the housing 4010. In this arrangement, the first acoustic cavity 4040 may be formed between the upper surface of the elastic element 4022, the supporting element 4023, the substrate 4031 and the housing 4010, and the second acoustic cavity 4050 may be formed by the lower surface of the elastic element 4022, the supporting element 4023, and the housing 4010.

Figure 46:
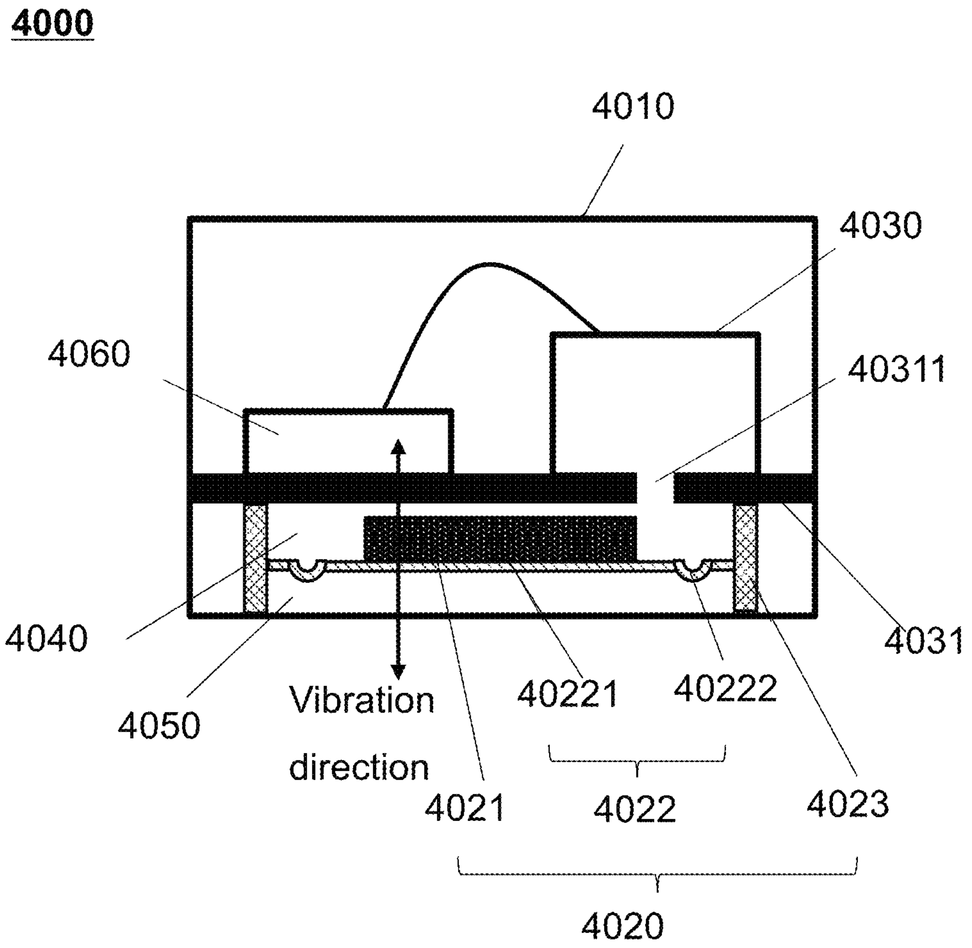
FIG. 46 is a structural diagram illustrating an exemplary sound transmission device according to some embodiments of the present disclosure.

In some embodiments, referring to FIG. 46, the supporting element 4023 may be located in the outer side of the first preprocessing region 40222 of the elastic element 4022. An inner wall of the supporting element 4023 may encircle the outer side of the first preprocessing region 40222 and may be mechanically connected to the outer side of the first preprocessing region 40222. The supporting element 4023 may be close to an end of the substrate 4031 and may be connected to the lower surface of the substrate 4031. The other end (an end away from the substrate 4031) of the supporting element 4023 may be connected to the inner wall of the housing 4010. In this arrangement, the upper surface of the elastic element 4022, the supporting element 4023, and the substrate 4031 may form the first acoustic cavity 4040, and the lower surface of the elastic element 4022, the supporting element 4023, and the housing 4010 may form the second acoustic cavity 4050.

Figure 47:
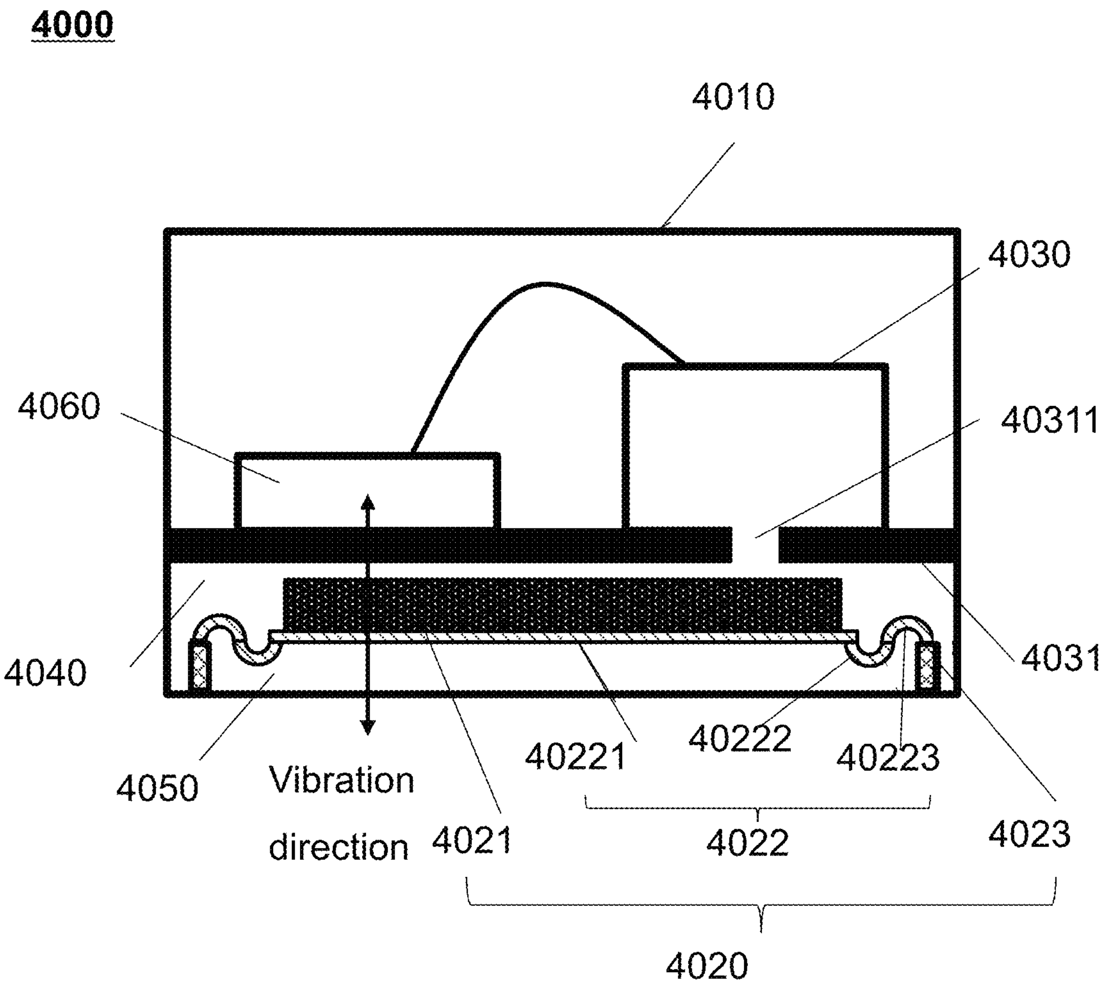
FIG. 47 is a structural diagram illustrating an exemplary sound transmission device according to some embodiments of the present disclosure.

In some embodiments, referring to FIG. 47, the supporting element 4023 may be located in the circumferential side of the second preprocessing region 40223 of the elastic element 4022. One end of the supporting element 4023 may encircle the circumferential side of the second preprocessing region 40223 and may be mechanically connected to the circumferential side of the second preprocessing region 40223. The other end the supporting element 4023 may be connected to the inner wall of the housing 4010. In some embodiments, one end of the supporting element 4023 may encircle the second preprocessing region 40223 of the elastic element 4022 and may be mechanically connected to the second preprocessing region 40223 of the elastic element 4022, and the other end of the supporting element 4023 may also be connected to the substrate 4031.

Figure 48:
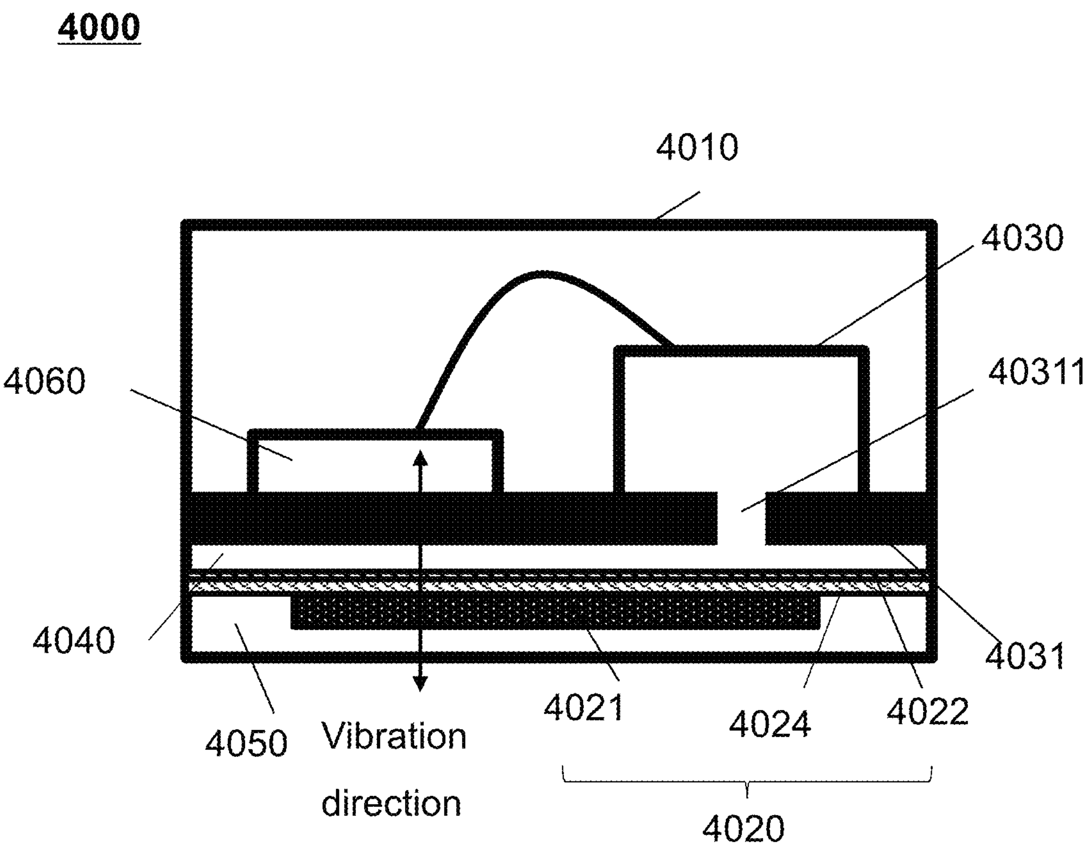
FIG. 48 is a structural diagram illustrating an exemplary sound transmission device according to some embodiments of the present disclosure.

In some embodiments, referring to FIG. 48, the vibration component 4020 of the sound transmission device 4000 may further include a flexible connection layer 4024. The flexible connection layer 4024 may be disposed between the elastic element 4022 and the mass element 4021, and the mass element 4021 may be connected to the elastic element 4022 through the flexible connection layer 4024. In some embodiments, the flexible connection layer 4024 may partially cover the elastic element 4022. In some embodiments, the flexible connection layer 4024 may cover a portion region of the elastic element 4022, for example, the connection region 40221. When the flexible connection layer 4024 partially covers the elastic element 4022, there may be a distance between a circumferential side of the flexible connection layer 4024 and the inner wall of the housing 4010. In some embodiments, the flexible connection layer 4024 may completely cover the elastic element 4022. The flexible connection layer 4024 may completely cover the elastic element 4022, and the circumferential side of the flexible connection layer 4024 may be connected to the inner wall of the housing 4010.

Figure 49:
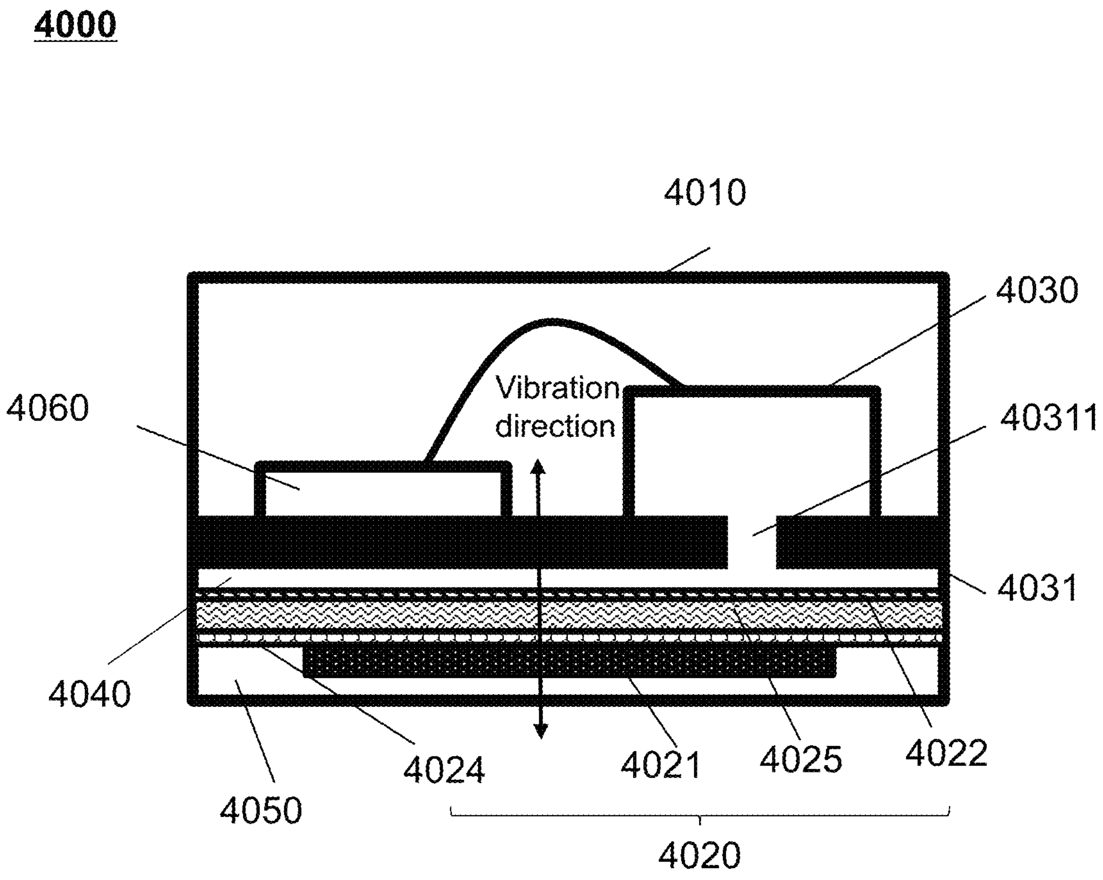
FIG. 49 is a structural diagram illustrating an exemplary sound transmission device according to some embodiments of the present disclosure.

In some embodiments, referring to FIG. 49, the flexible connection layer 4024 may be spaced apart from the elastic element 4022 to form a gap 4025. The circumferential side of the flexible connection layer 4024 and the circumferential side of the elastic element 4022 may encircle the housing 4010 and may be mechanically connected to the housing 4010, respectively, so that the gap 4025 may form a closed space structure with the housing 4010. In some embodiments, the flexible connection layer 4024 may be spaced apart from the elastic element 4022 to form the gap 4025. The circumferential side of the flexible connection layer 4024 and the circumferential side of the elastic element 4022 may also encircle the supporting element (not shown) and may also be mechanically connected to the supporting element (not shown), respectively, so that the gap 4025 may form a closed space structure with the supporting element. In some embodiments, the gap 4025 may be filled with liquid. In some embodiments, the liquid filled in the gap 4025 may be liquid with safety performance (e.g., non-flammable, non-explosive) and stable performance (e.g., non-volatile, prone to high temperature deterioration or vaporization). In some embodiments, the liquid may include but be not limited to, oil (e.g., silicone oil, glycerin, castor oil, engine oil, lubricating oil, hydraulic oil (e.g., aviation hydraulic oil)), water (e.g., purified water, other aqueous solutions of other inorganic or organic substances (e.g., brine)), oil-water emulsion, or liquid that meets a performance requirement thereof, or the like, or any combination thereof. Optionally, some air bubbles may exist in the liquid filled in the gap 3350.

In some embodiments, when the mass element 4021 vibrates (or is subject to a relatively large vibration shock), the mass element 4021 may generate relatively large vibration energy, and the vibration energy may be transmitted to the elastic element 4022 by the flexible connection layer 4024 and the liquid filled in the gap 4025. In some embodiments, the flexible connection layer 4024 and the liquid filled in the gap 4025 may attenuate the vibration energy transmitted from the mass element 4021 to the elastic element 4022, thereby reducing the vibration energy transmitted from the mass element 4021 to the elastic element 4022, preventing stress concentration from being generated on the elastic element 4022, and improving the reliability of the sound transmission device 4000 (especially the elastic element 4022).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block," "module," "engine," "unit," "component," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB, NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A vibration component, comprising:

a mass element;

an elastic element, the elastic element including a connection region and a first preprocessing region; and a supporting element configured to support the elastic element, wherein the supporting element encircles the elastic element and is mechanically connected to the elastic element;

the connection region is configured to support the mass element;

a deformation quantity of the first preprocessing region is greater than a deformation quantity of a region of the elastic element other than the first preprocessing region when the mass element vibrates;

the supporting element includes a clamping portion and a deformation portion;

the elastic element is clamped between the clamping portion and the deformation portion; and in response to a vibration signal of the mass element along a vibration direction, the deformation portion vibrates and deforms along the vibration direction to provide a third displacement for the mass element along the vibration direction.

2. The vibration component of claim 1, wherein the connection region is disposed in a middle of the elastic element, and the first preprocessing region is disposed around a periphery of the connection region.

3. The vibration component of claim 2, wherein the first preprocessing region includes a first bending ring with a first bending direction.

4. The vibration component of claim 3, wherein the connection region encircles a sidewall of the mass element and is mechanically connected to the sidewall of the mass element.

5. The vibration component of claim 3, wherein the mass element includes a first mass element and a second mass element, the first mass element and the second mass element being connected to two side surfaces of the connection region perpendicular to the vibration direction of the mass element, respectively, a projection of the first mass element onto the elastic element along the vibration direction coincides with a projection of the second mass element onto the elastic element along the vibration direction.

6. The vibration component of claim 1, wherein the elastic element further includes a second preprocessing region, the second preprocessing region being disposed around a periphery of the first preprocessing region; and a deformation quantity of the second preprocessing region is greater than a deformation quantity of a region of the elastic element other than the first preprocessing region and the second preprocessing region when the mass element vibrates.

7. The vibration component of claim 6, wherein the second preprocessing region includes a second bending ring with a second bending direction.

8. The vibration component of claim 7, wherein the first preprocessing region includes a first bending ring with a first bending direction, the first bending direction is perpendicular to the second bending direction.

9. The vibration component of claim 7, wherein the first preprocessing region includes a first bending ring, a projection area of the second bending ring on a plane perpendicular to the vibration direction of the mass element is smaller than a projection area of the first bending ring on the plane perpendicular to the vibration direction of the mass element.

10. The vibration component of claim 1, wherein the vibration component further includes a flexible connection layer disposed between the elastic element and the mass element.

11. The vibration component of claim 10, wherein a tensile strength of the flexible connection layer is in a range of 0.5 MPa~200 MPa.

12. The vibration component of claim 10, wherein a projection area of the flexible connection layer along the vibration direction of the mass element is greater than a projection area of the mass element along the vibration direction of the mass element.

13. The vibration component of claim 1, wherein the flexible connection layer covers the elastic member.

14. The vibration component of claim 13, wherein the flexible connection layer is spaced apart from the elastic element to form a gap, and the gap is filled with liquid.

15. The vibration component of claim 1, wherein a ratio of a first displacement provided by the first preprocessing region for the mass element along the vibration direction of the mass element to the third displacement is in a range of 1:20-50:1.

16. The vibration component of claim 1, wherein an elongation at break of the supporting element along the vibration direction of the mass element is in a range of 5%-800%.

17. The vibration component of claim 1, wherein cross-sections of the supporting element perpendicular to the vibration direction of the mass element have different cross-sectional areas.

18. The vibration component of claim 1, wherein the supporting element includes at least one of a hole structure located in a middle of the supporting element or a recessed portion disposed in a side surface of the supporting element.

19. A sound transmission device, comprising:

a housing, the housing forming an acoustic cavity;

a vibration component, the vibration component separating the acoustic cavity into a first acoustic cavity and a second acoustic cavity, and the vibration component vibrating relative to the housing so that a volume of the first acoustic cavity and a volume of the second acoustic cavity change; and an acoustoelectric transducer, the acoustoelectric transducer being in acoustic communication with the first acoustic cavity or the second acoustic cavity, and the acoustoelectric transducer generating an electrical signal in response to a change of the volume of the first acoustic cavity or a change of the volume of the second acoustic cavity, wherein the vibration component includes a mass element, an elastic element, and a supporting element configured to support the elastic element;

the supporting element encircles the elastic element and is mechanically connected to the elastic element;

the elastic element includes a connection region and a first preprocessing region;

the connection region is configured to support the mass element; and a deformation quantity of the first preprocessing region is greater than a deformation quantity of a region of the elastic element other than the first preprocessing region when the mass element vibrates;

the supporting element includes a clamping portion and a deformation portion;

the elastic element is clamped between the clamping portion and the deformation portion; and in response to a vibration signal of the mass element along a vibration direction, the deformation portion vibrates and deforms along the vibration direction to provide a third displacement for the mass element along the vibration direction.

20. The sound transmission device of claim 19, wherein the acoustoelectric transducer includes a substrate, and the first preprocessing region is connected to the substrate.

* * * * *